United States Patent
Asakura et al.

(10) Patent No.: US 7,576,845 B2
(45) Date of Patent: Aug. 18, 2009

(54) THREE-DIMENSIONAL COLOR AND SHAPE MEASURING DEVICE

(75) Inventors: Hirotaka Asakura, Nagoya (JP); Kenji Natsuhara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/242,778

(22) Filed: Sep. 30, 2008

(65) Prior Publication Data

US 2009/0046301 A1 Feb. 19, 2009

Related U.S. Application Data

(63) Continuation-in-part of application No. PCT/JP2007/056720, filed on Mar. 28, 2007.

(30) Foreign Application Priority Data

Mar. 30, 2006 (JP) .............................. 2006-096096

(51) Int. Cl.
G01N 21/00 (2006.01)
(52) U.S. Cl. ..................... 356/73; 382/162; 382/165
(58) Field of Classification Search ............... 356/73, 356/72, 610; 382/162, 165, 167, 203
See application file for complete search history.

(56) References Cited

U.S. PATENT DOCUMENTS

| 6,760,116 B2 | 7/2004 | Iwasaki |
| 6,927,862 B2 | 8/2005 | Iwasaki |
| 7,006,952 B1 | 2/2006 | Matsumoto et al. |
| 2002/0122119 A1* | 9/2002 | Takakura .................. 348/223.1 |
| 2003/0107747 A1 | 6/2003 | Iwasaki |
| 2007/0031029 A1 | 2/2007 | Sasaki |

FOREIGN PATENT DOCUMENTS

| EP | 1151778 A1 | 7/2001 |
| JP | H05-137011 A | 6/1993 |
| JP | 2001-166809 A | 6/2001 |
| JP | 2003-172610 A | 6/2003 |
| JP | 2005043233 A | 2/2005 |
| JP | 2005-258622 A | 9/2005 |
| JP | 2005293075 A | 10/2005 |
| WO | 0048699 A1 | 8/2000 |
| WO | 2005095886 A1 | 10/2005 |
| WO | 2005096126 A1 | 10/2005 |
| WO | 2007114189 A1 | 10/2007 |

* cited by examiner

*Primary Examiner*—Kara E Geisel
*Assistant Examiner*—Abdullahi Nur
(74) *Attorney, Agent, or Firm*—Baker Botts, LLP

(57) ABSTRACT

A three-dimensional color and shape measuring device is provided which measures a color and a three-dimensional shape of an object based on an image signal acquired by picking up an image of the object to be measured by the same image pick-up part. The device includes a correction part configured to convert the image signal into a color measuring image signal by a first correction in accordance with a first gray scale characteristic and to convert the image signal into a shape-measuring image signal by a second correction in accordance with a second gray scale characteristic; and a color and shape extracting part which is configured to restore a three dimensional image of the object by using a three-dimensional model on which a three dimensional shape of the object is restored based on the shape-measuring image signal and a color of the object is restored based on the color-measuring image signal.

16 Claims, 36 Drawing Sheets

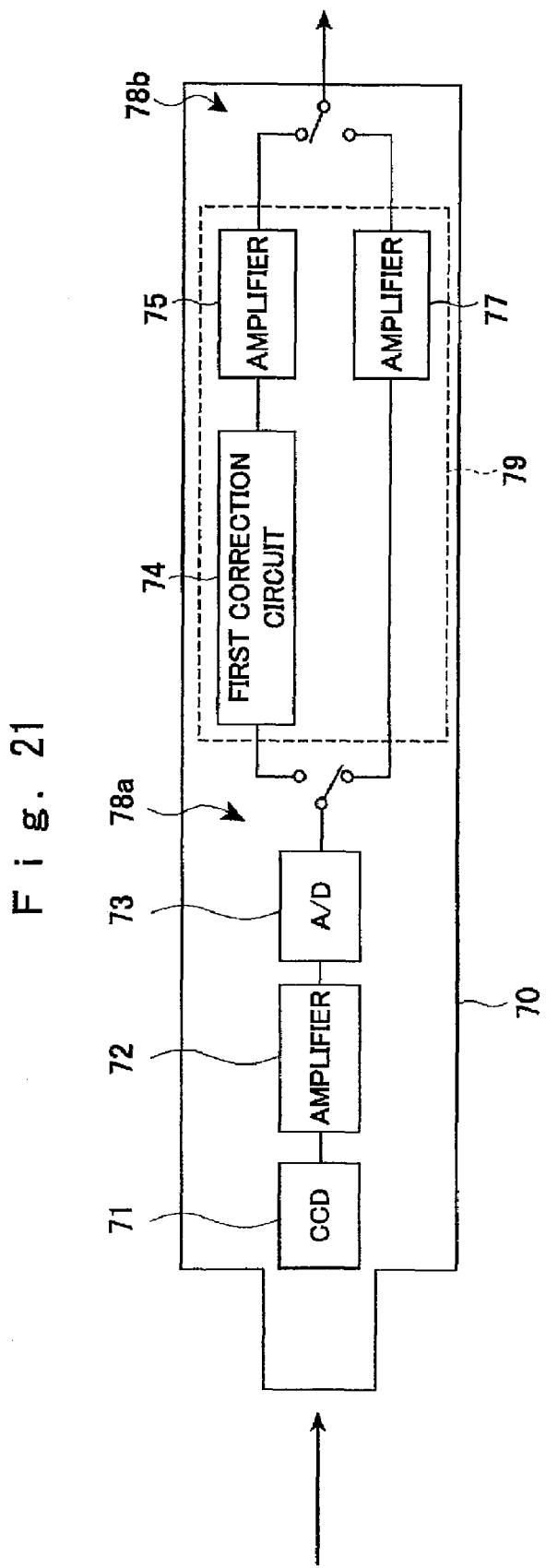

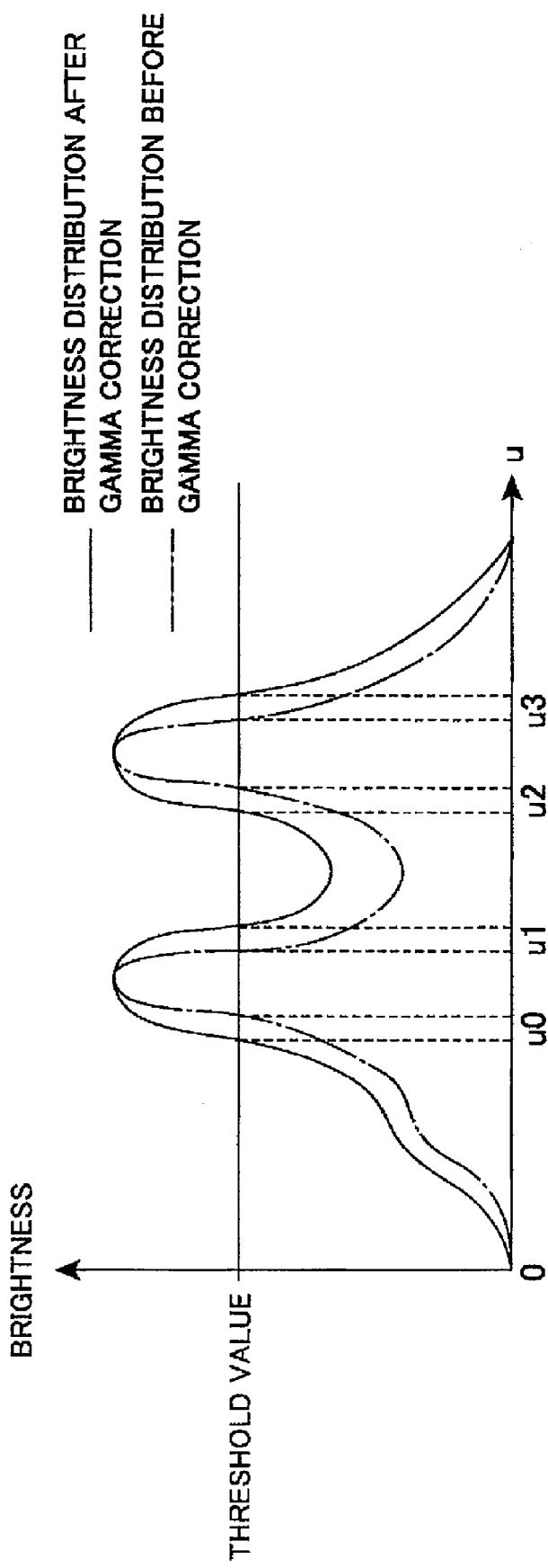

US 7,576,845 B2

THREE-DIMENSIONAL COLOR AND SHAPE MEASURING DEVICE

CROSS-REFERENCE TO RELATED APPLICATIONS

The present application is a Continuation-in-Part of International Application PCT/JP2007/056720 filed on Mar. 28, 2007, which claims the benefits of Japanese Patent Application No. 2006-096096 filed on Mar. 30, 2006.

BACKGROUND OF THE INVENTION

1. Field of the Invention

The present invention relates to a three-dimensional color and shape measuring device for measuring a color and a three-dimensional shape of an object to be measured based on an image signal acquired by picking up an image of the object to be measured by an image pick-up part.

2. Description of the Related Art

Conventionally, there has been known a three-dimensional color and shape measuring device which measures a color and a shape of an object to be measured by picking up an image of the object to be measured in a state that light is projected on the object to be measured, and generates three-dimensional color and shape information of the object to be measured (for example, see JP-A-2003-172610).

The three-dimensional color and shape measuring device includes an image pick-up part having a CCD (Charge Coupled Device) or the like which picks up an image of an object to be measured, a measuring part which includes a computer or the like for measuring a color and a three-dimensional shape of the object to be measured based on an image signal outputted from the image pick-up part after the image pick-up part picks up the object to be measured, and a display part which includes a liquid crystal display panel or the like for displaying a three-dimensional color image of the object to be measured by pasting (texture mapping) an image (a texture) which restores a color of the object to be measured based on a measurement result acquired by the measuring part to a three-dimensional model which restores a three-dimensional shape of the object to be measured based on a measurement result acquired by the measuring part.

Generally, in such a three-dimensional color and shape measuring device, color tone of the three-dimensional color image of the object to be measured displayed on the display part is made to approximate the more real color tone by applying the gray scale correction which conforms to the display characteristic of a display part (herein after referred to as "gamma correction") to an image signal acquired by picking up an image of the object to be measured by the pickup part.

That is, a display device such as an LCD (Liquid Crystal Device) display or a CRT (Cathode Ray Tube) display possesses a non-linear characteristic in which a gray scale (brightness) of a display image does not exhibit the proportional relationship with a voltage value of an inputted image signal. To be more specific, the display device exhibits the characteristic that a change of brightness is gentle when the input voltage is low and the brightness is sharply changed when the input voltage is high.

Therefore, when an image signal acquired by picking up the object to be measured is directly inputted to the display device by the CCD, an actual color tone of the object to be measured cannot be faithfully reproduced on a display image.

To prevent the occurrence of such a drawback, in the image pick-up part, gamma correction which conforms to the display characteristic of the display device is applied to the image signal acquired by picking up an image of the object to be measured so that the gray scale of the display image exhibits the proportional relationship with the voltage value of the image signal.

SUMMARY OF THE INVENTION

In the above-mentioned conventional three-dimensional color and shape measuring device, since gamma correction is applied to the image signal acquired by picking up an image of the object to be measured, the color tone of the object to be measured is faithfully reproduced. On the other hand, however, with respect to the three-dimensional shape of the object to be measured, there exists a possibility that the shape may not be faithfully reproduced due to lowering of the measuring accuracy.

That is, in measuring the three-dimensional shape of the object to be measured, the three-dimensional color and shape measuring device performs the measurement as follows. The image pick-up part picks up an image of the object to be measured in a state that a light in a stripe pattern is irradiated to the object to be measured. Here, the measuring part measures the three-dimensional shape of the object to be measured by detecting a striped pattern boundary in the object to be measured based on the image signal inputted from the image pick-up part.

However, the image signal inputted to the measuring part is an image signal having a non-linear gray scale characteristic acquired after gamma correction. Accordingly, as shown in FIG. 35, the brightness distribution on the display image based on the image signal after gamma correction becomes higher than the brightness distribution having a linear gray scale characteristic before gamma correction except for the brightest portion.

Accordingly, an error u0 to u3 generates between an actual pattern boundary (an intersection of a straight line showing a threshold value and a curved line showing a brightness distribution based on the image signal before gamma correction) and a pattern boundary detected by the measuring part (an intersection of a straight line showing a threshold value and a curved line showing a brightness distribution based on the image signal after gamma correction). Due to this error, the measuring part incorrectly detects a three-dimensional shape which is different from the actual three-dimensional shape of the object to be measured as the three-dimensional shape thereof□ Accordingly, measuring accuracy of the three-dimensional shape is lowered thus causing a possibility that the three-dimensional shape of the object to be measured may not be faithfully reproduced.

According to the present invention, there is provided a three-dimensional color and shape measuring device for measuring a color and a three-dimensional shape of an object to be measured based on an image signal acquired by picking up an image of the object to be measured by the same image pick-up part, wherein the three-dimensional color and shape measuring device includes: a correction part which is configured to convert the image signal into a color measuring image signal by a first correction in accordance with a first gray scale characteristic and to convert the image signal into a shape-measuring image signal by a second correction in accordance with a second gray scale characteristic; and a color and shape extracting part which is configured to restore a three-dimensional image of the object to be measured by using a three-dimensional model on which a three-dimensional shape of the object to be measured is restored based on the shape-measuring image signal and a color of the object to be measured restored based on the color-measuring image signal.

BRIEF EXPLANATION OF THE DRAWINGS

FIG. 21 is a functional block diagram showing an image pick-up unit of a second embodiment;

FIG. 35 is an explanatory view showing measuring error generated at the time of three-dimensional shape measuring by a conventional three-dimensional color and shape measuring device.

PREFERRED EMBODIMENTS OF THE PRESENT INVENTION

Preferred embodiments of the present invention are explained in detail in conjunction with attached drawings.

First Embodiment

Figure 1:
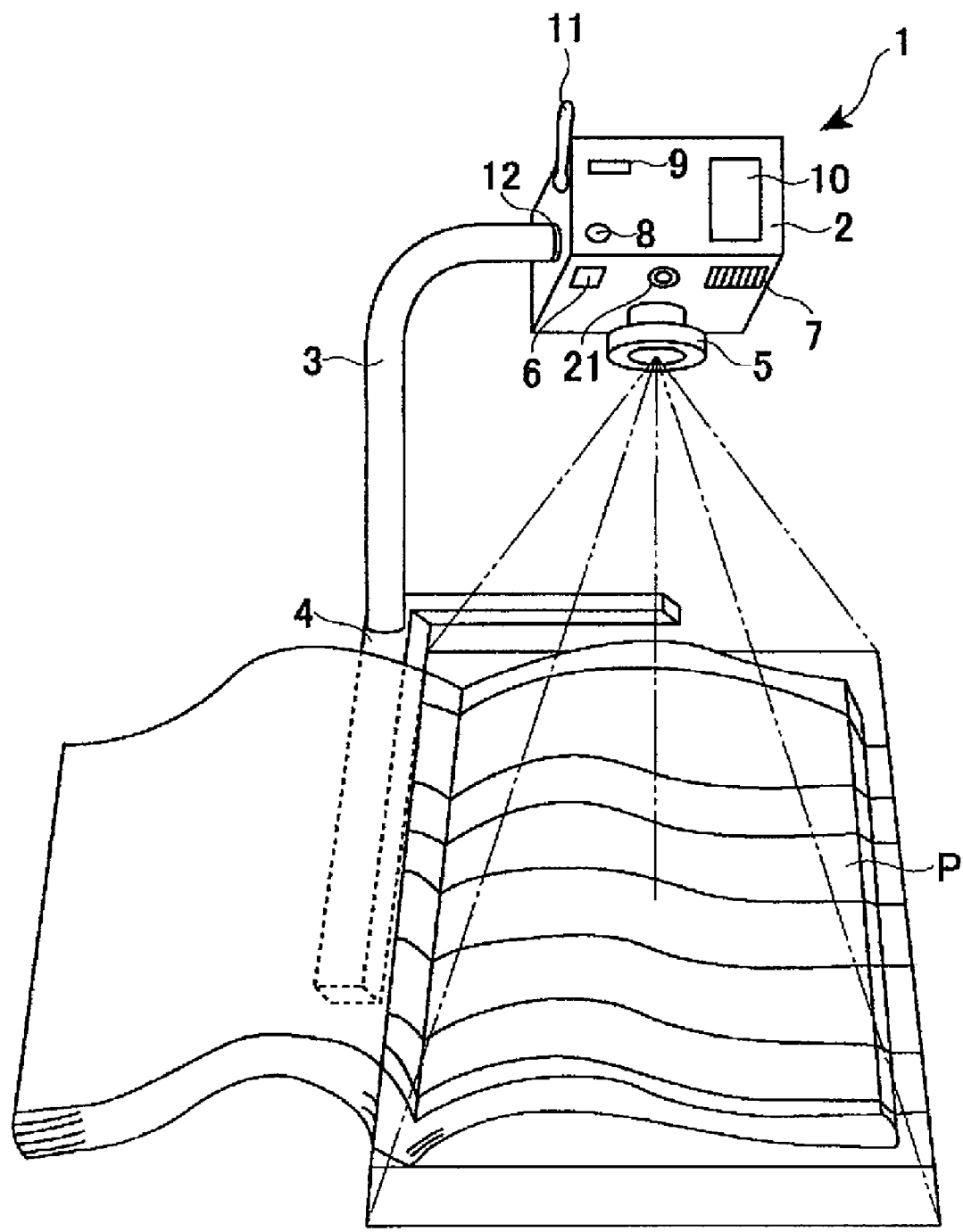
FIG. 1 is a perspective view showing an appearance of a three-dimensional color and shape measuring device according to a first embodiment.
Figure 2:
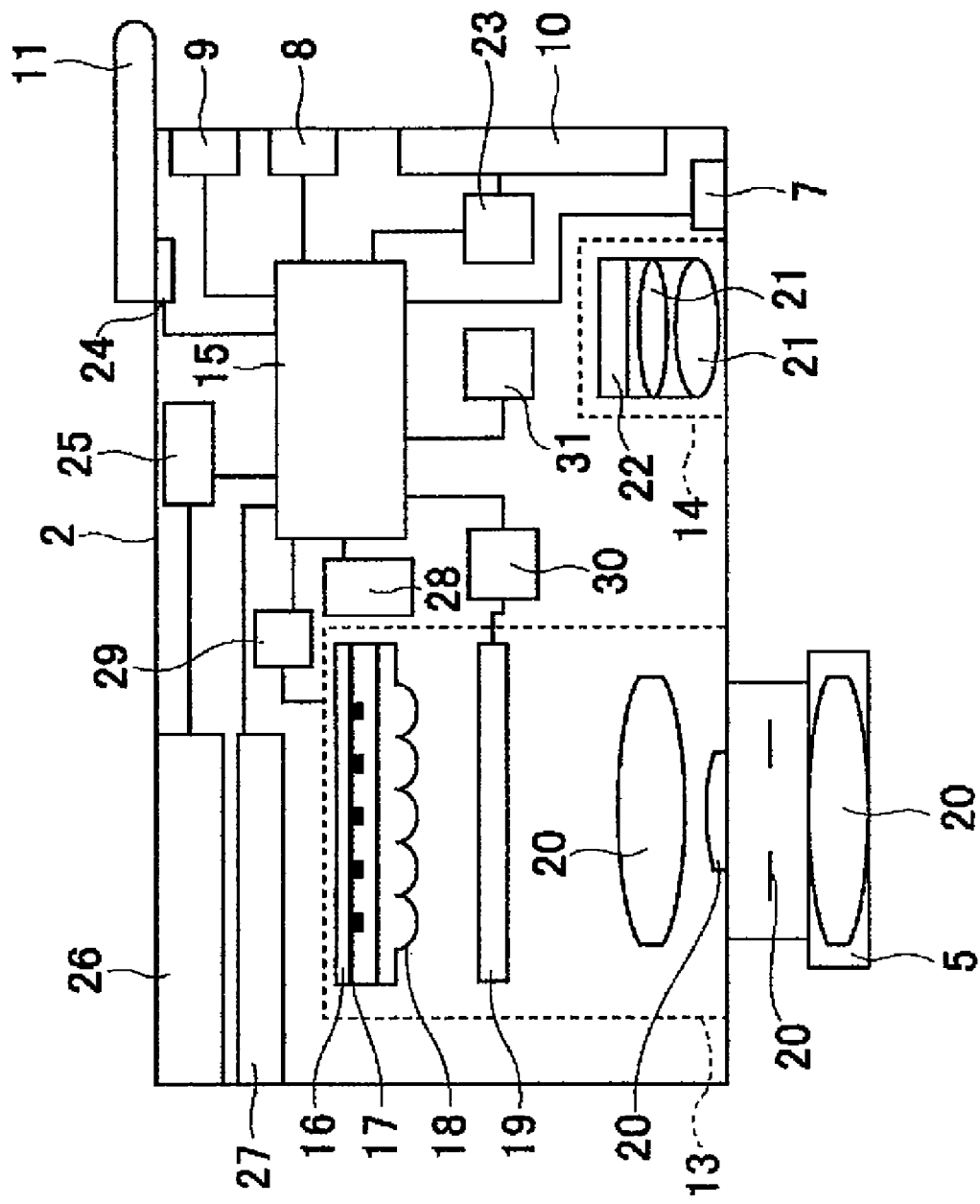
FIG. 2 is a plan view showing the inner constitution of an image pick-up head in FIG. 1.

FIG. 1 is a perspective view showing the appearance of a three-dimensional color and shape measuring device 1 according to the first embodiment of the present invention. The three-dimensional color and shape measuring device 1 is designed to perform the projection processing of image light (also referred to as "image signal light") indicative of an image on a projection surface (for example, a planar surface, a screen, a desk surface or the like) (usual projection) and the projection processing of stripe-shaped patterned light on an object to be measured (for acquiring three-dimensional information), the image pick-up processing of the object to be measured, and the acquisition processing of three-dimensional information (containing three-dimensional positional information, three-dimensional shape information, color information) of the object to be measured based on an image-pick-up result using a computer. Accordingly, the three-dimensional color and shape measuring device 1 includes, as shown in FIG. 2, a projection part 13, an image pick-up part 14 and a processing part 15.

The three-dimensional color and shape measuring device 1 is operated in accordance with a mode selected by a user out of plural kinds of modes. These modes include a digital camera mode in which the three-dimensional color and shape measuring device 1 functions as a digital camera, a webcam mode in which the three-dimensional color and shape measuring device 1 functions as a web camera, a stereoscopic image mode in which the three-dimensional color and shape measuring device 1 detects a three-dimensional shape and acquires a stereoscopic image (herein after also referred to as three-dimensional image) of an object to be measured, and a planation image mode for acquiring a planation image which is formed by making the stereoscopic image of the object to be measured such as a curved original.

In FIG. 1, the three-dimensional color and shape measuring device 1 is shown in a state that the three-dimensional color and shape measuring device 1 projects stripe-shaped patterned light formed by alternately arranging a bright portion and a dark portion for detecting a three-dimensional shape of an document P which constitutes an object to be measured in the stereoscopic image mode or in the planation image mode on the document P from the projection part 13.

In such a manner, the projection part 13 also functions as a patterned light projection part which projects a patterned light of a predetermined pattern on the object to be measured.

As shown in FIG. 1, the three-dimensional color and shape measuring device 1 includes an approximately box-shaped image pick-up head 2, a pipe-shaped arm member 3 which has one end thereof connected to the image pick-up head 2, a base 4 which is connected to another end of the arm member 3 and has an approximately L shape in a plan view. The arm member 3 and the base 4 function in a cooperative manner as a stand which holds the image pick-up head 2 in a cantilever manner.

The image pick-up head 2 is configured such that, as shown in FIG. 2, the projection part 13 and the image pick-up part 14 are housed in a casing. As shown in FIG. 1, The image pick-up head 2 includes a lens barrel 5, a finder 6 and a flash 7 in a posture that these parts are respectively partially exposed on a front surface of the image pick-up head 2. The image pick-up head 2 further includes an image pick-up optical system 21 which constitutes a portion of the image pick-up part 14 in a posture that a portion of the lens is exposed on the front surface of the image pick-up head 2. The image pick-up optical system 21 receives image light indicative of an object to be measured at the exposed portion thereof.

The lens barrel 5, as shown in FIG. 1 protrudes from a front surface of the image pick-up head 2. In the inside of the lens barrel 5, as shown in FIG. 2, a projection optical system 20 which constitutes a portion of the projection part 13 is housed. The lens barrel 5 holds the projection optical system 20 in a state that the projection optical system 20 is movable as the whole for focusing adjustment. Further, the lens barrel 5 is provided for protecting the projection optical system 20 from damages. From an exposed end surface of the lens barrel 5, a portion of a lens of the projection optical system 20 which constitutes a portion of the projection part 13 is exposed. The projection optical system 20 projects, from an exposed portion thereof, an image light or a patterned light toward a projection surface or an object to be measured.

The finder 6 is constituted of an optical lens which is arranged to guide a light incident on the finder 6 from a front surface side of the image pick-up head 2 to a back surface side of the image pick-up head 2. When a user looks into the finder 6 from a back surface side of the three-dimensional color and shape measuring device 1, the user can observe an image within a region which substantially agrees with a region where the image is focused on a CCD (Charge Coupled Device) 22 which constitutes an example of an image sensor in the image pick-up optical system 21 (focusing surface).

The flash 7 is, for example, a light source which emits light for covering a shortage of light quantity in the digital camera mode, for example, and is constituted of a discharge lamp filled with xenon. Accordingly, the flash 7 can be used repeatedly by discharging a capacitor (not shown in the drawing) incorporated in the image pick-up head 2.

The image pick-up head 2 further includes a release button switch 8, a mode changeover switch 9 and a monitor LCD (Liquid Crystal Device) 10 on an upper surface thereof.

The release button switch 8 is operated by a user for operating the three-dimensional color and shape measuring device 1. The release button switch 8 is constituted of a two-stage push-button-type switch which can generate an instruction which differs between when the user operation state (push-down state) is a "half-pushed state" in which the user pushes the button switch by half and when the user operation state is a "full-pushed state" in which the user pushes the button switch fully. The operation state of the release button switch 8 is monitored by the processing part 15. When the processing part 15 detects the "half-pushed state", a well-known auto focusing function (AF) and an automatic exposure function (AE) are generated and hence, focusing, stop and a shutter speed are automatically adjusted. On the other hand, when the processing part 15 detects the "full-pushed state", an image pick-up operation or the like is performed.

The mode changeover switch 9 is operated by the user for setting the operation mode of the three-dimensional color and shape measuring device 1 to any one of the plural kinds of modes including the above-mentioned digital camera mode, webcam mode, stereoscopic image mode, planation image mode and OFF mode and the like. The operation state of the mode changeover switch 9 is monitored by the processing part 15. When the operation state of the mode changeover switch 9 is detected by the processing part 15, the processing in the mode corresponding to the detected operation state is applied to the three-dimensional color and shape measuring device 1.

The monitor LCD 10 is constituted of a liquid crystal display and displays an image to a user upon reception of an image signal from the processing part 15. The monitor LCD 10 displays, for example, a pick-up image in the digital camera mode or in the webcam mode, a three-dimensional-shape detection result image in the stereoscopic image mode, a planation image in the planation image mode or the like.

As shown in FIG. 1, the image pickup head 2 further includes an antenna 11 which constitutes an RF (wireless) interface and a connecting member 12 which connects the image pickup head 2 and the arm member 3 with each other.

Figure 5:
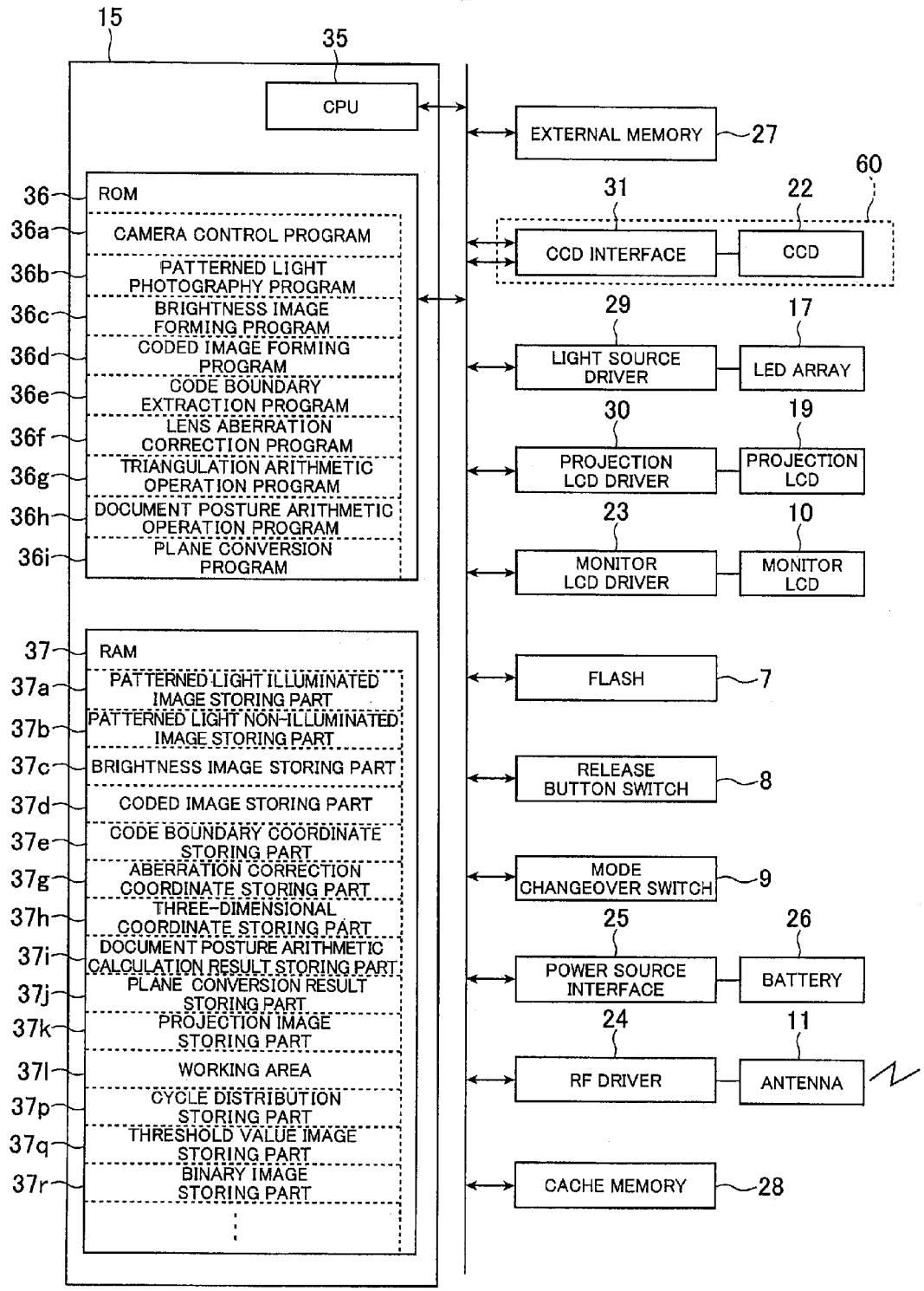
FIG. 5 is a block diagram conceptually showing the electrical constitution of the three-dimensional color and shape measuring device 1 shown in FIG. 1.

The antenna 11 is, as shown in FIG. 5, connected to an RF driver 24. The antenna 11 transmits the pick-up image data acquired in the digital camera mode, the stereoscopic image data acquired in the stereoscopic image mode or the like to an external interface not shown in the drawing via the RF driver 24 by wireless.

The connecting member 12 connects the image pickup head 2 and one end portion of the arm member 3 with each other in a detachable manner using a screw mechanism, and in a state that a relative mounting angle is adjustable. To be more specific, the connecting member 12 is formed as a ring which forms female threads on an inner peripheral surface thereof and is rotatably and non-detachably held on one side surface of the image pickup head 2. Corresponding to the female threads, male threads are formed on one end portion of the arm member 3. By allowing the female threads and the male threads to be threadedly engaged with each other, the image pickup head 2 and the arm member 3 are detachably connected with each other. Accordingly, by removing the image pickup head 2 from the arm member 3, the image pickup head 2 can be used as a usual digital camera. Further, by allowing the female threads and the male threads to be threadedly engaged with each other, the image pickup head 2 can be fixed to the one end portion of the arm member 3 at an arbitrary angle.

As shown in FIG. 1 the arm member 3 is made of a material or has a mechanism which allows the arm member 3 to be bent but prevents the arm member 3 from restoring a shape thereof unless an external force is applied to the arm member 3. Accordingly, the arm member 3 can hold the image pickup head 2 mounted on the arm member 3 in a state that a position and a direction of the image pickup head 2 can be arbitrarily adjusted. The arm member 3 is, for example, constituted of a bellow-like pipe which is bendable in an arbitrary shape.

As shown in FIG. 1, the base 4 is, as described above, connected to the other end of the arm member 3. The base 4 is mounted on a mounting base such as a desk and supports the image pickup head 2 and the arm member 3. The base 4 is formed in an approximately L-shape in a plan view and hence, the base 4 can support the image pickup head 2 and the arm member 3 with high stability although a weight thereof is not so large. Further, since the arm member 3 and the base 4 are detachably connected with each other, for example, prior to transporting and storing the three-dimensional color and shape measuring device 1, by separating the arm member 3 and the base 4 from each other, it is possible to arbitrarily change a shape of a space occupied by the arm member 3 and the base 4. Accordingly, it is possible to easily realize the enhancement of easiness in transportation and the reduction of a storing space.

FIG. 2 conceptually shows the internal constitution of the image pickup head 2. The image pickup head 2, as described above, mainly incorporates the projection part 13, the image pickup part 14 and the processing part 15 therein.

The projection part 13 is a unit for projecting an arbitrary image light (projection image) or a patterned light on a projecting surface or an object to be measured. The projection part 13 includes, as shown in FIG. 2, the substrate 16, a plurality of LEDs (Light Emitting Diodes) 17 (herein after, an array thereof is referred to as "LED array 17A"), the light source lens 18, the projection LCD 19 and the projection optical system 20 which are arranged in series along the projecting direction. The detail of the projection part 13 is explained later in conjunction with FIG. 3.

The image pickup part 14 is provided for picking up an document P as an object to be measured. The image pickup part 14 includes, as shown in FIG. 2, the image pickup optical system 21 and the CCD 22 which are arranged in series along the incident direction of the image light.

The image pickup optical system 21 is, as shown in FIG. 2, formed of a plurality of lenses. The image pickup optical system 21 automatically adjusts a focal length and a stop using a well-known auto-focus mechanism and forms light from the outside into an image on the CCD 22.

The CCD (Charge Coupled Device) 22 is constituted of photoelectric conversion elements such as photodiode elements arranged in a matrix array. The CCD 22 generates a signal (herein after, also referred to as an image signal) corresponding to a color and intensity of light of the image formed on a surface of the CCD 22 by way of the image pickup optical system 21 for every pixel. The generated signal is converted into digital data and the digital data is outputted to the processing part 15.

As described in a block diagram shown in FIG. 5, the processing part 15 is electrically connected to the flash 7, the release button switch 8 and the mode change over switch 9 respectively. The processing part 15 is further electrically connected to the monitor LCD 10 by way of a monitor LCD driver 23, to the antenna 11 by way of an RF driver 24 and to the battery 26 by way of a power source interface 25 respectively. The processing part 15 is further electrically connected to the external memory 27 and the cache memory 28 respectively. The processing part 15 is further electrically connected to the LED array 17A by way of a light source driver 29, to the projection LCD 19 by way of a projection LCD driver 30 and to the CCD 22 by way of a CCD interface 31 respectively. The flash 7 and the like are controlled by the processing part 15. In this embodiment, the image pickup unit 60 is constituted of the CCD 22 and the CCD interface 31.

The external memory 27 is a detachable flash ROM (Read Only Memory) and can store the pick-up image picked up in the digital camera mode, in the webcam mode or in the stereoscopic image mode and the three-dimensional information. The external memory 27 may be formed of, for example, an SD card, a compact flash (registered trademark) card or the like.

The cache memory 28 is a storage device capable of reading and writing data at a high speed. The cache memory 28 is, for example, used for transferring a pick-up image picked up in the digital camera mode to the cache memory 28 at a high speed and for storing the pick-up image in the external memory 27 after the image processing is performed by the processing part 15. The cache memory 28 may be formed of, for example, a SDRAM (Synchronous Dynamic Random Access Memory), a DDRRAM (Double Data Rate Random Access Memory) or the like.

The power source interface 25, the light source driver 29, the projection LCD driver 30 and the CCD interface 31 are constituted of various kinds of integrated circuits IC (Integrated Circuit) for controlling the battery 26, the LED array 17A, the projection LCD 19 and the CCD 22 respectively.

Figure 3A:
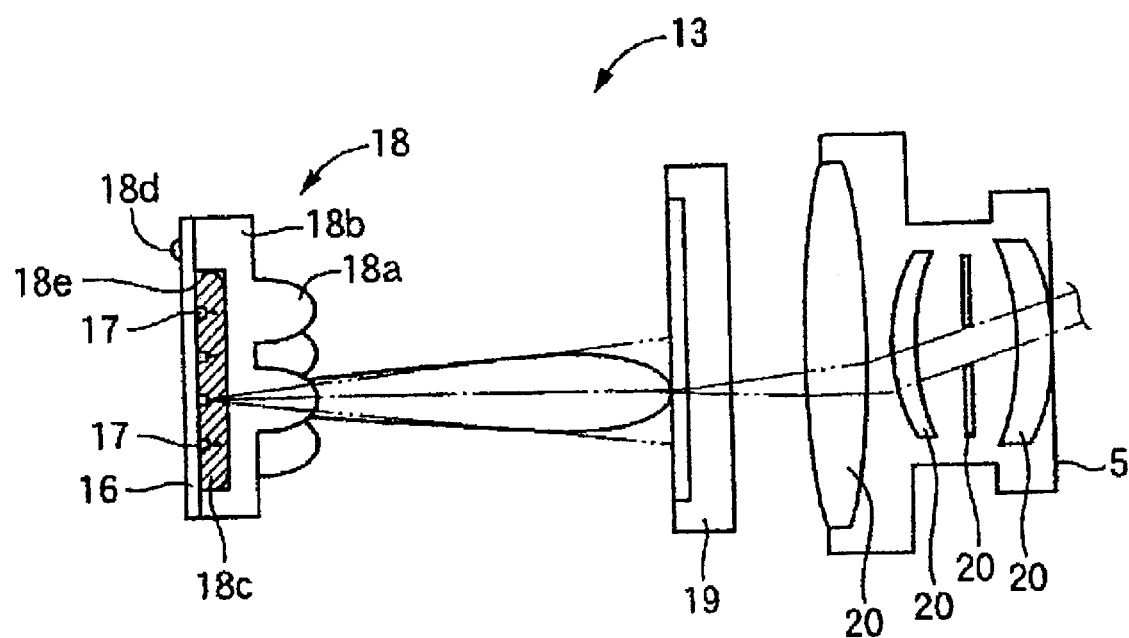
FIG. 3A is a plan view showing a projection part in FIG. 2 in an enlarged manner.
Figure 3B:
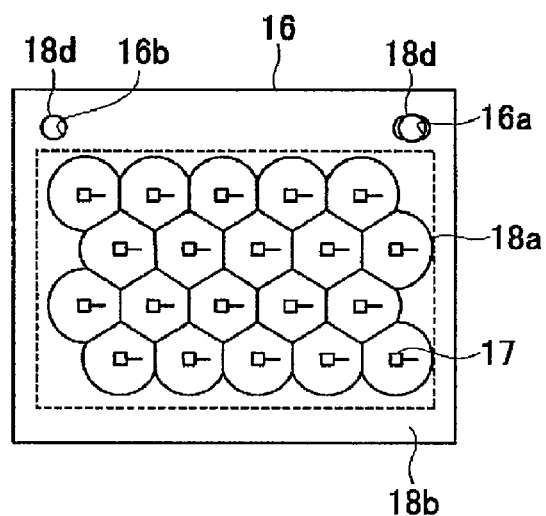
FIG. 3B is a front view showing a light source lens in FIG. 2 in an enlarge manner.
Figure 3C:
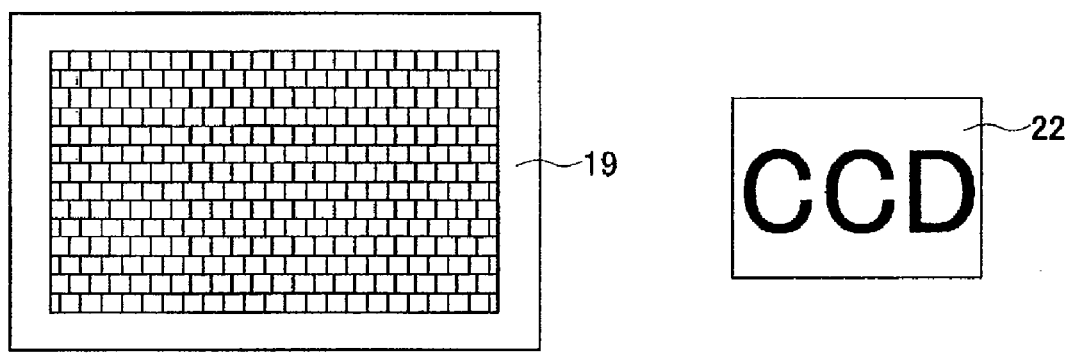
FIG. 3C is front view of a projection LCD and a CCD in FIG. 2 in an enlarged manner.

Here, the detail of the projection part 13 is explained in conjunction with FIG. 3A to FIG. 3C. FIG. 3A is an enlarged view of the projection part 13, FIG. 3B is a front view of the light source lens 18 and FIG. 3C is a front view for explaining the arrangement relationship between the projection LCD 19 and the CCD 22.

As described above, the projection part 13 includes, as shown in FIG. 3A, the substrate 16, the LED array 17A, the light source lens 18, the projection LCD 19 and the projection optical system 20 in series along the projection direction of the patterned light.

The LED array 17A is mounted on the substrate 16 and the electrical wiring is made between the substrate 16 and the mounted LED array 17A. The substrate 16 may be, for example, a substrate formed by applying an insulating synthetic resin to an aluminum substrate and by forming a pattern using non-electrolytic plating, or a substrate having the single-layered or multi-layered structure with a core made of a glass-epoxy base material.

The LED array 17A is a light source which emits radially-extending light toward the projection LCD 19. In the LED array 17A, the plurality of LEDs (Light Emitting Diode) 17 is, as shown in FIG. 3B, bonded to the substrate 16 by way of silver paste in a staggered array. The substrate 16 and the plurality of LEDs 17 are electrically connected with each other by way of bonding wires. An advantageous effect acquired by arranging the plurality of LEDs 17 in a staggered array is explained in detail later in conjunction with FIG. 4.

As described above, in this embodiment, the plurality of LEDs 17 are used as a light source of the projection part 13. Accordingly, compared to a case in which filament lamp, halogen lamp or the like is used as a light source, this embodiment can easily realize the enhancement of efficiency of the photoelectric conversion in which electricity is converted into light or the suppression of generation of the infrared rays or the ultra violet rays. Accordingly, it is possible to easily realize power saving, prolongation of lifetime, suppression of generation of heat and the like of the three-dimensional color and shape measuring device 1.

In this manner, since the LED 17 exhibits an extremely low heat-rays generation ratio compared to the halogen lamp or the like, a lens made of synthetic resin can be adopted as the light source lens 18 and the projection optical system 20. Accordingly, compared to a case which adopts a lens made of glass, it is possible to adopt the inexpensive and light-weighted light source lens 18 and projection optical system 20.

Further, in this embodiment, the respective LEDs 17 constituting the LED array 17A emit light of the same color. To be more specific, the respective LEDs 17 are configured to emit light of amber color using four elements of Al, In, Ga and P as materials. Accordingly, it is unnecessary to take the correction of color aberration which is to be considered in emitting light of a plurality of colors into consideration. Accordingly, it is also unnecessary to adopt an achromatic lens in the projection optical system 20 for correcting the color aberration. As a result, it is possible to enhance the degree of freedom in designing of the projection optical system 20.

Further, this embodiment adopts the amber-colored LED made of four-element material which exhibits the high photoelectric conversion efficiency of approximately 80 [lumen/W] compared to other luminescent color and hence, it is possible to easily realize increase of brightness, power saving and prolongation of lifetime of the three-dimensional color and shape measuring device 1.

In this embodiment, to be more specific, the LED array 17A is constituted of 59 pieces of LEDs 17, and each LED 17 is driven at 50 [mW] (20 [mA], 2.5[V]). Accordingly, all 59 pieces of LEDs 17 can be driven with power consumption of approximate 3 [W].

Further, in this embodiment, brightness of light emitted from the respective LEDs 17 which is calculated as an optical flux value when light passes through the light source lens 18 and the projection LCD 19 and is radiated from the projection optical system 20 is set to approximately 25 ANSI lumen even when the light is radiated to the whole surface.

In this embodiment, the brightness of radiated light from the projection part 13 in the three-dimensional color and shape measuring device 1 is selected to approximately such an optical flux value of 25 ANSI lumen and hence, for example, when the object to be measured is a human face or an animal face, even when a patterned light is projected on the object to be measured for detecting a three-dimensional shape of the object to be measured in the stereoscopic image mode, it is possible to prevent glaring of the object to be measured. In this manner, according to this embodiment, when the object to be measured is the human or the animal, it is possible to detect the three-dimensional shape of the object to be measured in a state that the human or animal does not close his/her eye.

As shown in FIG. 3, the light source lens 18 is a lens for collecting light emitted from the LED array 17A in a radially expanding manner, and is made of a material such as an optical resin represented by acrylic.

As shown in FIG. 3A, the light source lens 18 includes a plurality of convex lens portions 18a, a base portion 18b which supports these lens portions 18a, an epoxy sealing material 18c and a plurality of positioning pins 18d.

As shown in FIG. 3A, the respective lens portions 18a are formed in a protruding manner toward the projection LCD 19 from the base portion 18b at positions of the base portion 18b where the lens portions 18a face the respective LEDs 17 of the LED array 17A. The epoxy sealing material 18c is filled in a concave portion 18e formed in the base portion 18b where the LED array 17A is to be hermetically stored. Due to such a filling operation, the LED array 17A is sealed in the concave portion 18e. The epoxy sealing material 18c has a function of sealing the LED array 17A and also has a function of adhering the substrate 16 and the light source lens 18 to each other.

As shown in FIG. 3A, the plurality of positioning pins 18d is formed on the light source lens 18 in a protruding manner toward the substrate 16 from the light source lens 18 for positioning the light source lens 18 and the substrate 16 relative to each other. As shown in FIG. 3B, some of the plurality of positioning pins 18d is inserted into elongated holes 16a formed in the substrate 16 while the remaining positioning pins 18d are inserted in true circular holes 16b formed in the substrate 16. Accordingly, the light source lens 18 is fixed to the substrate 16 without a play at a prescribed position.

In this manner, according to this embodiment, the light source lens 18, the LED array 17A and the substrate 16 are laminated to each other in a spatially stacked manner in the projection direction and hence, it is possible to easily realize a compact shape and space saving of an assembled body of the light source lens 18 and the like.

Further, in this embodiment, the substrate 16 also has, besides a basic function of holding the LED array 17A, an additional function of holding the light source lens 18. In this manner, according to this embodiment, it is possible to omit the addition of a part used exclusively for holding the light source lens 18 and, as a result, it is possible to easily reduce the number of parts of the three-dimensional color and shape measuring device 1.

Further, in this embodiment, the respective lens portions 18a are, as shown in FIG. 3A, arranged in a state that the respective lens portions 18a opposedly face the respective LEDs 17 of the LED array 17A under the 1 to 1 relationship. Accordingly, the radially extending light emitted from the respective LEDs 17 is efficiently collected by the respective lens portions 18 opposedly facing the respective LEDs 17 and, as shown in FIG. 3A, and is radiated to the projection LCD 19 as radiation light having high directivity.

The reason why the directivity of the radiation light is enhanced in this manner is that, when the light is incident on the projection LCD 19 approximately perpendicular to the projection LCD 19, in-plane irregularities of transmissivity of the projection LCD 19 can be suppressed and hence, the image quality can be enhanced.

The projection optical system 20 is formed of a plurality of lenses for projecting the light which passes through the projection LCD 19 on the projection surface or the object to be measured. These lenses are constituted of a telecentric lens formed by combining a glass-made lens and a synthetic-resin-made lens. The telecentric structure is the structure in which the main light beams which pass through the projection optical system 20 become parallel to an optical axis in an incident-side space and a position of a pupil to which light is radiated becomes infinite.

The projection optical system 20 has telecentric property as described above and the incident NA is approximately 0.1 and hence, an optical path of the projection optical system 20 is regulated so as to allow only light at an angle within ±5° perpendicular to the projection optical system 20 to pass through the stop in the inside of the projection optical system 20.

Accordingly, in this embodiment, in combination with the constitution which allows only light which passes through the projection LCD 19 at an angle ±5° perpendicular to the projection LCD 19 to be projected on the projection optical system 20 due to the telecentric property of the projection optical system 20, it is possible to easily realize the enhancement of image quality.

Accordingly, in this embodiment, for enhancing the image quality, it is important to align a radiation angle of light radiated from each LED 17 such that the radiated light from the each LED 17 is incident on the projection LCD 19 approximately perpendicular to the projection lens 19 and, at the same time, most of the light radiated from each LED 17 is allowed to be incident on the projection optical system 20 within an incident angle range of ±5° perpendicular to the projection optical system 20.

As shown in FIG. 3C, the projection LCD 19 is a space modulation element which applies space modulation to light which passes through the light source lens 18 and is collected and outputs a patterned light toward the projection optical system 20. The projection LCD 19 is, to be more specific, constituted of a panel liquid crystal display whose aspect ratio is not set to 1:1.

As shown in FIG. 3C, in the projection LCD 19, a plurality of pixels constituting the projection LCD 19 is arranged in a staggered array on one plane. To be more specific, in the projection LCD 19, a plurality of pixel rows in each of which a plurality of pixels is arranged in the longitudinal direction (lateral direction) of the liquid crystal display at equal pixel intervals is arranged parallel to each other in a columnar direction where two neighboring pixel rows arranged close to each other are displaced in the longitudinal direction of the liquid crystal display by a length shorter than the pixel interval.

In this manner, in this embodiment, since the plurality of pixels constituting the projection LCD 19 is arranged in a staggered array, the light to which space modulation is applied by the projection LCD 19 is controlled at an interval which is ½ of the pixel interval in the longitudinal direction of the projection LCD 19. In this manner, according to this embodiment, the projected patterned light can be controlled at a small interval and hence, it is possible to detect a three-dimensional shape of the object to be measured with high accuracy and high-resolution.

Further, in the stereoscopic image mode and the planation image mode described later for detecting the three-dimensional shape of the object to be measured, as shown in FIG. 1, stripe-shaped patterned light formed by alternatively arranging a bright portion and a dark portion is projected toward the object to be measured. In this embodiment, the patterned light is preliminarily defined in a state that the direction along which a plurality of stripes (bright portion or dark portion) (width direction of each stripe) is arranged in the patterned light agrees with the longitudinal direction of the projection LCD 19. Accordingly, in the patterned light, a boundary between the bright portion and the dark portion can be controlled at ½ pixel interval and hence, it is possible to detect the three dimensional shape of the object to be measured with high accuracy in the same manner.

In FIG. 3C, the projection LCD 19 and the CCD 22 are shown in a laterally arranged manner. The projection LCD 19 and the CCD 22 are arranged in a state that a front surface of the image pick-up head 2 exists on a viewer-side paper surface, the light is incident on the projection LCD 19 from a back paper surface, and the light is incident on the CCD 22 from the viewer-side paper surface so that the image of the object to be measured is formed on the CCD 22.

The projection LCD 19 and CCD 22 are, in the inside of the image pick-up head 2, arranged with a layout shown in FIG. 3C. To be more specific, the projection LCD 19 and CCD 22 are arranged in a state that a wide surface of the projection LCD 19 and a wide surface of the CCD 22 are directed in the approximately same direction. Due to such arrangement, according to this embodiment, for detecting the three-dimensional shape of the object to be measured by forming an image of the reflected light from the object to be measured on which the projection LCD 19 projects patterned light on the CCD 22 in the inside of the three-dimensional color and shape measuring device 1, it is possible to make use of one straight line which connects the center of the projection LCD 19 and the center of the CCD 22 as one side out of three sides which receive attention when the triangulation is performed.

Further, the CCD 22 is arranged on the longitudinal direction side of the projection LCD 19 (side in the extension direction of the pixel row). Accordingly, particularly, in the stereoscopic image mode or the planation image mode, when the three-dimensional shape of the object to be measured is detected by making use of the principle of triangulation, an inclination defined by the CCD 22 and the object to be measured can be controlled at ½ pixel interval and hence, it is possible to detect the three-dimensional shape of the object to be measured with high accuracy in the same manner.

In this embodiment, the projection LCD 19 adopts the staggered array as the pixel array and hence, it is possible to form patterned light in which a plurality of stripes is arranged at intervals equal to intervals at which pixels are arranged in the pixel row, that is, another patterned light having a distance between the stripes smaller than a distance between the stripes of a patterned light having the smallest distance between the stripes among plural kinds of standard patterned lights which are formed without making use of the staggered array. In this manner, according to this embodiment, when the number of kinds of the standard patterned lights is n, it is possible to handle a space code of (n+1) bits and hence, the accuracy of detecting the three-dimensional shape of the object to be measured is enhanced also from this aspect.

According to this embodiment, compared to the distance between the pixel intervals in the projection LCD 19, that is, the resolution of the projection LCD 19, it is possible to handle a space code having a large number of bits.

Figures 4A, 4B:
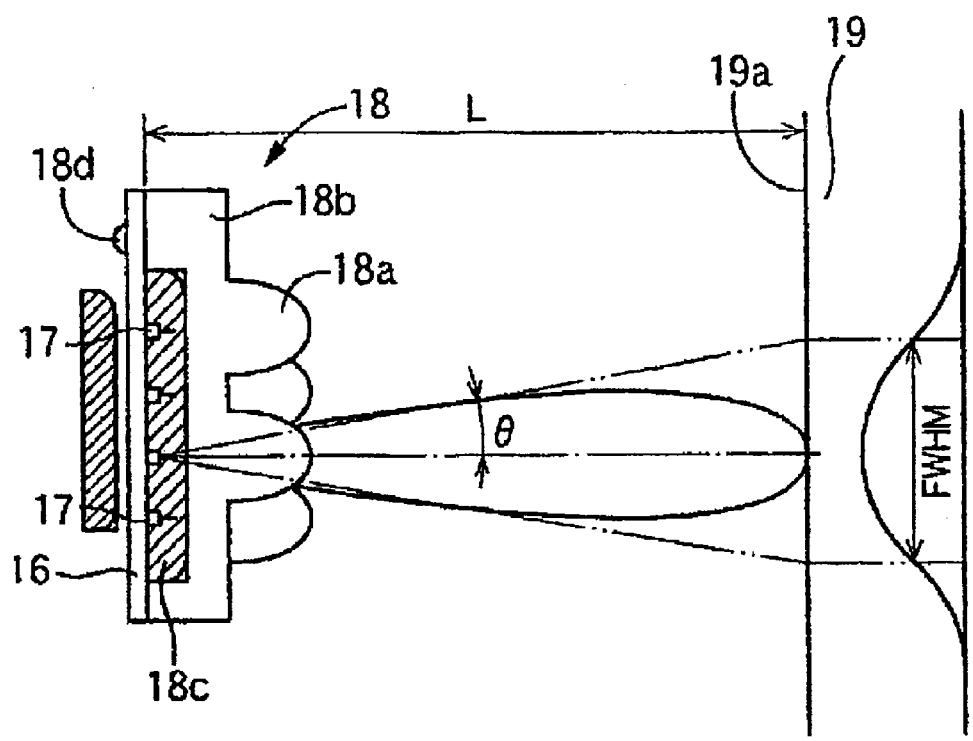
FIG. 4A is a side view for explaining an arrangement of a plurality of LEDs in FIG. 3.
FIG. 4B is a graph showing illuminance distribution which is individually realized by one LED.
Figures 4C, 4D:
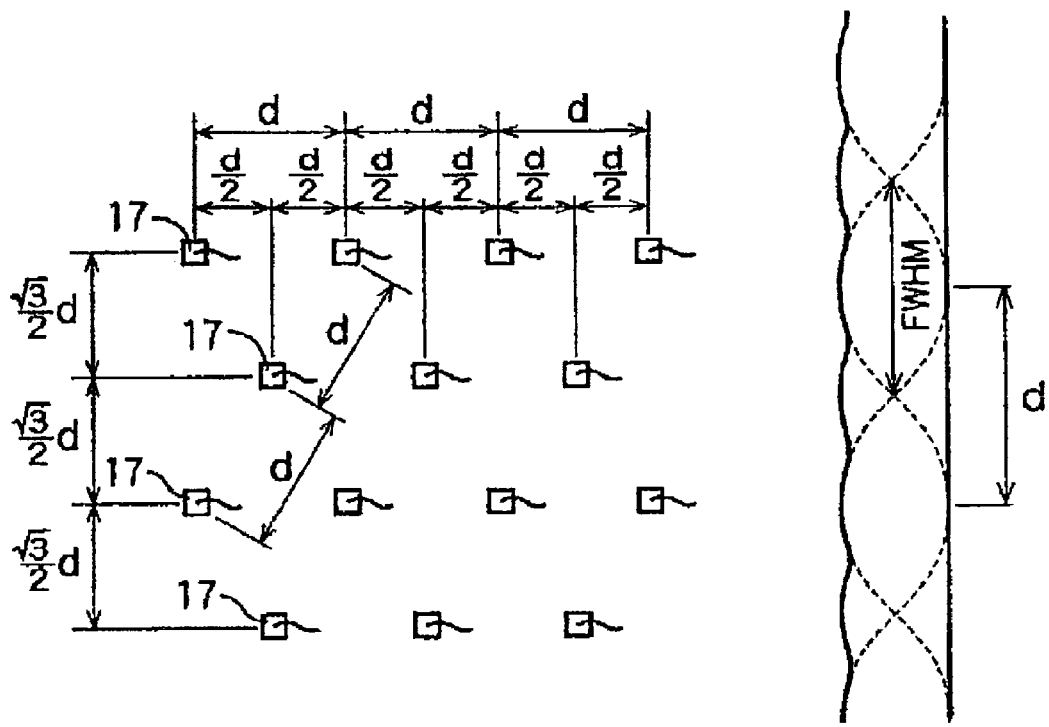
FIG. 4C is a front view showing the plurality of LEDs.
FIG. 4D is a graph showing combined illuminance distribution realized in a comprehensive manner by the plurality of LEDs.

Hereinafter, the arrangement of the LED array 17A is explained in further detail in conjunction with FIG. 4. FIG. 4A is a side view showing a three-dimensional shape of light radiated from the light source lens 18. FIG. 4B is a graph showing illuminance distribution of the light incident on an incident surface 19a of the projection LCD 19 from one LED 17. FIG. 4C is a front view showing the arrangement of the LED array 17A in a partially enlarged manner. FIG. 4D is a graph showing combined illuminance distribution of a plurality of lights incident on the incident surface 19a of the projection LCD 19 from the plurality of LEDs 17.

As shown in FIG. 4A, the light source lens 18 is designed so that, in a state that a half-maximum spreading half angle θ is approximately 5°, the light radiated from the light source lens 18 reaches the incident surface 19a of the projection LCD 19 as light having the illuminance distribution as shown in FIG. 4B.

Further, as shown in FIG. 4C, the plurality of LEDs 17 are arranged on the substrate 16 in a staggered array in conformity with to the staggered array of the pixels in the projection LCD 19. To be more specific, a plurality of LED rows formed by arranging the plurality of LEDs 17 in series in the lateral direction at intervals disarranged in parallel to each other in the longitudinal direction at intervals $\sqrt{3}/2$ times as large as the interval d. Further, two LED rows arranged close to each other in the longitudinal direction are displaced from each other in the lateral direction with a length equal to the interval d.

That is, in this embodiment, the LEDs 17 are arranged in a triangular lattice array where any LED 17 is spaced apart from other neighboring LEDs 17 with a distance equal to the interval d.

In this embodiment, a length of the interval d is preliminarily set to assume a value equal to or less than an FWHM (Full Width Half Maximum) of the illuminance distribution given by the light radiated from one LED 17 with respect to the projection LCD 19.

Accordingly, in this embodiment, the combined illuminance distribution of light which passes through the light source lens 18 and reaches the incident surface 19a of the projection LCD 19 is expressed by an approximately straight line graph having small ripples in FIG. 4D. As a result, light is radiated to the whole incident surface 19a of the projection LCD 19 approximately uniformly. According to this embodiment, the illumination irregularities in the projection LCD 19 can be suppressed and, as a result, the image light having high quality is projected on the projection surface and, further, the patterned light having high quality is projected on the object to be measured.

FIG. 5 shows the electrical constitution of the three-dimensional color and shape measuring device 1 using a block diagram. The processing part 15 is mainly constituted of a computer, and the computer includes a CPU (Central Processing Unit) 35, a ROM 36 and a RAM 37.

The CPU 35 executes programs stored in the ROM 36 while making use of the RAM 37 so as to perform various processings such as detection of the operation state of the release button switch 8, fetching of the image data from the CCD 22, transfer and storing of the fetched image data and detection of the operation state of the mode changeover switch 9.

The ROM 36 stores a camera control program 36a, a patterned light imaging program 36b, a brightness image forming program 36c, a coded image forming program 36d, a code boundary extraction program 36e, a lens aberration correction program 36f, a triangulation calculation program 36g, an document Posture calculation program 36h, and a plane conversion program 36i.

Figure 8:
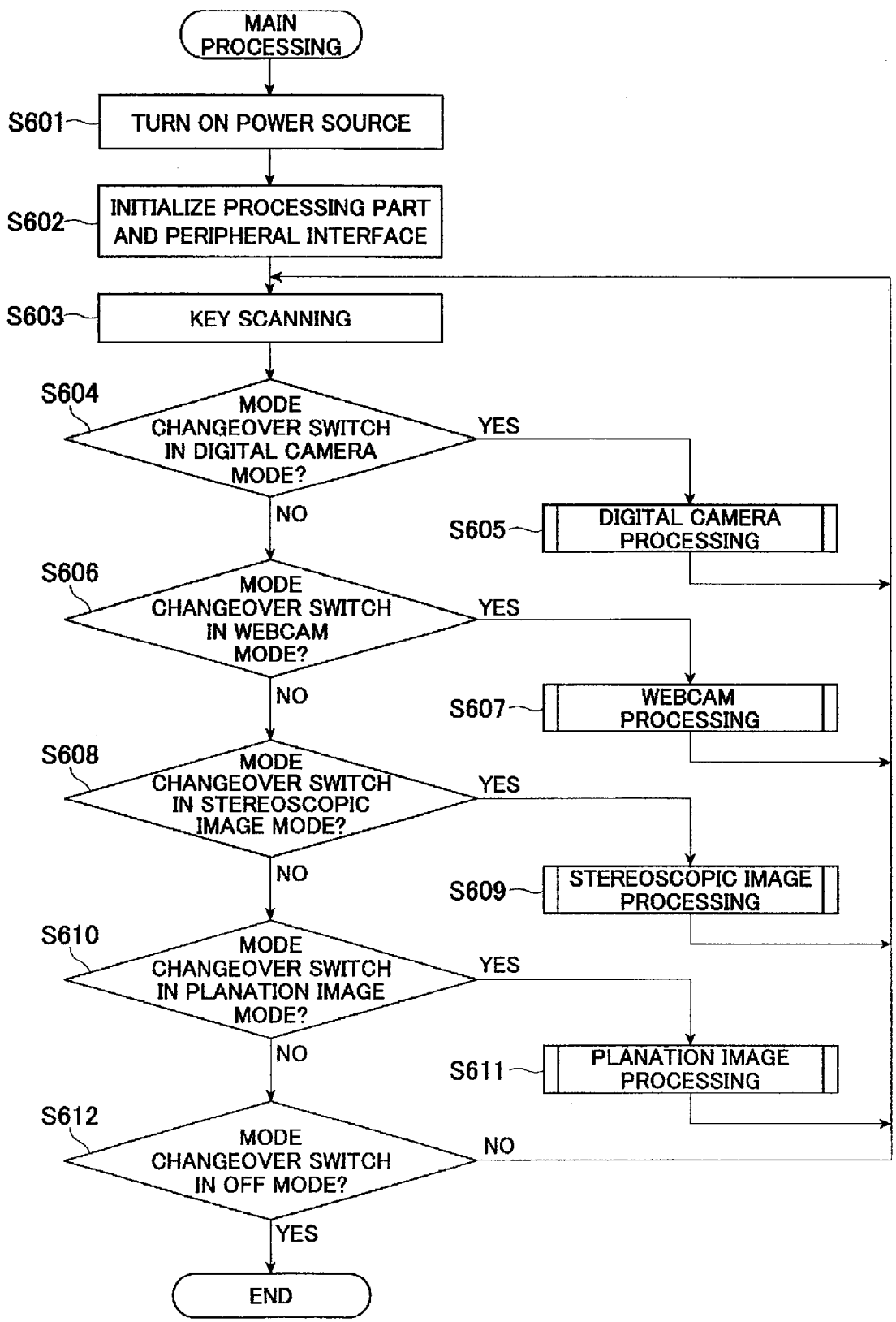
FIG. 8 is a flow chart conceptually showing the main processing executed by the camera control program in FIG. 5.

The camera control program 36a is executed for performing a control of the whole three-dimensional color and shape measuring device 1, and the control includes main processing which is conceptually described in a flow chart shown in FIG. 8.

The patterned light imaging program 36b is executed for picking up an image of the object to be measured to which patterned light is projected for detecting a three-dimensional shape of the document P thus acquiring a patterned light illuminated image and, further, for picking up an image of the object to be measured to which a patterned light is not projected thus acquiring a patterned light non-illuminated image.

The brightness image forming program 36c is executed for acquiring difference between the patterned light illuminated image and the patterned light non-illuminated image acquired with respect to the same object to be measured by the execution of the patterned light imaging program 36b and forming a brightness image indicative of the object to be measured on which the patterned light is projected.

In this embodiment, plural kinds of patterned lights is sequentially projected on the same object to be measured time-sequentially, and every time each patterned light is projected, the objected to be measured is picked up. The differences between the plurality of respective patterned light illuminated images and the patterned light non-illuminated image which are picked up in this manner are acquired and, as a result, brightness images the number of which is equal to the number of the kinds of patterned lights is formed.

The coded image forming program 36d is executed for forming a coded image in which a space code is allocated to every pixel based on a binary images formed by applying threshold processing of the plurality of respective brightness images formed by executing the brightness image forming program 36c.

To schematically explain the coded image forming program 36d, when the coded image forming program 36d is executed, the distance between the pattern lines in the brightness image of the object to be measured on which the patterned light having the smallest distance between the pattern lines out of the plural kinds of patterned lights is projected is acquired as a period, and the distribution of the period in the whole brightness image is acquired as the periodic distribution.

When the coded image forming program 36d is executed, further, a variable window which changes a size thereof is accordance with to the acquired periodic distribution is locally set to the brightness image for every patterned light and hence, a threshold value is locally calculated and set with respect to the whole brightness image by filtering processing using the variable window.

Due to the relationship between the threshold value image indicative of the distribution of the threshold value set in this manner and the brightness image for every patterned light, the binary image is formed for every patterned light.

The code boundary extraction program 36e is executed for acquiring boundary coordinates of the code with accuracy of sub pixel order by making use of the coded image formed due to the execution of the coded image forming program 36d and the brightness image formed due to the execution of the brightness image forming program 36c.

The lens aberration correction program 36f is executed for performing the aberration correction of the image pick-up optical system 21 with respect to the boundary coordinates of the code acquired with accuracy of sub pixel order due to the execution of the code boundary extraction program 36e.

The triangulation calculation program 36g is executed for calculating the three-dimensional coordinates in a real space relating to the boundary coordinates from the boundary coordinates of the code to which the aberration correction is applied due to the execution of the lens aberration correction program 36f.

The document posture calculation program 36h is executed for estimating and acquiring a three-dimensional shape of the document P from the three-dimensional coordinates calculated due to the execution of the triangulation calculation program 36g.

The plane conversion program 36i is, based on the three-dimensional shape of the document P calculated due to the execution of the document Posture calculation program 36h, executed for forming a planation image such as an image formed when the document P is picked up from a front side.

Further, as shown in FIG. 5, to the RAM 37, a patterned light illuminated image storing part 37a, a patterned light non-illuminated image storing part 37b, a brightness image storing part 37c, a coded image storing part 37d, a code boundary coordinate storing part 37e, an aberration correction coordinate storing part 37g, a three-dimensional coordinate storing part 37h, an document Posture arithmetic operation result storing part 37i, a plane conversion result storing part 37j, a projection image storing part 37k, a working area 37l, a periodic distribution storing part 37p, a threshold value image storing part 37q and a binary image storing part 37r are respectively allocated as memory regions.

The patterned light illuminated image storing part 37a stores patterned light illuminated image data indicative of the patterned light illuminated image which is picked up due to the execution of the patterned light imaging program 36b. The patterned light non-illuminated image storing part 37b stores patterned light non-illuminated image data indicative of the patterned light non-illuminated image which is picked up due to the execution of the patterned light imaging program 36b.

The brightness image storing part 37c stores data indicative of the brightness image formed due to the execution of the brightness image forming program 36c. The coded image storing part 37d stores data indicative of the coded image formed due to the execution of the coded image forming program 36d. The code boundary coordinate storing part 37e stores data indicative of boundary coordinates of the respective code extracted with accuracy of subpixel order due to the execution of the code boundary extraction program 36e.

The aberration correction coordinate storing part 37g stores data indicative of the code boundary coordinates to which the aberration correction is applied due to the execution of the lens aberration correction program 36f. The three-dimensional coordinate storing part 37h stores data indicative of three-dimensional coordinates in a real space calculated due to the execution of the triangulation calculation program 36g.

The document Posture arithmetic operation result storing part 37i stores a parameter relating to the three-dimensional shape of the document P calculated due to the execution of the document Posture calculation program 36h. The plane conversion result storing part 37j stores data indicative of a plane conversion result acquired due to the execution of the plane conversion program 36i. The projection image storing part 37k stores information on the projection image which the projection part 13 projects to the object to be measured, that is, the patterned light. A working area 37l stores data which the CPU 35 temporarily uses for operating the CPU 35.

The periodic distribution storing part 37p, the threshold value image storing part 37q and the binary image storing part 37r store the data indicative of the periodic distribution, the threshold value image and the binary image acquired due to the execution of the coded image forming program 36d respectively.

Figure 6:
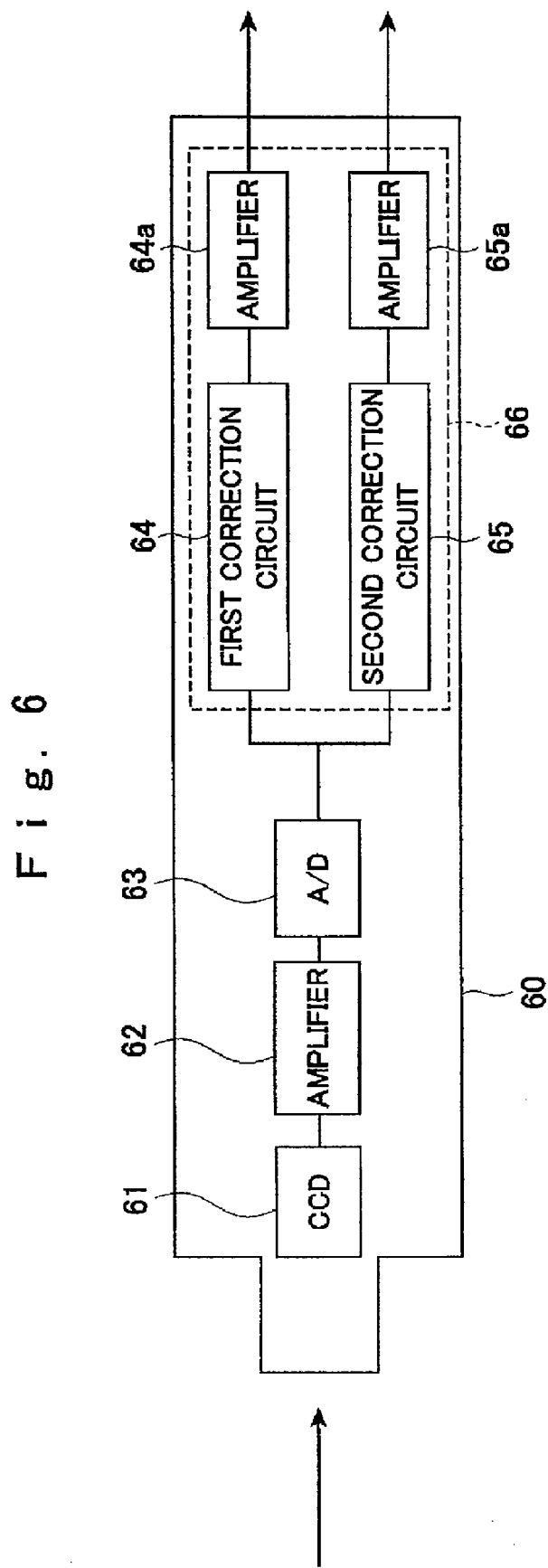
FIG. 6 is a functional block diagram showing an image pick-up unit of the first embodiment.

Here, the constitution of the image pick-up unit 60 provided to the three-dimensional color and shape measuring device 1 according to this embodiment is explained in conjunction with FIG. 6. Here, in the following explanation, the three-dimensional color and shape measuring device 1 is explained by naming the whole three-dimensional color and shape measuring device 1 excluding the image pick-up unit 60 as a main device.

As shown in FIG. 6, the image pick-up unit 60 of the first embodiment houses therein a CCD 61 which functions as an image pick-up part, an amplifier 62 which amplifies an image signal which is formed by picking up an image of the object to be measured and is outputted from the CCD 61, an A/D converter 63 which converts an analogue image signal amplified by the amplifier 62 into a digital image signal, and a correction part 66 which generates a color measuring image signal for measuring and restoring the color of the object to be measured by applying the gray scale correction to the image signal inputted from the A/D converter 63 and a shape measuring image signal for measuring and restoring the three-dimensional shape of the object to be measured and outputs these image signals to the main device.

In the image pick-up unit 60 having such a constitution, the CCD interface 31 is constituted of the amplifier 62, the A/D converter 63 and the correction part 66, and the image signal is outputted to the main device from the CCD interface 31.

Further, the main device of the first embodiment houses the color and shape extracting part which restores the three-dimensional image of the object to be measured using the color of the object to be measured which is restored based on the color measuring image signal inputted from the image pick-up unit 60 and the three-dimensional model which restores the three-dimensional shape of the object to be measured based on the shape measuring signal inputted from the image pick-up unit 60.

The correction part 66 includes a first correction part which is constituted of a first correction circuit 64 for converting the image signal inputted from the A/D converter 63 into the color measuring image signal by first correction in accordance with a first gray scale characteristic, and an amplifier 64a which amplifies the color measuring image signal outputted by the first correction circuit 64 and outputs the amplified color measuring image signal to the main device. The correction part 66 also includes a second correction part which is constituted of a second correction circuit 65 for converting the image signal inputted from the A/D converter 63 into the shape measuring image signal by second correction in accordance with a second gray scale characteristic, and an amplifier 65a which amplifies the shape measuring image signal outputted by the second correction circuit 65 and outputs the amplified shape measuring image signal to the main device.

Here, the first gray scale characteristic means non-linear gamma characteristic which conforms to non-linear display characteristic of the monitor LCD 10, and the second gray scale characteristic means gamma characteristic which has linear characteristic at least a portion thereof and, has non-linear or linear characteristic in other portions.

Particularly, the second gray scale characteristic possesses three characteristic patterns shown in FIG. 7. In performing the second correction in the image pick-up unit 60, one characteristic pattern selected corresponding to the distribution characteristic of brightness of the image picked up by the CCD 22 is used.

Figure 7A:
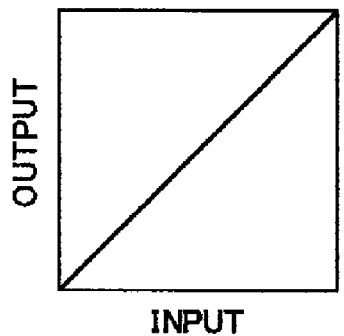
FIG. 7 is an explanatory view showing a second gray scale characteristic.

Here, FIG. 7A shows a characteristic pattern which has the linear characteristic over the whole area thereof. When both of a portion having low brightness (dark) and a portion having high brightness (bright) exist in the picked-up image, the second correction is performed in accordance with the characteristic pattern.

Figure 7B:
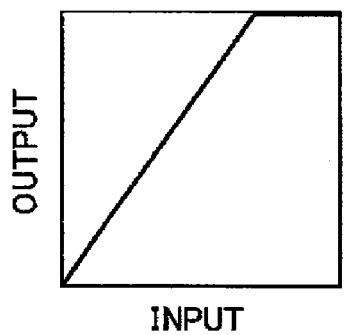
Figure 7C:
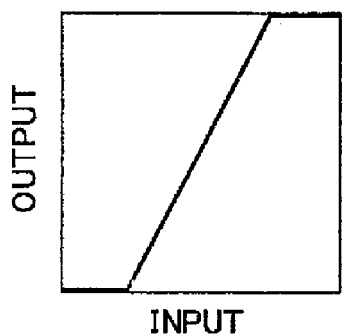

Further, FIG. 7B and FIG. 7C show a characteristic pattern which has the linear characteristic at a portion thereof. When a portion having extremely high brightness does not exist in the picked-up image, the second correction is performed in accordance with the characteristic pattern shown in FIG. 7B, while when neither a portion having extremely high brightness nor a portion having extremely low brightness exists, the second correction is performed in accordance with the characteristic pattern shown in FIG. 7C.

By generating the shape measuring image signal by the second correction in accordance with the characteristic pattern which has linear characteristic at the portion thereof, a dynamic range of the shape measuring image signal can be enlarged and hence, the three-dimensional shape of the object to be measured can be measured more finely whereby the shape measuring image signal which can faithfully reproduce the actual shape of the object to be measured can be generated.

In the first correction part, the first correction circuit 64 and the amplifier 64a are operated to convert the image signal into the color measuring image signal and to output the color measuring image signal. When the patterned light is not projected by the projection part 13 which functions as a patterned light projection part, the first correction part applies the first correction to the image signal which the CCD 22 constituting the image pick-up part forms by picking up an image of the object to be measured and outputs in accordance with the first gray scale characteristic so as to convert the image signal into the color measuring image signal.

Further, the image signal which the first correction part corrects includes plural kinds of color signals and plural kinds of brightness signals, and the first correction part performs the first correction for every color signal included in the image signal and, at the same time, applies the first correction to the brightness signal included in the image signal.

Further, in the second correction part, the second correction circuit 65 and the amplifier 65a are operated to output the shape measuring image signal. When the patterned light is projected by the projection part 13 which functions as a patterned light projection part, the first correction part applies the second correction to the image signal which the CCD 22 constituting the image pick-up part forms by picking up an image of the object to be measured and outputs in accordance with the second gray scale characteristic so as to convert the image signal into the shape measuring signal.

Further, the image signal which the second correction part corrects includes plural kinds of color signals and brightness signals, and the second correction part performs the second correction for every color signal included in the image signal and, at the same time, performs the second correction with respect to the brightness signal included in the image signal.

Further, the main device includes a selection part which selects either one of the color and shape measuring image signal and the shape measuring image signal outputted from the image pick-up unit 60 and outputs the selected image signal to the color and shape extracting part. Here, with respect to the selection of the image signal by the selection part, when the patterned light pickup program 36b is executed by the processing part 15, either one of the color and shape measuring image signal and the shape measuring image signal is selected based on a control performed by the CPU 35. That is, in the main device, the processing part 15 performs a function of the selection part.

To be more specific, in the main device, when the patterned light imaging program 36b is executed by the processing part 15 and the patterned light non-illuminated image is acquired, the first correction part and the main device are connected to each other based on a control performed by the CPU 35 whereby the color measuring image signal is selected.

On the other hand, in the main device, when the patterned light imaging program 36b is executed by the processing part 15 and the patterned light illuminated image is acquired, the second correction part and the main device are connected based on a control performed by the CPU 35 whereby the shape measuring image signal is selected.

In this manner, in the first embodiment, the correction part including the first correction part and the second correction part is provided to the image pick-up unit 60 and, at the same time, the selection part is provided to the main device. Accordingly, the three-dimensional color and shape measuring device can perform not only the formation of the three-dimensional image which faithfully reproduces the color and the three-dimensional shape of the object to be measured by the color and shape extracting part but also the reduction of a processing burden imposed on the processing part 15 of the main device in performing processing for correcting the image signal thus realizing the acceleration of the three-dimensional color and shape measuring processing by the three-dimensional color and shape measuring device 1.

Here, the camera control program 36a is explained in conjunction with FIG. 8. Due to the execution of the camera control program 36a by the computer, the main processing is executed.

In the main processing, first of all, in step S601, the power source including the battery 26 is turned on. Next, in step S602, the processing part 15, the peripheral interface and the like are initialized.

Subsequently, in step S603, key scanning for determining an operation state of the mode changeover switch 9 is performed and, thereafter, in step S604, it is determined whether or not the digital camera mode is selected by the operation of the mode changeover switch 9. When the digital camera mode is selected, the determination is affirmative so that, in step S605, the digital camera processing described later is executed.

On the other hand, when the digital camera mode is not selected by the operation of the mode changeover switch 9, the determination in step S604 is negative so that, in step S606, it is determined whether or not the webcam mode is selected by the operation of the mode changeover switch 9. When the webcam mode is selected, the determination is affirmative so that, in step S607, the webcam processing described later is executed.

On the other hand, when the webcam mode is not selected by the operation of the mode change over switch 9, the determination in step S606 is negative so that, in step S608, it is determined whether or not the stereoscopic image mode is selected by the operation of the mode change over switch 9. When the stereoscopic image mode is selected, the determination is affirmative so that, in step S609, the stereoscopic image processing described later is executed.

On the other hand, when the stereoscopic image mode is not selected by the operation of the mode changeover switch 9, the determination in step S608 is negative so that, in step S610, it is determined whether or not the planation image mode is selected by the operation of the mode change over switch 9. When the planation image mode is selected, the determination is affirmative so that, in step S611, the planation image processing described later is executed.

On the other hand, when the planation image mode is not selected by the operation of the mode changeover switch 9, the determination in step S610 is negative so that, in step S612, it is determined whether or not the OFF mode is selected by the operation of the mode changeover switch 9. This time, when the OFF mode is selected by the operation of the mode changeover switch 9, the determination is affirmative so that, the main processing this time is immediately finished. However, when the OFF mode is not selected by the operation of the mode change over switch 9, the determination is affirmative so that, the processing returns to step S603.

Figure 9:
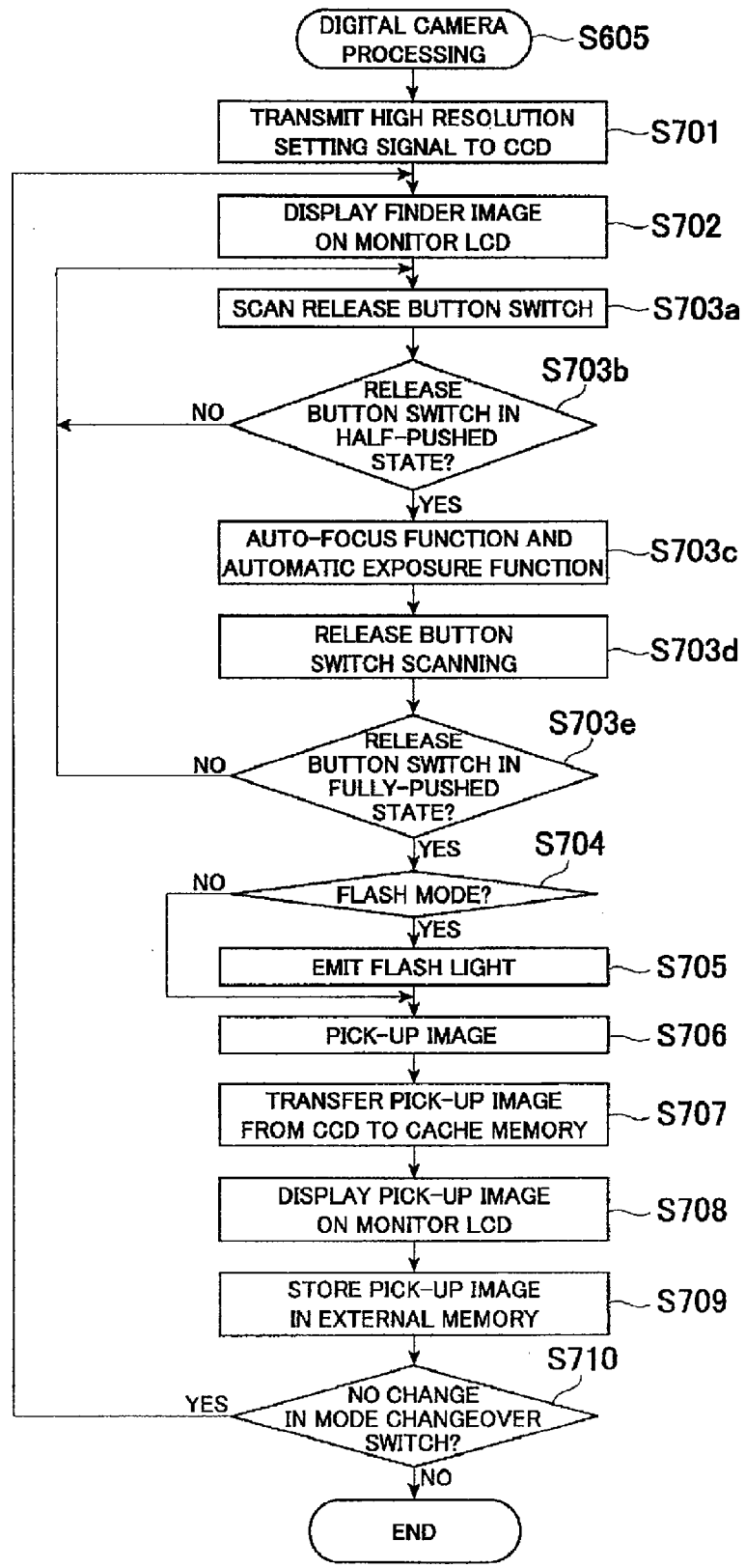
FIG. 9 is a flow chart conceptually showing the digital camera processing which is executed in step S605 in FIG. 8.

FIG. 9 conceptually describes step S605 in FIG. 8 as a digital camera processing routine using a flow chart. Due to the execution of the digital camera processing routine, the digital camera processing which acquires an image picked up by the image pick-up part 14 is executed.

In the digital camera processing, first of all, in step S701, a high resolution setting signal is transmitted to the CCD 22. Accordingly, a high quality pick-up image can be provided to the user.

Next, in step S702, a finder image, that is, an image equal to an image in a range viewed through the finder 6, is displayed on the monitor LCD 10. Accordingly, the user can, without looking into the finder 6, confirm a pick-up image (pick-up image range) by viewing the image displayed on the monitor LCD 10 before the actual image pickup operation.

Subsequently, in step S703a, the operation state of the release button switch 8 is scanned and, thereafter, in step S703b, based on the scanning result, it is determined whether or not the release button switch 8 assumes a half-pushed state. When the release button switch 8 assumes the half-pushed state, the determination is affirmative so that, in step S703c, an auto-focus (AF) function and an automatic exposure (AE) function are started and hence, focusing, stop and a shutter speed are adjusted. In step S703b, it is determined whether or not the release button switch 8 is moved to the half-pushed state. When the release button switch 8 is not shifted to the half-pushed state, the determination in step S703b is negative so that, the processing returns to step S703a.

After step S703c is executed, in step S703d, the operation state of the release button switch 8 is scanned again and, thereafter, in step S703e, based on the scanning result, it is determined whether or not the release button switch 8 assumes a fully-pushed state. In step S703e, it is determined whether or not the release button switch 8 is moved to the fully-pushed state. When the release button switch 8 is not moved to the fully-pushed state, the determination in step S703e is negative so that, the processing returns to step S703a.

When the release button switch 8 is shifted to the fully-pushed state from the half-pushed state, the determination in step S703e is affirmative so that, in step S704, it is determined whether or not a flash mode is selected. When the flash mode is selected, the determination is affirmative so that, in step S705, the flash 7 is allowed to emit light, while when the flash mode is not selected, the determination in step S704 is negative so that, step S705 is skipped.

Thereafter, in step S706, an image of the object to be measured is picked up. Subsequently, in step S707, the pick-up image formed by picking up the image of the object to be measured is transferred to and stored in the cache memory 28 from the CCD 22. Then, in step S708, the pick-up image stored in the cache memory 28 is displayed on the monitor LCD 10. In this embodiment, the pick-up image is transferred to the cache memory 28 and hence, compared to a case in which the pick-up image is transferred to the main memory, the pick-up image can be rapidly displayed on the monitor LCD 10. Subsequently, in step S709, the pick-up image is stored in the external memory 27.

Thereafter, in step S710, it is determined whether or not the operation state of the mode changeover switch 9 is changed. When the operation state of the mode changeover switch 9 is not changed, the determination is affirmative so that, the processing returns to step S702, while when the operation state of the mode changeover switch 9 is changed, the determination in step S710 is negative so that, the digital camera processing this time is finished.

Figure 10:
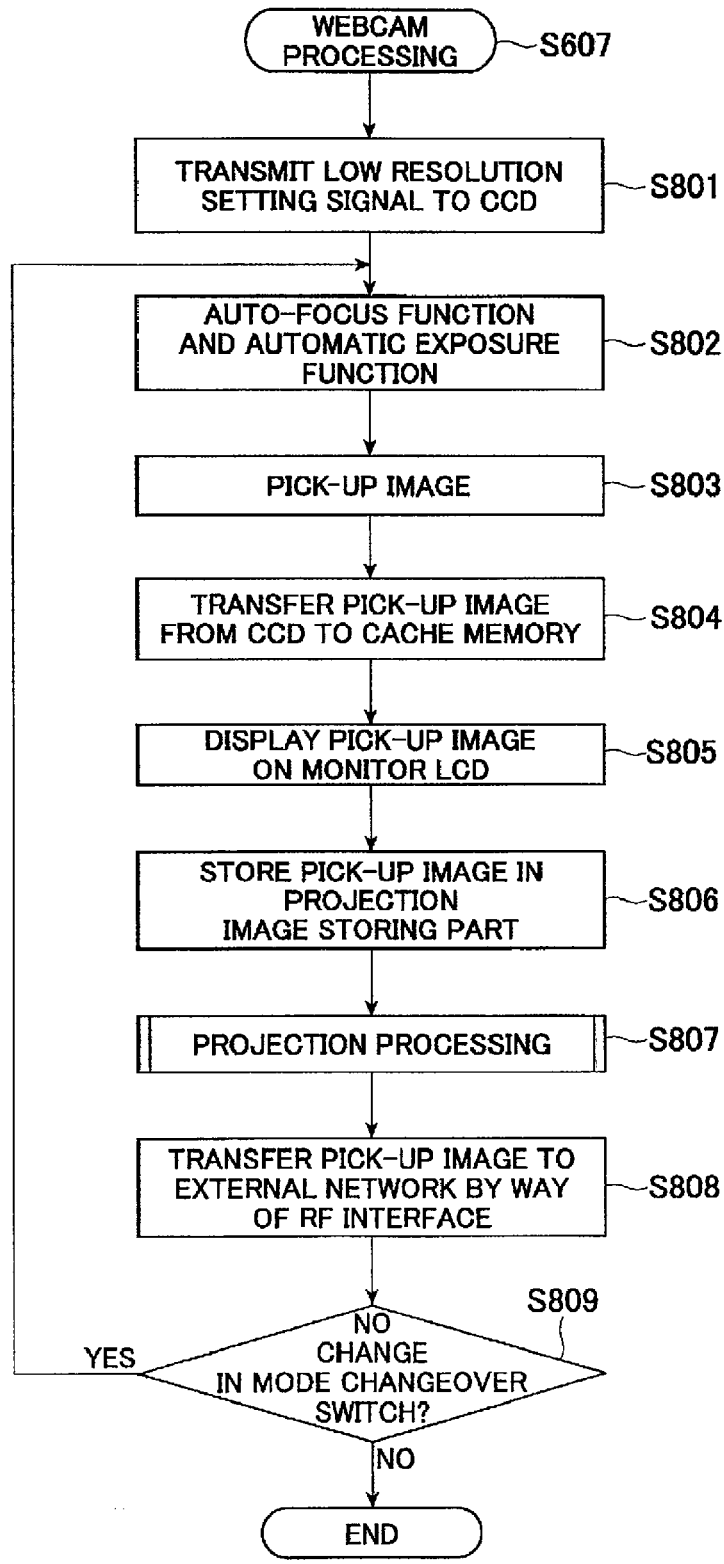
FIG. 10 is a flow chart conceptually showing the webcam processing which is executed in step S607 in FIG. 8.

FIG. 10 conceptually shows step S607 in FIG. 8 as a webcam processing routine using a flow chart. Due to the execution of the webcam processing routine, the webcam processing which transmits a pick-up image (including a still image and a moving image) picked up by the image pick-up part 14 to an external network is executed. In this embodiment, considered is a case in which, as a pick-up image, a moving image is transmitted to the external network (for example, the Internet) not shown in the drawing.

In the webcam processing, first of all, in step S801, a low resolution setting signal is transmitted to the CCD 22. Next, in step S802, the auto-focus function and the automatic exposure function are started and hence, focusing, stop and a shutter speed are adjusted. Subsequently, in step S803, an image of the object to be measured is picked up.

Thereafter, in step S804, the pick-up image is transferred to the cache memory 28 from the CCD 22 and, subsequently, in step S805, the pick-up image is displayed on the monitor LCD 10.

Thereafter, in step S806, the pick-up image is stored in the projection image storing part 37k. Subsequently, in step S807, the projection processing described later is executed so as to project the image stored in the projection image storing part 37k on the projection surface.

Thereafter, in step S808, the pick-up image transferred to the cache memory 28 is transmitted to the external network by way of a RF interface not shown in the drawing.

Subsequently, in step S809, it is determined whether or not the operation state of the mode changeover switch 9 is changed. When the operation state of the mode changeover switch 9 is not changed, the determination is affirmative so that, the processing returns to step S802, while when the operation state of the mode changeover switch 9 is changed, the determination in step S809 is negative so that, the webcam processing this time is finished.

Figure 11:
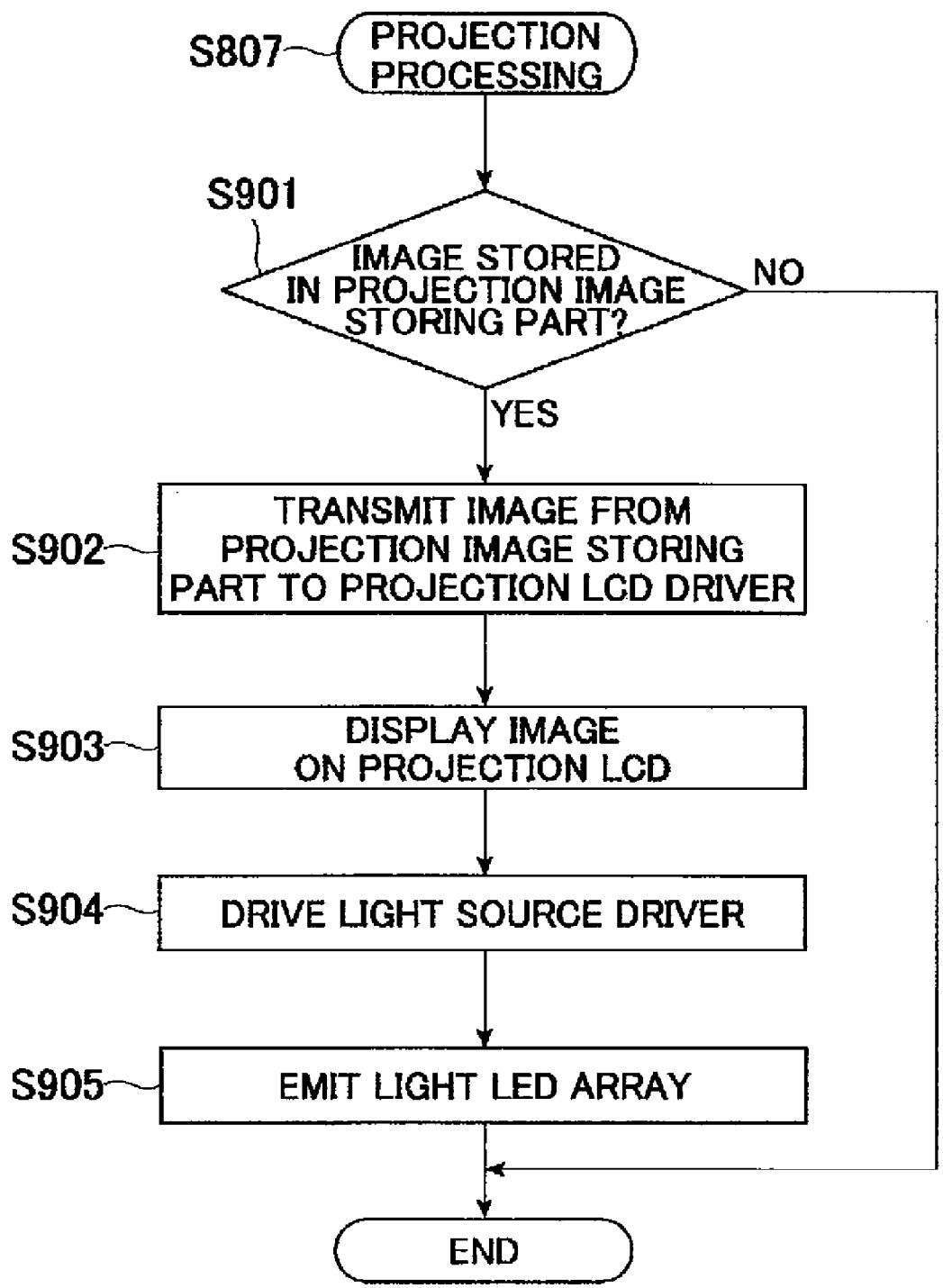
FIG. 11 is a flow chart conceptually showing the projecting processing which is executed in step S807 in FIG. 10.

FIG. 11 conceptually shows step S807 in FIG. 10 as a projection processing routine using a flow chart. Due to the execution of the projection processing routine, the projection processing which projects the image stored in the projection image storing part 37k on the projection surface from the projection part 13 is executed.

In this projection processing, first of all, in step S901, it is determined whether or not the image is stored in the projection image storing part 37k. When the image is not stored, the determination is negative so that, the projection processing this time is immediately finished. On the other hand, when the image is stored, the determination is affirmative so that, in step S902, the image stored in the projection image storing part 37k is transmitted to the projection LCD driver 30. Subsequently, in step S903, an image signal corresponding to the stored image is transmitted to the projection LCD 19 from the projection LCD driver 30 and hence, the image is displayed on the projection LCD 19.

Thereafter, in step S904, the light source driver 29 is driven and, subsequently, in step S905, the LED array 17A emits light in response to an electric signal from the light source driver 29. With the above-mentioned steps, the projection processing of this time is finished.

The light emitted from the LED array 17A passes through the light source lens 18 and reaches the projection LCD 19. To the projection LCD 19, a space modulation corresponding to the image signal transmitted from the projection LCD driver 30 is applied. As a result, a light incident on the projection LCD 19 is converted into an image signal light and the converted image signal light is outputted. The image signal light outputted from the projection LCD 19 passes through the projection optical system 20 and is projected on the projection surface as a projection image.

Figure 12:
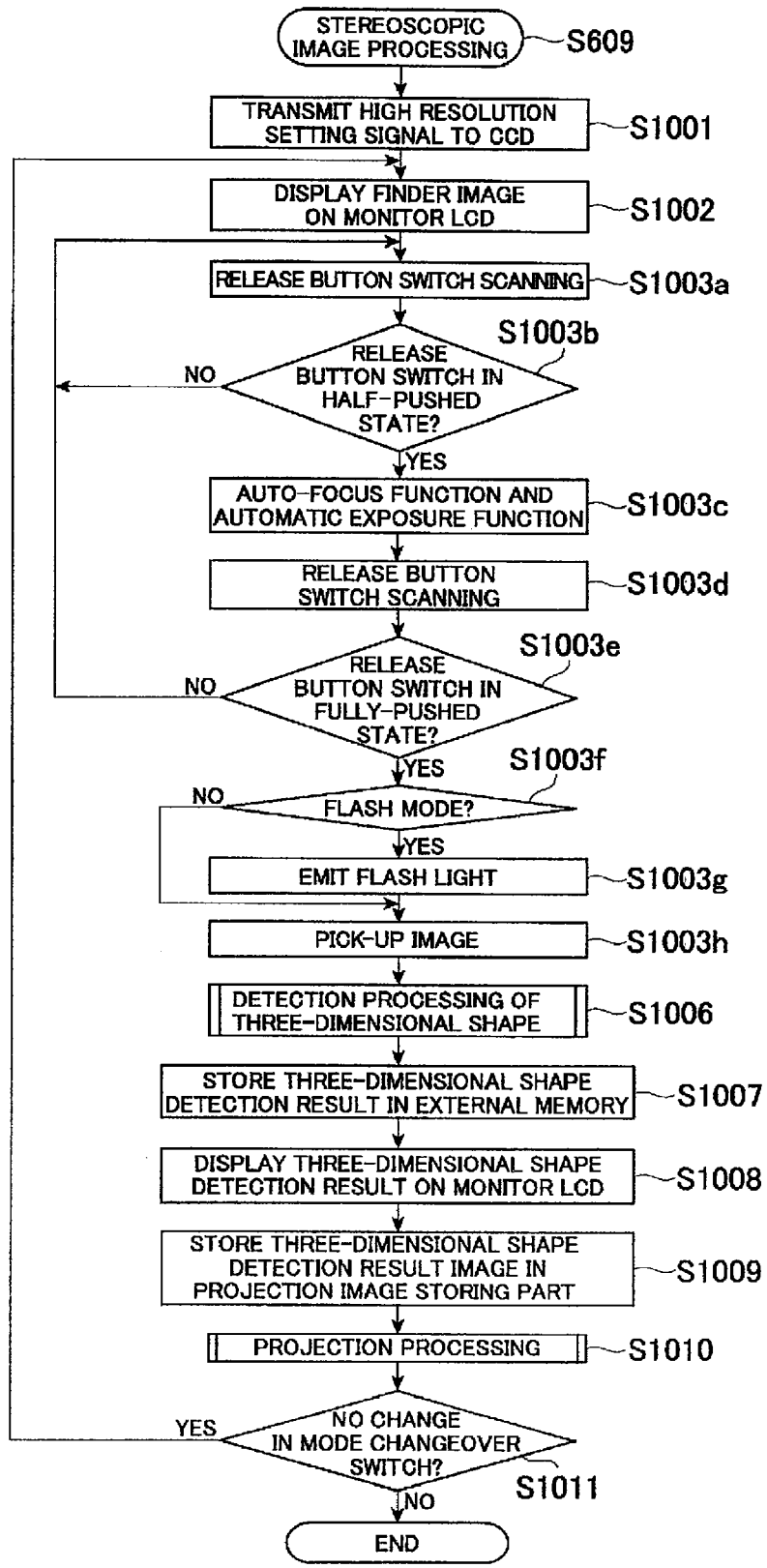
FIG. 12 is a flow chart conceptually showing the stereoscopic image processing which is executed in step S609 in FIG. 8.

FIG. 12 conceptually shows step S609 in FIG. 8 as a stereoscopic image processing routine using a flow chart. Due to the execution of the stereoscopic image processing routine, the stereoscopic image processing in which the three-dimensional shape of the object to be measured is detected, and a three-dimensional-shape detection result image which is a stereoscopic image of the three-dimensional shape is acquired, displayed and projected is performed.

In the stereoscopic image processing, first of all, in step S1001, a high resolution setting signal is transmitted to the CCD 22. Next, steps S1002 to S1003*h* are executed in the same manner as steps S702 to S706 shown in FIG. 9.

To be more specific, in step S1002, a finder image is displayed on the monitor LCD 10. Subsequently, in step S1003*a*, an operation state of the release button switch 8 is scanned and, thereafter, in step S1003*b*, based on the scanned result, it is determined whether or not the release button switch 8 assumes a half-pushed state. When the release button switch 8 assumes the half-pushed state, the determination is affirmative so that, in step S1003*c*, an auto-focus (AF) function and an automatic exposure (AE) function are started.

After processing in step S1003*c* is executed, in step S1003*d*, the operation state of the release button switch 8 is scanned again and, thereafter, in step S1003*e*, based on the scanned result, it is determined whether or not the release button switch 8 assumes a fully-pushed state.

When the release button switch 8 is shifted to the fully-pushed state from the half-pushed state, the determination in step S1003*e* is affirmative so that, in step S1003*f*, it is determined whether or not a flash mode is selected. When the flash mode is selected, the determination is affirmative so that, in step S1003*g*, the flash 7 is allowed to emit light, while when the flash mode is not selected, the determination in step S1003*f* is negative so that, step S1003*g* is skipped. In any case, thereafter, in step S1003*h*, an image of the object to be measured is picked up.

Subsequently, in step S1006, the three-dimensional shape detection processing described later is executed and hence, the three-dimensional shape of the object to be measured is detected.

Thereafter, in step S1007, the three-dimensional shape detection result acquired by the three-dimensional shape detection processing is stored in the external memory 27. Subsequently, in step S1008, the three-dimensional shape detection result is displayed on the monitor LCD 10 as a three-dimensional computer graphic image (three-dimensional image of object to be measured). Here, the three-dimensional shape detection result means a mass of vertex coordinates acquired as a result of conversion of a plurality of space code boundary images detected in a space coded image described later into three-dimensional coordinates.

Thereafter, in step S1009, a polygonal figure which passes a plurality of measured vertexes which constitute the three-dimensional shape detection result is assumed, and a three-dimensional shape detection result image which is a stereoscopic image (three-dimensional computer graphic image) which expresses surfaces of the assumed polygonal figure is stored in the projection image storing part 37*k*.

Subsequently, in step S1010, the projection processing similar to the projection processing in step S807 shown in FIG. 10 is executed.

Thereafter, in step S1011, it is determined whether or not an operation state of the mode changeover switch 9 is changed. When the operation state of the mode changeover switch 9 is not changed, the determination is affirmative so that, the processing returns to step S1002, while when the operation state of the mode changeover switch 9 is changed, the determination in S1011 is negative so that, the stereoscopic image processing this time is finished.

Figure 13A:
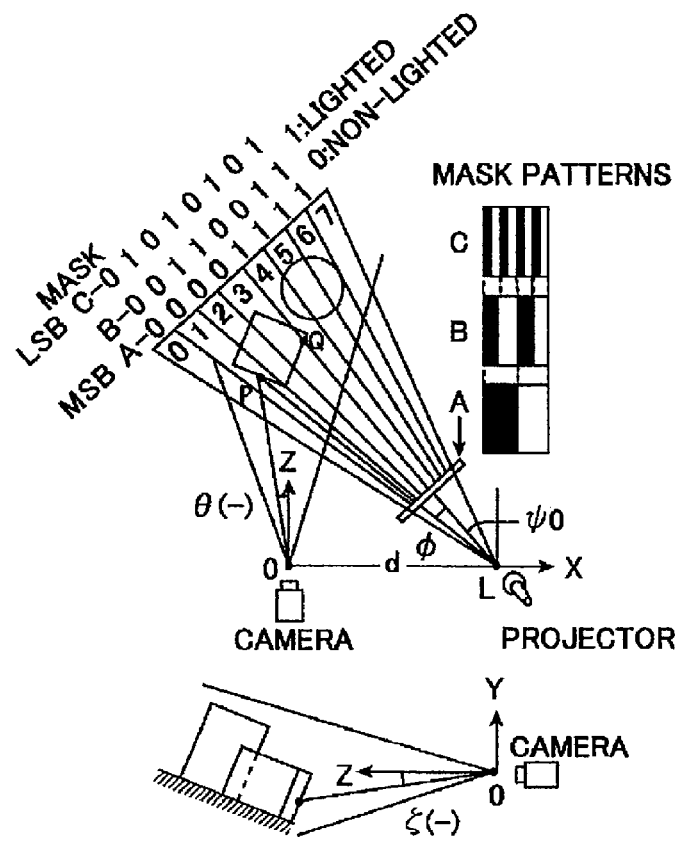
FIG. 13A are a plan view and a side view for explaining the principle of a space coding method which is adopted in the stereoscopic image processing in FIG. 12.
Figure 13B:
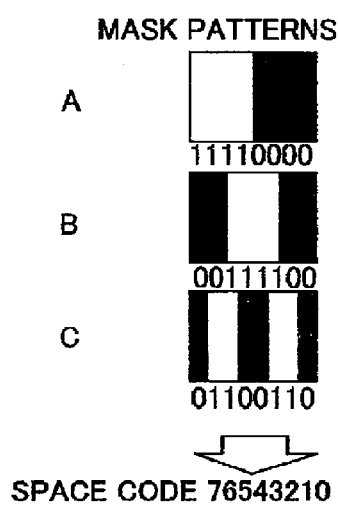
FIG. 13B is a plan view showing two sets of mask patterns.

In the three-dimensional shape detection processing executed in step S1006 in FIG. 12, the three-dimensional shape of the object to be measured is detected using a space coding method. Hereinafter, the space coding method is explained in conjunction with FIG. 13A and FIG. 13B. FIG. 13A is constituted of a view showing a real space in which the three-dimensional coordinate system XYZ is set as viewed in the Y coordinate axis direction, a view showing the real space as viewed in the X coordinate axis direction, and a view showing three kinds of mask patterns A, B, C based on a pure binary code. On the other hand, FIG. 13B shows three kinds of mask patterns A, B and C based on a gray code and a plurality of space codes.

As shown in FIG. 13A, the space coding method is a kind of method which detects a three-dimensional shape of an object to be measured by applying the principle of triangulation to the relationship among an observation image which is an image of the object to be measured as an object to be observed, a projection light source (for example, projector) which projects light (diffused light) on the object to be measured and an observer (for example, a camera) which observes the object to be measured. In the space coding method, as shown in FIG. 13A, the projection light source L (PROJECTOR) and the observer O (CAMERA) are arranged in a spaced-apart manner from each other by a distance d. Accordingly, an arbitrary point P within an observation space can be specified by measuring the direction φ of the projected light and the direction θ as viewed from the observer O. In the space coding method, further, for specifying an arbitrary position on a surface of the object to be measured, the observation space is divided into a plurality of elongated fan-shaped regions and these regions are coded.

To acquire a code of the arbitrary position on the surface of the object to be measured from the observation image, plural kinds of stripe-shaped patterned lights are projected on the object to be measured time-sequentially. The patterned light is mechanically changed over by preparing masks the number of which is equal to the number of the kinds of patterned lights and by mechanically exchanging the masks or is electrically changed over by forming stripe-shaped light shutter rows using a material having an opt-electric control of the light transmittance of respective stripes of the light shutter rows. In this embodiment, the latter electronic patterned-light change over method is adopted. To be more specific, the plural kinds of mask patterns are reproduced, that is, displayed time-sequentially by the projection LCD 19.

In the example shown in FIG. 13A, a mask is exchangeably arranged between the projection light source L and the object to be measured (a column having a quadrangular cross-section and a column having a circular cross-section). In this example, three kinds of masks A, B and C which differ in pattern from each other are provided. Accordingly, three kinds of patterned light are projected on the object to be measured time-sequentially.

When the patterned light generated using each masks A, B, C is projected on the object to be measured, each one of eight fan-shaped regions is coded to either a bright region "1" or a dark region "0". When the light which passes through three masks A, B, C is projected on the object to be measured sequentially in order of A, B, C, a code of three bits is allocated to each fan-shaped region. The three bits are sequentially arranged from the most significant bit MSB which corresponds to the first mask A to the least significant bit LSM which corresponds to the last mask C. For example, in the example shown in FIG. 13A, in the fan-shaped region to which the point P belongs, the light is blocked by the masks A and B, while the light is allowed to pass through only the mask C to form the fan-shaped region into a bright region and hence, the fan-shaped region is coded to a code as "001(A□0, B□0, C□1)".

In this manner, the code corresponding to the direction φ from the projection light source L is allocated to each fan-shaped region. On the other hand, when each bit plane of the memory is constituted by binarizing the bright and dark pattern of the object to be measured on which each patterned light is projected for each mask, the position (address) of each bit plane image in the lateral direction corresponds to the direction θ from the observer O. Further, to focus on the memory contents of three bit planes respectively corresponding to three masks for every bit (every pixel), a code of three bits is acquired for every pixel. From the code, the direction φ of each fan-shaped region from the projection light source L is specified. Under a circumstance where the distance d is known, when the directions φ and θ are specified, using the principle of triangulation, the three-dimensional coordinates of an attention point on the surface of the object to be measured are specified.

FIG. 13A shows an example in which the space is coded using pure binary codes using a plurality of masks such as masks A, B and C, while FIG. 13B shows an example in which the space is coded using a gray code in which a hamming distance between neighboring codes is always set to 1 using a plurality of masks such as masks A, B and C as a space code.

In this embodiment, the above-mentioned three-dimensional shape detection processing may adopt either one of the space coding method which uses pure binary codes or the space coding method which uses the gray code.

The detail of the space coding method is disclosed in, for example, "Kukankodoka ni yoru Kyorigazo Nyuryoku (Inputting of Distance Image using Spacing Coding)" in Denshi Tsushin Gakkai RonbunShi (Journal of Institute of Electronics and Communication Engineers of Japan), 85/3 Vol□J 68-D No 3 p 369 to 375, by Kohsuke Satoh and one other.

Figure 14:
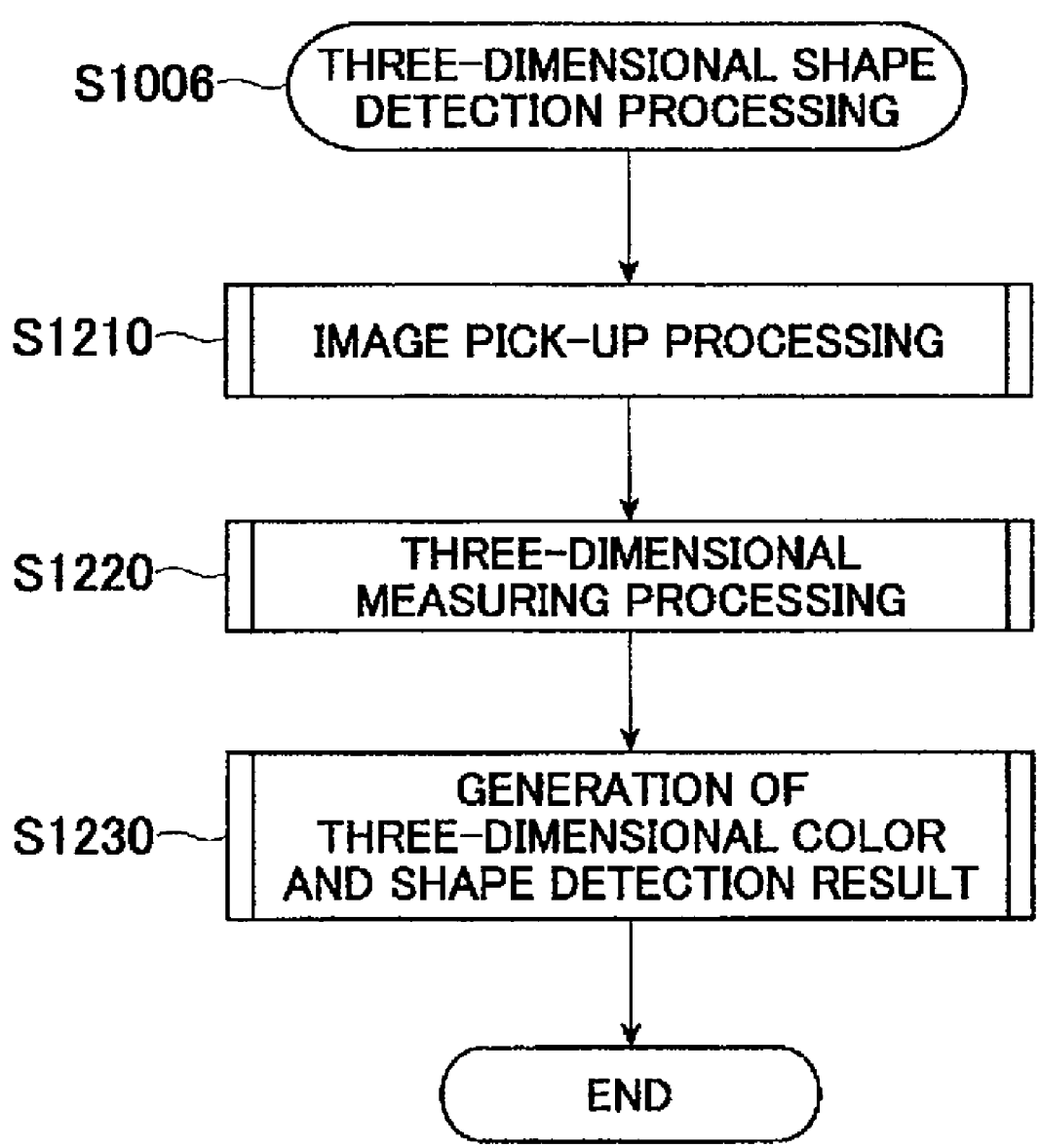
FIG. 14 is a flow chart conceptually showing the three-dimensional shape detection processing executed in step S1006 in FIG. 12 as a FIG. 15 is a flow chart conceptually showing the processing as an image pick-up processing sub routine executed in step S1210 in FIG. 14.

FIG. 14 conceptually shows step S1006 in FIG. 12 as a three-dimensional shape detection processing routine using a flow chart.

In the three-dimensional shape detection processing routine, first of all, in step S1210, the image pick-up processing is executed. When the image pick-up processing is executed, for example, by making use of a plurality of gray code mask patterns shown in FIG. 13B, stripe-shaped patterned light (see FIG. 1) is projected on the object to be measured from the projection part 13 time-sequentially. Further, a plurality of patterned light illuminated images acquired by picking up images of the object to be measured on which plural kinds of patterned light are projected and one patterned light non-illuminated image acquired by picking up the same object to be measured on which the patterned light is not projected are acquired.

When the image pick-up processing is finished, in step S1220, the three-dimensional measuring processing is executed. When the three-dimensional measuring processing is executed, by making use of the plurality of patterned light illuminated images and one patterned light non-illuminated image acquired by the above-mentioned image pick-up processing, the three-dimensional shape of the object to be measured is actually measured.

Subsequently, in step S1230, by combining the three-dimensional shape measured and the surface color with respect to the object to be measured, a three-dimensional color and shape detection result is generated. This step S1230 is described later in detail in conjunction with FIG. 19. When the three-dimensional color and shape detection result is generated, the three-dimensional color and shape detection result of this time is finished.

Figure 15:
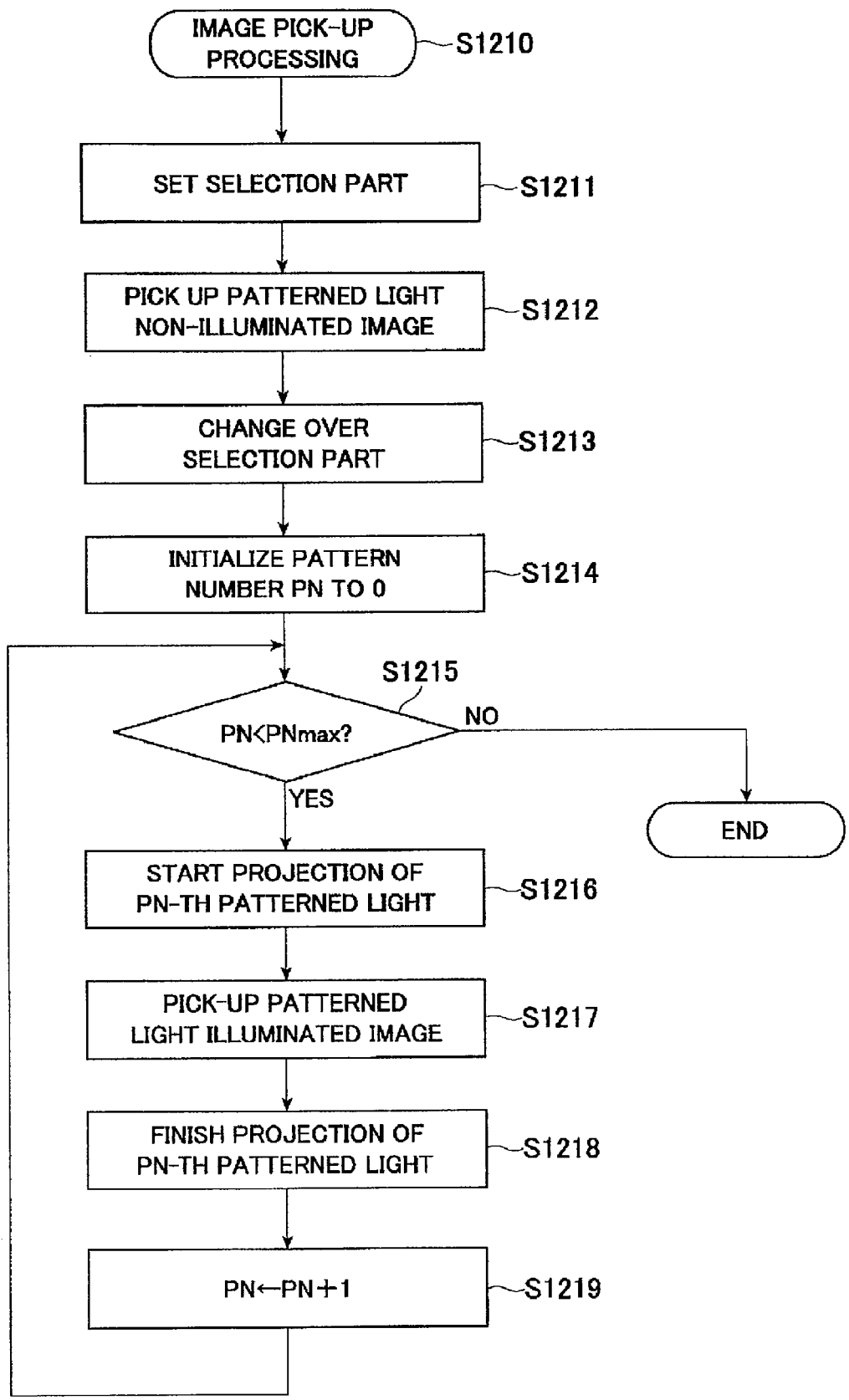

FIG. 15 conceptually shows step S1210 in FIG. 14 as an image pick-up processing sub routine using a flow chart.

In this image pick-up processing sub routine, first of all, in step S1211, the setting processing by the selection part is executed. That is, in step S1211, the setting by the selection part is performed based on a control performed by the CPU 35 of the processing part 15 so that, out of two kinds of image signals (color measuring image signal and shape measuring image signal) outputted by the image pick-up unit 60, the color measuring image signal is selected.

Next, in step S1212, due to the execution of the patterned light imaging program 36b, without projecting the patterned light on the object to be measured from the projection part 13, one patterned light non-illuminated image is acquired by picking up an image of the object to be measured by the image pick-up part 14.

The patterned light non-illuminated image acquired here is formed based on a color measuring image signal which is formed by amplifying the color measuring image signal to which the first correction is applied by the image pick-up unit 60 using the amplifier 64a. The patterned light non-illuminated image is stored in the patterned light non-illuminated image storing part 37b.

Next, in step S1213, the processing for changing over the selection part is executed. That is, in step S1213, the changeover of the selection part is performed based on a control performed by the CPU 35 of the processing part 15, and out of the two kinds of image signals (color measuring image signal and shape measuring image signal) outputted by the image pick-up unit 60, the shape measuring image signal is selected.

Next, in step S1214, a pattern number PN indicative of the number of mask pattern used for forming the patterned light is initialized to 0. Subsequently, in step S1215, it is determined whether or not the present value of the pattern number PN is smaller than the maximum value PNmax. The maximum value PNmax is determined corresponding to the total number of the mask patterns which are used. For example, when eight kinds of mask patterns are used, the maximum value PNmax is set to 8.

This time, assuming that the present value of the pattern number PN is smaller than the maximum value PNmax, the determination in step S1215 is affirmative and, thereafter, in step S1216, out of the plural kinds of mask patterns which is used, the PNth mask pattern to which the same number as the present value of the pattern number PN is given is displayed on the projection LCD 19. In step S1216, further, the PNth patterned light which is formed using the PNth mask pattern is projected on the object to be measured. Subsequently, in step S1217, an image of the object to be measured on which the PNth patterned light is projected is picked up by the image pick-up part 14.

Due to such an image pick-up operation, the PNth patterned light illuminated image formed by picking up the image of the object to be measured on which the PNth patterned light is projected is acquired.

The patterned light illuminated image which is acquired this time is formed based on a shape measuring image signal formed by amplifying the shape measuring image signal to which the second correction is applied by the image pick-up unit 60 using the amplifier 65a. The acquired patterned light illuminated image is stored in the patterned light illuminated image storing part 37a in association with the corresponding pattern number PN.

When the image pick-up operation is finished, in step S1218, the projection of the PNth patterned light is finished and, subsequently, in step S1219, the pattern number PN is incremented by only 1 for projecting the next patterned light and, thereafter, the processing returns to step S1215.

As a result of repetition of the execution of processing in steps S1215 to S1219 the number of times which is equal to the number of kinds of patterned lights, when the present value of the pattern number PN becomes a value not smaller than the maximum value PNmax, the determination in S1215 is negative so that, the image pick-up processing of this time is finished. Accordingly, by executing the image pick-up processing one time, one patterned light non-illuminated image and the patterned light illuminated images the number of which is equal to the number of the maximum value PNmax are acquired.

Figure 16:
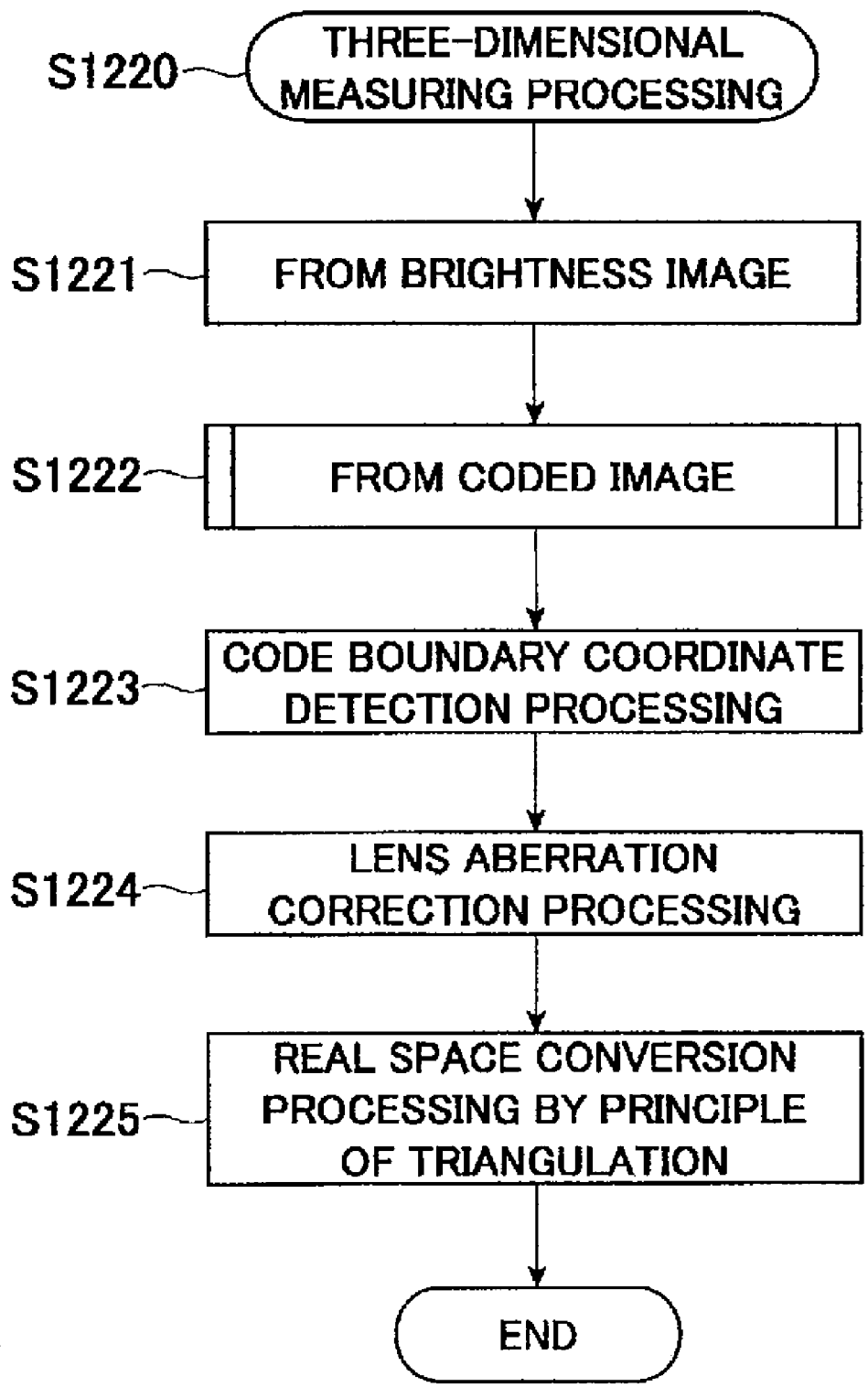
FIG. 16 is a flow chart conceptually showing the processing as three-dimensional measuring processing sub routine executed in step S1220

FIG. 16 conceptually shows step S1220 in FIG. 14 as three-dimensional measuring processing sub routine using a flow chart.

In the three-dimensional measuring processing sub routine, first of all, in step S1221, due to the execution of the brightness image forming program $36c$, a brightness image is formed. In step S1221, a brightness value is defined as a Y value in a YCbCr space and is calculated using a formula of $Y=0.2989 \cdot R+0.5866 \cdot G+0.1145 \cdot B$ based on RGB values of each pixel. By acquiring the Y value with respect to each pixel, a plurality of brightness images in association with the plurality of patterned light illuminated images and one patterned light non-illuminated image is formed. The formed brightness images are stored in the brightness image storing part $37c$ in association with the pattern number PN. However, a formula used for calculating a brightness value is not limited to the above-mentioned formula and can be suitably exchanged with other formula.

Next, in step S1222, the coded image forming program $36d$ is executed. When the coded image forming program $36d$ is executed, by combining the plurality of formed brightness images using the above-mentioned space coding method, a coded image in which a space code is allocated to every pixel is formed. The coded image is formed using binary image processing which compares the brightness images in association with the plural kinds of patterned light illuminated images stored in the brightness image storing part $37c$ and a threshold image in which a brightness threshold value is allocated to every pixel. The formed coded image is stored in the coded image storing part $37d$.

Figure 17:
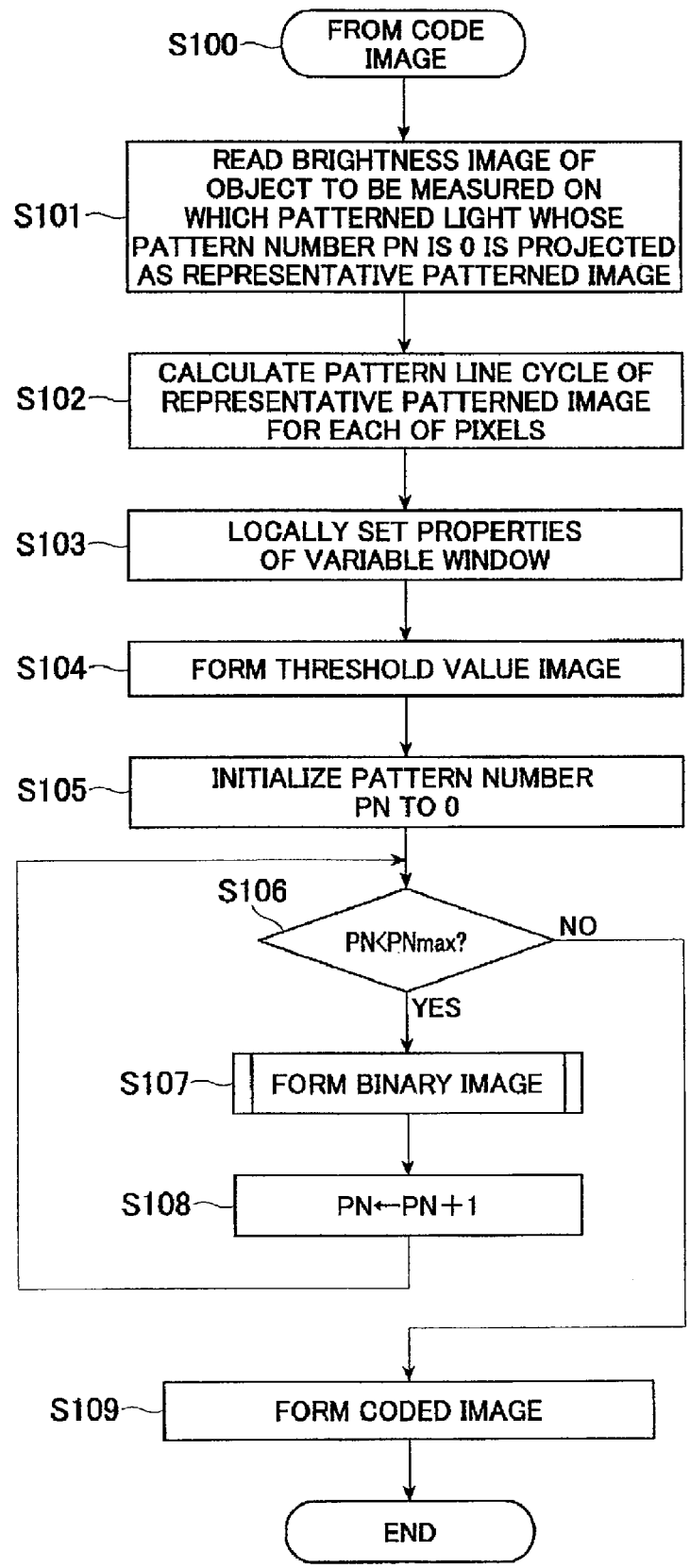
FIG. 17 is a flow chart conceptually showing the processing as a coded image forming program 36d executed in step S1222 in FIG. 16.

FIG. 17 conceptually shows the detail of the coded image forming program $36d$ using a flow chart. Hereinafter, the coded image forming program $36d$ is explained time-sequentially in conjunction with FIG. 17.

In the coded image forming program $36d$, first of all, in step S101, the brightness image formed by picking up an image of the object to be measured on which the patterned light whose pattern number PN is 0 is projected is read as a representative patterned image from the brightness image storing part $37c$.

Next, in step S102, with respect to the representative patterned image, based on the above-mentioned read brightness image, a pattern line period is calculated for each one of pixels which are continuously arranged in the columnar direction in the representative patterned image by the above-mentioned approach based on FFT conversion. The plurality of calculated pattern line periods is stored in the periodic distribution storing part $37p$ in association with the respective pixels (respective pixel positions in the columnar direction).

Subsequently, in step S103, based on the plurality of calculated pattern line periods, the property of a variable window VW is locally set. In this embodiment, a size of the variable window VW in the line direction is set such that the size is not changed irrespective of the position on the representative patterned image where the variable window VW is set, while a size of the variable window VW in the columnar direction is set to a value which is integer times as large as the pattern line period which is calculated in association with the respective pixel positions in the columnar direction.

Thereafter, in step S104, with respect to the representative patterned image, the variable window VW is set in plane along the line direction and the columnar direction and in association with the respective pixels. Accordingly, an average value of the brightness values of the plurality of pixels which exist in the inside of the variable window VW is calculated as a local threshold value for every pixel. In step S105, further, a threshold image in which the calculated threshold values are allocated to the respective pixels is formed. The formed threshold value image is stored in the threshold value image storing part $37q$.

Subsequently, in step S105, the pattern number PN is initialized to 0 and, thereafter, in step S106, it is determined whether or not the present value of the pattern number PN is smaller than the maximum value PNmax. Since the present value of the pattern number PN is 0 this time, the determination is affirmative so that the processing advances to step S107.

Figure 18:
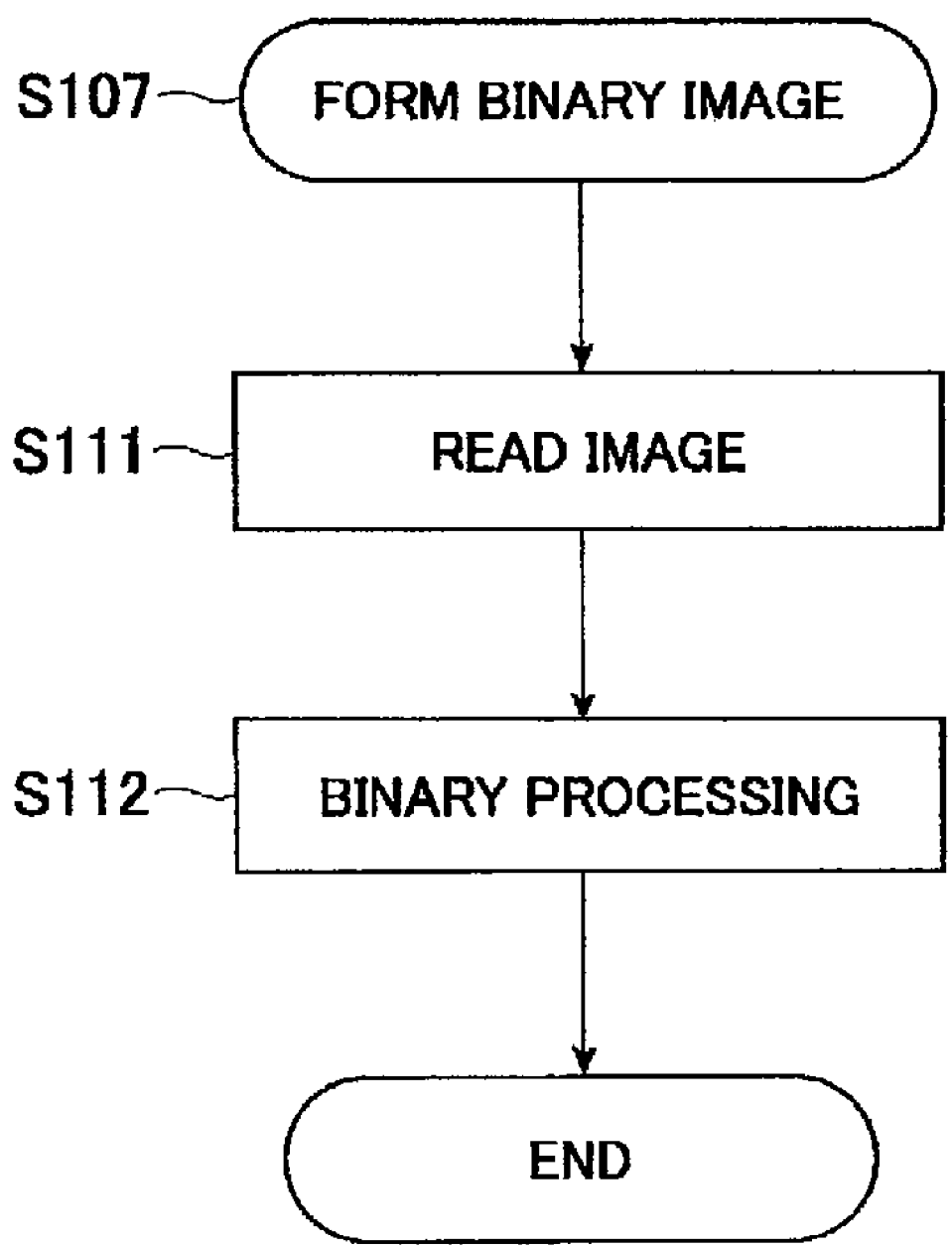
FIG. 18 is a flow chart conceptually showing the processing as a binary image forming sub routine executed in step S107 in FIG. 17.

In step S107, a binary image is formed in accordance with the binary image forming sub routine shown in FIG. 18.

Thereafter, in step S108, the pattern number PN is incremented by only 1. Subsequently, the processing returns to step S106, and it is determined whether or not the present value of the pattern number PN is smaller than the maximum value PNmax. This time also, when the present value of the pattern number PN is smaller than the maximum value PNmax, the determination is affirmative so that the processing advances to step S107.

As a result of repetition of the execution of processing in steps S106 to S108 the number of times equal to the number of kinds of patterned lights, when the present value of the pattern number PN becomes a value not smaller than the maximum value PNmax, the determination in step S106 is negative so that the processing advances to step S109.

In step S109, for every pixel, a pixel value ("1" or "0") is extracted from the binary images which is equal to the maximum value PNmax in number in order from the binary image corresponding to the brightness image whose pattern number PN is 0 to the binary image corresponding to the brightness image whose pattern number PN is (PNmax−1), and space codes which are arranged in order from the least significant bit LSM to the most significant bit MSB are generated. The number of bits of the space code for every pixel is equal to the number of the maximum value PNmax. The space code is generated for every pixel and hence, the space coded image corresponding to the object to be measured of this time is formed. The generated space codes are stored in the coded image storing part $37d$ in association with the respective pixel positions.

FIG. 18 conceptually shows step S107 in FIG. 17 as a binary image forming sub routine using a flow chart.

In the binary image forming sub routine, first of all, in step S111, an image is read from the brightness image storing part $37c$ and, subsequently, in step S112, the binarization processing is performed.

To be more specific, a brightness value of the brightness image to which the pattern number PN equal to the present value of the pattern number PN is allocated and the threshold value of the above-mentioned formed threshold image are compared to each other for every pixel. A comparison result is reflected to the binary image for every pixel. To be more specific, when the brightness value of the brightness image is larger than the threshold value, data indicative of "1" is stored in the binary image storing part $37r$ in association with the corresponding pixel position in the binary image and, while when the brightness value of the brightness image is not larger than the threshold value, data indicative of "0" is stored in the binary image storing part 37r in association with the corresponding pixel position in the binary image.

With the above-mentioned steps, the execution of one-round coded image forming program 36d is finished.

Thereafter, in step S1223 in FIG. 16, due to the execution of the code boundary extraction program 36e, the code boundary coordinate detection processing is performed. The coding using the above-mentioned space coding method is performed for every pixel unit and hence, there arises an error in accuracy of sub pixel order between the boundary line between a bright portion and a dark portion in actual patterned light and a boundary line of space codes in the above-mentioned formed coded image (boundary line between a region to which one space code is allocated and a region to which another space code is allocated). Accordingly, the code boundary coordinate detection processing is provided for detecting the boundary coordinate values of the space codes with accuracy of sub pixel order.

The detected code boundary coordinate value is stored in the code boundary coordinate storing part 37e. The code boundary coordinate value is defined by CCD coordinates ccdx-ccdy which is a two-dimensional coordinate system set on an imaging surface of the CCD 22.

Subsequently, in step S1224, due to the execution of the lens aberration correction program 36f, the lens aberration correction processing is performed. The lens aberration correction processing is executed for correcting an actual image-forming position of the optical flux incident on the image pick-up optical system 21 which is influenced by aberration of the image pick-up optical system 21 in a state that the actual image-forming position approaches an ideal image-forming position where the image is expected to be formed when the image pick-up optical system 21 is an ideal lens.

Due to the lens aberration correction processing, the code boundary coordinate value detected in step S1223 is corrected so that an error attributed to distortion of the image pick-up optical system 21 or the like is corrected. The code boundary coordinates corrected in this manner are stored in the aberration correction coordinate storing part 37g.

Both of the code boundary coordinate detection processing and the lens aberration correction processing are not prerequisite for understanding the present invention and are disclosed in detail in the specification of JP-A-2004-105426 by the applicant of the present invention. Accordingly, the detailed explanation of the code boundary coordinate detection processing and the lens aberration correction processing is omitted here by reference to JP-A-2004-105426.

Thereafter, in step S1225, due to the execution of the triangulation calculation program 36g, the real space conversion processing using the principle of triangulation is performed. When the real space conversion processing is performed, using the principle of triangulation, the above-mentioned code boundary coordinate value on the CCD coordinate system ccdx-ccdy to which the aberration correction is applied is converted into the three-dimensional coordinate value on the real space coordinate system X-Y-Z which is a three-dimensional coordinate system set in the real space and, as a result, the three-dimensional coordinate value is acquired as a three-dimensional shape detection result. The acquired three-dimensional coordinate value is stored in the three-dimensional coordinate storing part 37h, and the three-dimensional measuring processing is finished and, thereafter, the processing in step S1230 shown in FIG. 14 is performed.

Figure 19:
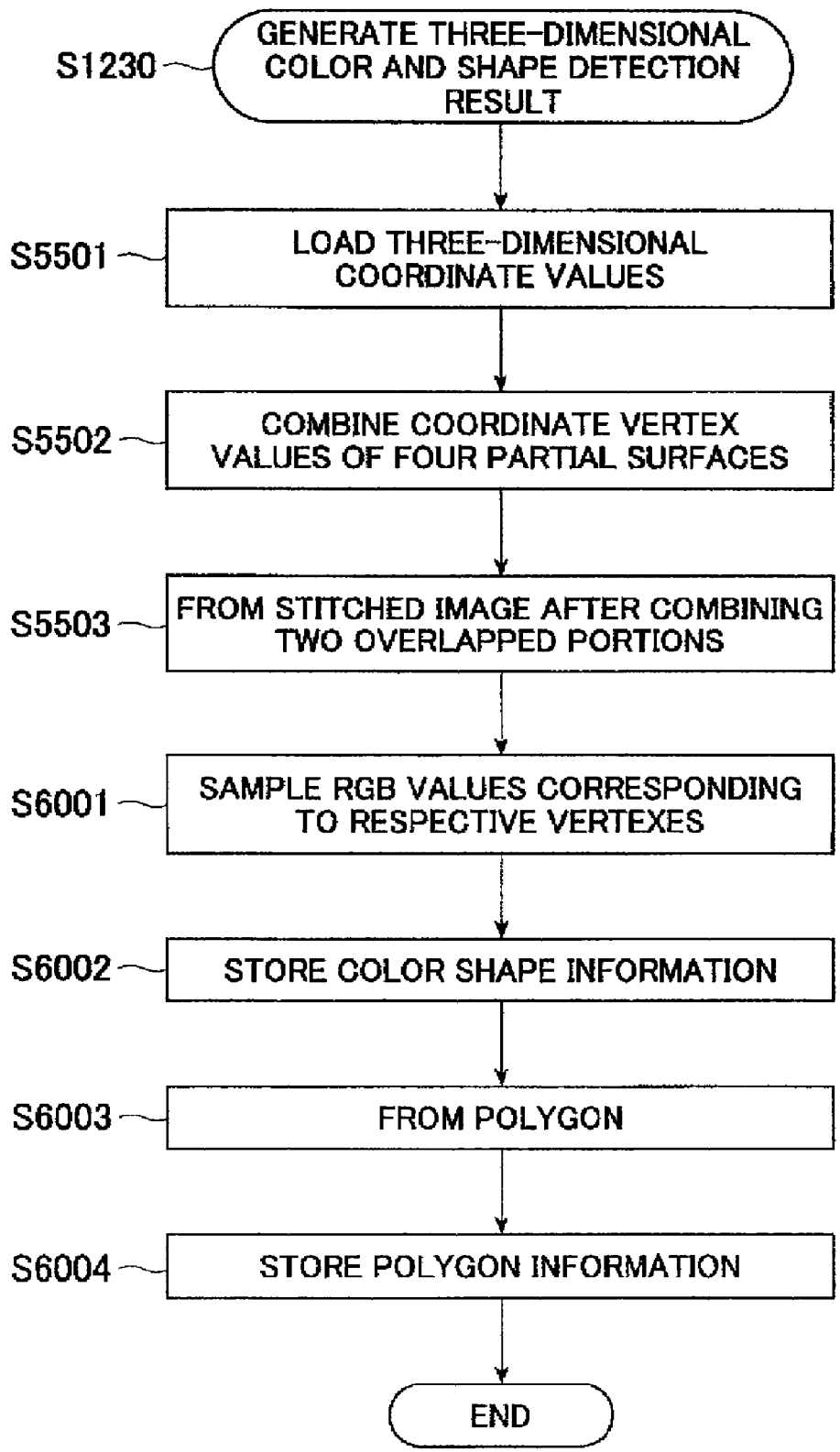
FIG. 19 is a flow chart conceptually showing the processing as a three-dimensional color and shape detection result generation sub routine executed in step S1230 in FIG. 14.

FIG. 19 conceptually shows step S1230 in FIG. 14 in a form of three-dimensional-color-shape detection result generating processing sub routine using a flow chart.

The processing part 15 functions as a color and shape extracting part which restores, by performing the three-dimensional-color-shape detection result generating processing, the three-dimensional image of the object to be measured using the three-dimensional model which restores the three-dimensional model of the object to be measured and the restored color of the object to be measured.

In the three-dimensional-color-shape detection result generating processing sub routine, first of all, in step S5501, a plurality of three-dimensional coordinate values is loaded from the three-dimensional coordinate storing part 37h. In this embodiment, the whole external surface of the object to be measured is divided into four partial surfaces (front surface, right surface, left surface and back surface), and a stereoscopic image is formed for each partial surface. In step S5501, with respect to all four partial surfaces, a plurality of three-dimensional coordinate values which belongs to each partial surface are loaded from the three-dimensional coordinate storing part 37h.

Next, in step S5502, based on the plurality of loaded three-dimensional coordinate values (vertex coordinate values), a plurality of three-dimensional coordinate values which belongs to the four partial surfaces are combined to each other. As a result, the four partial surfaces which are three-dimensionally expressed using the plurality of three-dimensional coordinate values are integrated whereby an image expressing the whole outer surface of the object to be measured is synthesized.

Subsequently, in step S5503, portions in the formed synthesized image which overlap with each other in space are extracted. Further, two portions which overlap with each other in the respective regions in the longitudinal direction of the synthesized image are combined into one portion using a technique which averages a plurality of three-dimensional coordinate values belonging to the two portions or the like. As a result, spatially overlapped portions in the synthesized image are removed and hence, a stitched image is completed.

Thereafter, in step S6001, RGB values (R brightness value, G brightness value and B brightness value) corresponding to the respective actual coordinate space coordinate values of three dimensional vertex group whose coordinates are converted into the above-mentioned real space three-dimensional coordinate system are extracted from the above-mentioned patterned light non-illuminated image.

With respect to the relationship between the real space coordinate system and the plane coordinate system which defines the patterned light non-illuminated image, the real space coordinate system and the plane coordinate system are geometrically associated with each other by the principle of triangulation. That is, when there exists a function used for mapping the plane coordinate system which defines a coded image, that is, a shape image which constitutes a two-dimensional image for measuring the three-dimensional shape of the object to be measured on the real space three-dimensional coordinate system by calculation, by using an inverse function of the function, it is possible to map the real space three-dimensional coordinate system on the plane coordinate system which defines the patterned light non-illuminated image by calculation. Accordingly, in step S6001, it is possible to extract surface color values, that is, RGB values corresponding to each three-dimensional vertex from two-dimensional patterned light non-illuminated image for each three-dimensional vertex.

Subsequently, in step S6002, for every vertex, the corresponding real space coordinate value and the RGB values are combined to form color-shape information. Further, the generated color-shape information is locally stored in a working area 37*l* directly or indirectly in association with the corresponding vertex.

Subsequently, in step S6003, to approximately express the surface shape of the object to be measured by dividing the surface shape of the object to be measured into a plurality of triangles which is one example of polygon, among a plurality of vertexes acquired with respect to the object to be measured, the plurality of vertexes which are close to each other in distance are divided into groups each of which consists of three vertexes. For each group, three vertexes are connected with each other thus forming one polygon.

Thereafter, in step S6004, to form the polygon for each polygon, the combination of three vertexes to be connected with each other is locally stored in the working area 37*l* as polygon information directly or indirectly in association with each polygon.

With the above-mentioned steps, the one-round execution of the three-dimensional-color-shape detection result generating processing sub routine is finished. Accordingly, the one-round execution of the three-dimensional-shape detection processing routine shown in FIG. 14 is finished.

Figure 20A:
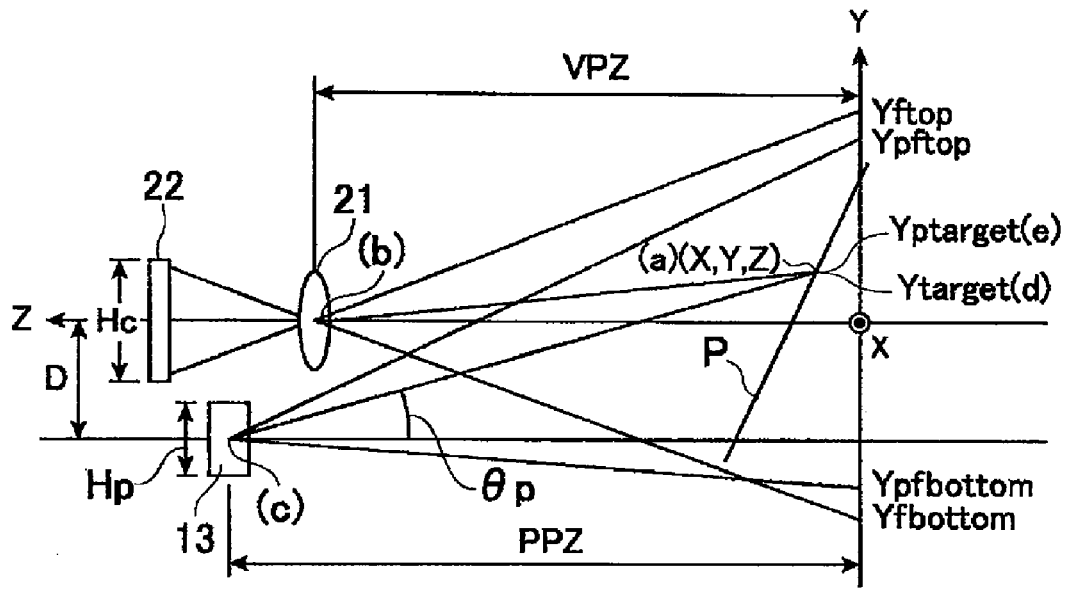
FIG. 20A and FIG. 20 B are a side view and a plan view for explaining coordinate conversion performed between two-dimensional CCD coordinate system and three-dimensional real space coordinate system and coordinate conversion performed between two-dimensional LCD coordinate system and three-dimensional real space coordinate system.
Figure 20B:
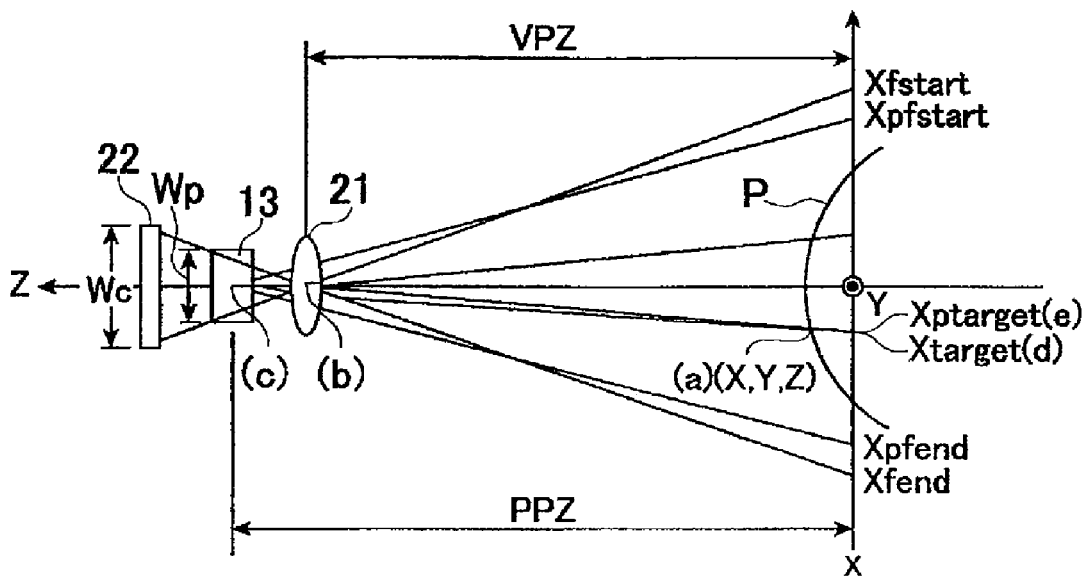

Here, a technique for converting the two-dimensional coordinate value on the CCD coordinate system ccdx-ccdy into the three-dimensional coordinate value on the real space coordinate system X-Y-Z using the principle of triangulation is explained in detail in conjunction with FIG. 20.

In this embodiment, the real space coordinate system X-Y-Z is fixed to the three-dimensional color and shape measuring device 1, and in the real space coordinate system X-Y-Z, as shown in FIG. 1, an image of a document P which constitutes an object to be picked up and is curved in the lateral direction is picked up. As shown in FIG. 20, the real space coordinate system X-Y-Z is positioned in a state that, with respect to the three-dimensional color and shape measuring device 1, the X axis of the system extends in the horizontal direction, the Y axis of the system extends in the vertical direction, and the Z axis of the system extends in the optical axis direction of the image pick-up optical system 21. FIG. 20A shows the real space coordinate system X-Y-Z as viewed in the X axis direction, and FIG. 20 B shows the real space coordinate system X-Y-Z as viewed in the Y axis direction. The real space coordinate system X-Y-Z is set in a state that the origin of the system is arranged at a position spaced apart from an image input pupil position in the image pick-up optical system 21 by a distance VPZ along the Z axis with respect to the three-dimensional color and shape measuring device 1.

In the real space coordinate system X-Y-Z, a projection angle from the projection part 13 to the document P is indicated by "θp", and a distance between the optical axis of the image pick-up optical system 21 and the optical axis of the projection part 13 is indicated by "D". The projection angle θp is univocally specified by a space code allocated for every pixel.

Further, in the real space coordinate system X-Y-Z, a Y coordinate value and an X coordinate value of an intersection between a straight line which is an extension opposite to an optical path through which reflection light from an object point target on the document P is incident on the CCD 22 and an X-Y plane are respectively indicated by "Ytarget" and "Xtarget". In the real space coordinate system X-Y-Z, further, a viewing field of the image pick-up optical system 21 in the Y direction is defined as a region ranging from a point indicated by "Yftop" to a point indicated by "Yfbottom", and a viewing field of the image pick-up optical system 21 in the X direction is defined as a region ranging from a point indicated by "Xfstart" to a point indicated by "Xfend". Further, a length (height) of the CCD 22 in the Y-axis direction is indicated by "Hc", and a length (width) of the CCD 22 in the X-axis direction is indicated by "Wc".

In the real space coordinate system X-Y-Z which is defined as described above, a three-dimensional coordinate value (X, Y, Z) on the real space coordinate system corresponding to an arbitrary coordinate value (ccdx, ccdy) on the CCD coordinate system of the CCD 22 can be acquired by solving five formulae (1) to (5) which express the relationships among following elements (a) to (e).

(a) an object point target (X, Y, Z) on the document P (indicated by a leader line as "(a)" in FIG. 20)

(b) an input pupil position of the image pick-up optical system 21 (indicated by a leader line as "(b)" in FIG. 20)

(c) an output pupil position of the projection optical system 20 (indicated by a leader line as "(c)" in FIG. 20)

(d) an intersection (Xtarget☐Ytarget) between a straight line which passes the input pupil position of the image pick-up optical system 21 and the object point on the document P and the X-Y plane (indicated by a leader line as "(d)" in FIG. 20)

(e) an intersection between a straight line which passes the output pupil position of the projection optical system 20 and the object point on the document P and the X-Y plane (indicated by a leader line as "(e)" in FIG. 20)

The five formulae are expressed as follows.

$$Y=(PPZ-Z)\cdot\tan\theta p-D+cmp(X\text{target}) \quad (1)$$

$$Y=-(Y\text{target}/VPZ)Z+Y\text{target} \quad (2)$$

$$X=-(X\text{target}/VPZ)Z+X\text{target} \quad (3)$$

$$Y\text{target}=Y\!f\text{top}-(ccdcy/Hc)\times(Y\!f\text{top}-Y\!f\text{bottom}) \quad (4)$$

$$X\text{target}=X\!f\text{start}+(ccdcx/Wc)\times(X\!f\text{end}-X\!f\text{start}) \quad (5)$$

Here, "cmp(Xtarget)" in formula (1) is a function of correcting the displacement between the image pick-up optical system 21 and the projection part 13, and in an ideal case, that is, when there is no displacement between the image pick-up optical system 21 and the projection part 13, "cmp(Xtarget)" assumes 0.

Further, in the real space conversion processing, the coordinate value (ccdx, ccdy) of an arbitrary point in the real image is converted into the coordinate value (ccdcx, ccdcy) in an image which is picked-up by an ideal camera. The above-mentioned conversion is performed using following three formulae, that is, the approximations for camera calibration.

$$ccdcx=(ccdx-Centx)/(1+\text{dist}/100)+Centx \quad (6)$$

$$ccdcy=(ccdy-Centy)/(1+\text{dist}/100)+Centy \quad (7)$$

$$hfa=\arctan\left[(((ccdx-Centx)^2+(ccdy-Centy)^2)^{0.5}\times\text{pixel length/focal length}\right] \quad (8)$$

Here, an aberration quantity dist (%) is described as "dist=f (hfa)" using a function f of half angle of view hfa (deg). Further, a focal length of the image pick-up optical system 21 is indicated by "focal length(mm)", a ccd pixel length is indicated by "pixel length(mm)", and a coordinate value of the center of the lens in the CCD 22 is defined as "(Centx, Centy)".

In the real space conversion processing, as described above, not only the processing for converting the CCD coordinate system into the real space coordinate system, but also the processing for converting arbitrary three-dimensional coordinate value (X, Y, Z) on the three-dimensional space coordinate system into the two-dimensional coordinate value (lcdcx, lcdcy) on the LCD coordinate system which is the two-dimensional coordinate system set on a plane of the projection LCD 19 in the inside of the projection part 13 can be executed.

The geometrical relationship between these two-dimensional coordinate value (lcdcx, lcdcy) and three-dimensional coordinate value (X, Y, Z) can be described using following four formulae.

$$Y=-(Yp\text{target}/PPZ)Z+Yp\text{target} \quad (9)$$

$$X=-(Xp\text{target}/PPZ)Z+Xp\text{target} \quad (10)$$

$$Yp\text{target}=Ypf\text{top}-(lcdcy/Hp)\times(Xpf\text{top}-Xpf\text{bottom}) \quad (11)$$

$$Xp\text{target}=Xpf\text{start}+(lcdcx/Wp)\times(Xpf\text{end}-Xpf\text{start}) \quad (12)$$

Here, in the real space coordinate system X-Y-Z, as shown in FIG. 20, a Y coordinate value and an X coordinate value of an intersection between a straight line which is an extension in the same direction as a optical path through which an optical flux is incident on the object point target on the document P from the projection part 13 and an X-Y plane are respectively indicated by "Yptarget" and "Xptarget". Further, an output pupil position of the projection part 13 is defined as (0, 0, PPZ). Further, a viewing field of the projection part 13 in the Y direction is defined as a region ranging from a point indicated by "Ypftop" to a point indicated by "Ypfbottom", and a viewing field of the projection part 13 in the X direction is defined as a region ranging from a point indicated by "Xpfstart" to a point indicated by "Xpfend". Further, a length (height) of the projection LCD 19 in the Y axis direction is indicated by "Hp", and a length (width) of the projection LCD 19 in the X axis direction is indicated by "Wp".

For making use of the relationships expressed in the above-mentioned formulae (9) to (12), when the three-dimensional coordinate value (X, Y, Z) is inserted into the respective formulae (9) to (12) by substitution, it is possible to calculate the two-dimensional coordinate value (lcdcx, lcdcy) on the LCD coordinate system. Accordingly, for example, it is possible to calculate a projected light pattern of the projection LCD 19 for projecting an image such as a character, a figure or the like on the projection surface having an arbitrary three-dimensional shape.

Although the explanation has been made with respect to the stereoscopic image processing which is executed in step S609 in FIG. 8 heretofore, the explanation is made with respect to the planation image processing which is executed in step S611 herein after.

According to this planation image processing, in spite of the fact that an image of the document P is actually picked up in a curved state as shown in FIG. 1, for example, the image picked up actually is formed into a plane as if the image of the same document P is picked up in a non-curved state. Further, according to this planation image processing, in spite of the fact that the document P having a rectangular shape in a front view is actually picked up obliquely, for example, the image picked up actually is formed into a plane as if the image of the same document P is picked up from the front side.

The planation image processing is not a prerequisite for understanding the present invention and is disclosed in detail in the previously quoted JP-A-2004-105426 and hence, in this specification, the detailed explanation of the planation image processing is omitted by quoting the explanation of the JP-A-2004-105426 relating to the planation image processing.

Second Embodiment

Next, a second embodiment of the present invention is explained. The three-dimensional color and shape measuring device according to the second embodiment has the basic structure which is substantially equal to the basic structure of the three-dimensional color and shape measuring device 1 of the first embodiment shown in FIG. 1 to FIG. 4, but differs from the three-dimensional color and shape measuring device 1 of the first embodiment only in the constitution of the image pick-up unit and the processing by the processing part associated with the constitution of the image pick-up unit.

Accordingly, here, only the constitution of the image pick-up unit and the processing in the processing part in to the second embodiment are explained, and the explanation of the basic structure of the three-dimensional color and shape measuring device is omitted. Here, in the following explanation, the constitutional elements substantially equal to the corresponding constitutional elements of the three-dimensional color and shape measuring device 1 of the first embodiment are explained using the same symbols.

As shown in FIG. 21, the image pick-up unit 70 included in the three-dimensional color and shape measuring device of the second embodiment houses therein a CCD 71 which functions as an image pick-up part, an amplifier 72 which amplifies an image signal which is formed by picking up an image of the object to be measured and is outputted from the CCD 71, an A/D converter 73 which converts an analogue image signal amplified by the amplifier 72 into a digital image signal, and a correction part 79 which generates a color measuring image signal for measuring and restoring the color of the object to be measured by applying the gray scale correction to the image signal inputted from the A/D converter 73 and a shape measuring image signal for measuring and restoring the three-dimensional shape of the object to be measured and outputs these image signals to the main device.

In the image pick-up unit 70 having such a constitution, the CCD interface 31 is constituted of the amplifier 72, the A/D converter 73 and the correction part 79, and the image signal is outputted to the main device from the CCD interface 31.

Further, the main device of the second embodiment houses therein the color and shape extracting part which restores the three-dimensional image of the object to be measured using the color of the object to be measured which is restored based on the color measuring image signal inputted from the image pick-up unit 70 and the three-dimensional model which restores the three-dimensional shape of the object to be measured based on the shape measuring signal inputted from the image pick-up unit 70.

The correction part 79 includes a first correction part which is constituted of a first correction circuit 74 for converting the image signal into the color measuring image signal by first correction in accordance with the above-mentioned non-linear first gray scale characteristic, and an amplifier 75 which amplifies the color measuring image signal outputted by the first correction circuit 74 and outputs the amplified color measuring image signal. The correction part 79 also includes a second correction part which is constituted of an amplifier 77 for amplifying an image signal acquired by the analogue/digital conversion and outputs the digital signal as a shape measuring image signal.

That is, the correction part 79 possesses the gray scale correction function substantially equal to the gray scale correction function of the correction part 66 which the image pick-up unit 60 of the first embodiment possesses. However, the correction part 79 of this second embodiment is configured to convert the image signal into the shape measuring image signal by performing the second correction which is performed in accordance with the second gray scale characteristic having the above-mentioned linear portion to the image signal using the amplifier (amplifier 77).

Further, the image pick-up unit 70 includes a preceding-stage selection part 78a which selects either one of the first correction part and the second correction part and outputs the image signal to the selected correction part, and a succeeding-stage selection part 78b which selects either one of the color measuring image signal which the first correction part outputs and the shape measuring image signal which the second correction part outputs and outputs the selected signal to the main device.

The preceding-stage selection part 78a, when a patterned light imaging program 36b is executed by the processing part 15 of the main device so that the patterned light non-illuminated image is acquired, selects the first correction part based on a control performed by the CPU 35 so as to connect the A/D converter 73 and the first correction part, while the succeeding-stage selection part 78b selects the color measuring image signal based on a control performed by the CPU 35 and outputs the color measuring image signal to the main device.

In this manner, by providing the correction part which includes the first correction part, the second correction part and the selection parts 78a, 78b to the image pick-up unit 70 of the second embodiment, the color measuring image signal and the shape measuring image signal are outputted to the main device by alternately operating the first correction part and the second correction part and hence, different from the constitution shown in FIG. 5, it is unnecessary to connect the image pick-up unit 60 and the processing part 15 using two signal lines and hence, the circuit constitution can be simplified.

Further, with the provision of the image pick-up unit 70, compared to the image pick-up unit 60 of the first embodiment which operates the first correction part and the second correction part simultaneously, the first correction part and the second correction part can be operated alternately and hence, the power consumption of the image pick-up unit 70 can be reduced correspondingly.

Still further, when the image pick-up unit 70 is configured in the above-mentioned manner, the image signal outputted from the A/D converter 73 does not take the display characteristic of the monitor LCD 10 into consideration and hence, the characteristic of the image signal becomes linear whereby the image signal is suitable for measuring the three-dimensional shape of the object to be measured.

Accordingly, by merely amplifying this image signal by the amplifier 77, even when the second correction circuit used in the image pick-up unit 60 of the first embodiment is not provided, it is possible to generate the shape measuring image signal which enables the measurement of the three-dimensional shape of the object to be measured with high accuracy. Here, due to the elimination of the second correction circuit, the number of parts of the image pick-up unit 70 can be reduced and hence, the reduction of manufacturing cost of the image pick-up unit 70 and the miniaturization of the image pick-up unit 70 can be realized.

Further, the correction part 79 which includes the image pick-up unit 70 is, in the same manner as the first embodiment, provided with the first correction circuit 74 and hence, the color measuring image signal can be also generated from the image signal by this first correction circuit whereby it is possible to form the three-dimensional image which faithfully reproduces the color and the three-dimensional shape of the object to be measured by the color and shape extracting part in the main device.

Next, the processing performed by the processing part 15 provided to the three-dimensional color and shape measuring device of the second embodiment is explained. The processing performed by the processing part 15 in the second embodiment differs from the corresponding processing performed in the first embodiment only with respect to processing executed in steps S1211, S1213 of the image pick-up processing sub routine shown in FIG. 15.

Figure 22:
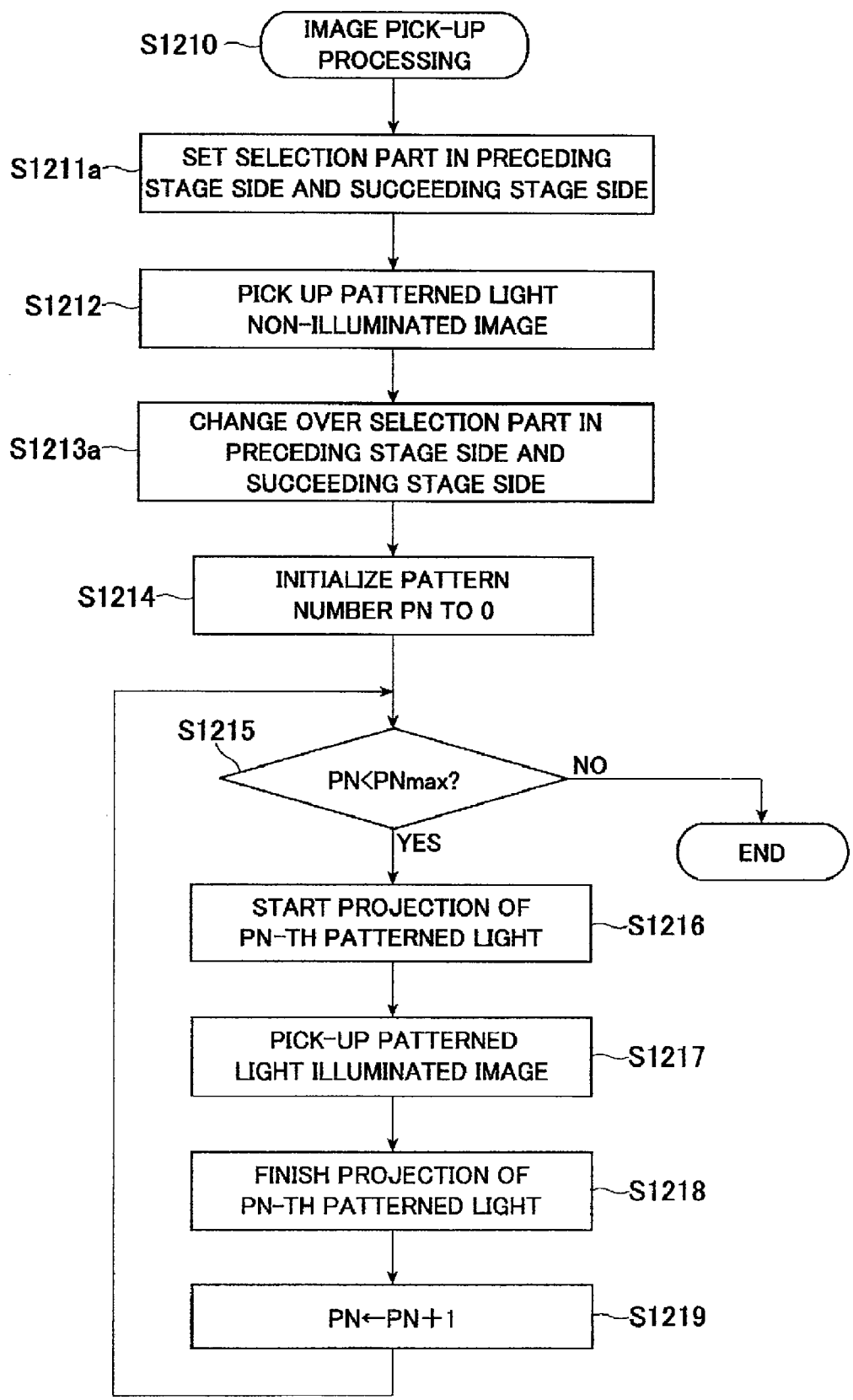
FIG. 22 is a flow chart showing the image pick-up processing in the second embodiment.

FIG. 22 is a flow chart showing image pick-up processing executed in the processing part 15 of the second embodiment. As shown in FIG. 22, in this image pick-up processing, first of all, in step S1211a, the setting processing by the selection part in the preceding-stage side and the succeeding-stage side are executed. That is, in step S1211a, the selection part 78a in the preceding-stage side in the inside of the image-pickup unit 70 shown in FIG. 21 selects the first correction part and connects the A/D converter 73 and the first correction circuit 74 based on a control performed by the CPU 35 of the processing part 15.

Simultaneously with such processing, the succeeding-stage selection part 78 in the image pick-up unit 70 shown in FIG. 21 selects the amplifier 75 of the first correction part and the color measuring image signal outputted from the amplifier 75 is outputted to the main device.

Next, in step S1212, due to the execution of the patterned light imaging program 36b, without projecting the patterned light on the object to be measured from the projection part 13, one patterned light non-illuminated image is acquired by picking up an image of the object to be measured by the image pick-up part 14.

The patterned light non-illuminated image acquired here is formed based on a color measuring image signal to which the first correction is applied by the image pick-up unit 70. The patterned light non-illuminated image is stored in the patterned light non-illuminated image storing part 37b.

Next, in step S1213a, the processing for changing over the selection part in the preceding-stage side and the selection part in the succeeding-stage side is executed. That is, in this step S1213a, the selection part 78a in the preceding-stage side in the inside of the image-pickup unit 70 shown in FIG. 21 selects the second correction part and connects the A/D converter 73 and the amplifier 77 based on a control performed by the CPU 35 of the processing part 15.

Simultaneously with such processing, the succeeding-stage selection part 78b in the image pick-up unit 70 shown in FIG. 21 selects the amplifier 77 of the second correction part and the shape measuring image signal outputted from the amplifier 77 is outputted to the main device.

After the processing in step S1213a is finished, in the same manner as the first embodiment, the processing in step S1214 to S1219 are sequentially executed thus finishing the image pick-up processing.

In this manner, according to the processing part 15 which the three-dimensional color and shape measuring device 1 of the second embodiment possesses, by merely changing the processing executed in steps S1211 and S1213 in the image pick-up processing sub routine of the first embodiment shown in FIG. 15 with the processing executed in steps S1211a and S1213a in the image pick-up processing sub routine shown in FIG. 22, it is possible to operate the image pick-up unit 70 shown in FIG. 21 without largely changing the whole program executed by the processing part 15.

Third Embodiment

Next, a third embodiment of the present invention is explained. The three-dimensional color and shape measuring device according to the third embodiment has the basic structure which is substantially equal to the basic structure of the three-dimensional color and shape measuring device 1 of the first embodiment shown in FIG. 1 to FIG. 4, but differs from the three-dimensional color and shape measuring device 1 of the first embodiment only in the constitution of the image pick-up unit and the processing by the processing part associated with the constitution of the image pick-up unit. (0246)

Accordingly, here, only the constitution of the image pick-up unit and the processing in the processing part provided to the third embodiment are explained, and the explanation of the basic structure of the three-dimensional color and shape measuring device is omitted. Also in this embodiment, the constitutional elements substantially equal to the corresponding constitutional elements of the three-dimensional color and shape measuring device 1 of the first embodiment are explained using the same symbols.

Figure 23:
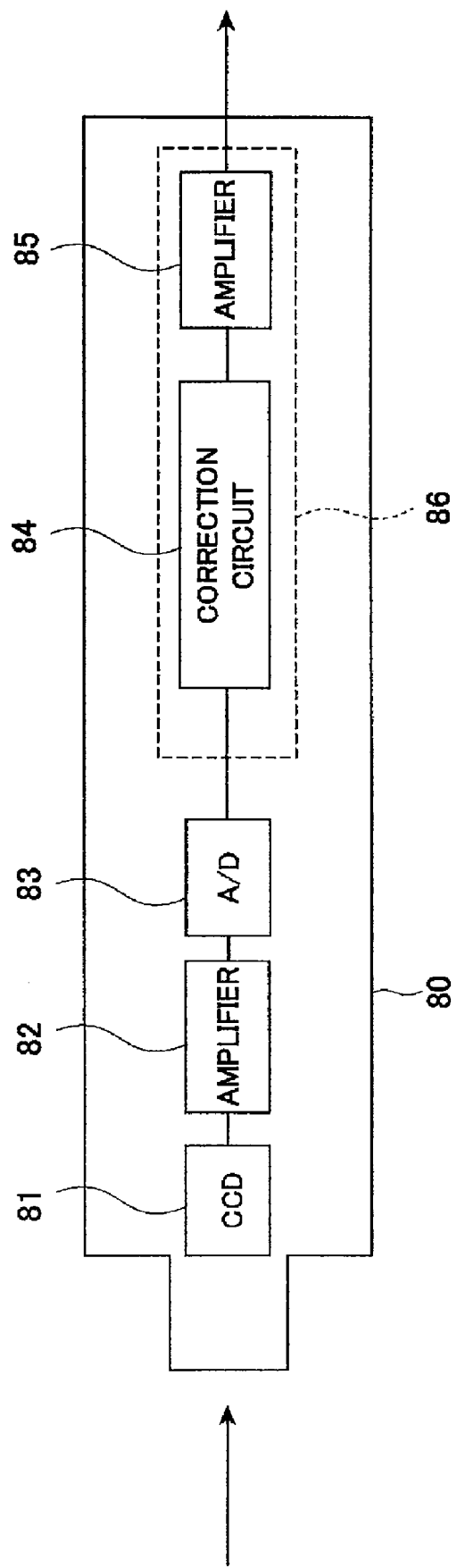
FIG. 23 is a functional block diagram showing an image pick-up unit of a third embodiment.

As shown in FIG. 23, the image pick-up unit 80 provided to the three-dimensional color and shape measuring device of the third embodiment houses therein a CCD 81 which functions as an image pick-up part, an amplifier 82 which amplifies an image signal which is formed by picking up an image of the object to be measured and is outputted from the CCD 81, an A/D converter 83 which converts an analogue image signal amplified by the amplifier 82 into a digital image signal, and a correction part 86 which generates a color measuring image signal for measuring and restoring the color of the object to be measured by applying the gray scale correction to the image signal inputted from the A/D converter 83 and a shape measuring image signal for measuring and restoring the three-dimensional shape of the object to be measured and outputs these image signals to the main device.

In the image pick-up unit 80 having such a constitution, the CCD interface 31 is constituted of the amplifier 82, the A/D converter 83 and the correction part 86, and the image signal is outputted to the main device from the CCD interface 31.

Further, the main device of the third embodiment houses therein the color and shape extracting part which restores the three-dimensional image of the object to be measured using the color of the object to be measured which is restored based on the color measuring image signal inputted from the image pick-up unit 80 and the three-dimensional model which restores the three-dimensional shape of the object to be measured based on the shape measuring signal inputted from the image pick-up unit 80.

The correction part 86 includes a correction circuit 84 for converting the image signal into the color measuring image signal by first correction in accordance with the above-mentioned non-linear first gray scale characteristic, and, at the same time, converting the image signal into the shape measuring image signal by second correction. The correction part 86 also includes an amplifier 85 which amplifies the color measuring image signal and the shape measuring image signal outputted from the correction circuit 84 and outputs the color measuring image signal and the shape measuring image signal to the main device.

Particularly, the correction circuit 84 includes a first correction LUT (look-up table) which can be referenced in performing the first correction using the correction circuit 84 and the second LUT which can be referenced in performing the second correction.

The first correction LUT is a look-up table which stores the image signal before the first correction and the color measuring image signal acquired after the first correction in a state that these signals correspond to each other, while the second correction LUT is a look-up table which stores the image signal before the second correction and the shape measuring image signal acquired after the second correction in a state that these signals correspond to each other, Further, in this correction part 86, when a patterned light imaging program 36b is executed by the processing part 15 of the main device so that the patterned light non-illuminated image is acquired, the correction circuit 84 is operated based on a control performed by the CPU 35 so that the first correction is applied to the image signal using the first correction LUT provided to the correction circuit 84 and, the color measuring image signal generated as a result of such an operation is outputted to the main device.

On the other hand, in this correction part 86, when a patterned light imaging program 36b is executed by the processing part 15 of the main device so that the patterned light illuminated image is acquired, the correction circuit 84 is operated based on a control performed by the CPU 35 so that the second correction is applied to the image signal using the second LUT provided to the correction circuit 84 and, the shape measuring image signal generated as a result of such an operation is outputted to the main device.

In this manner, in the third embodiment, by providing the correction circuit 84 which includes the first correction LUT and the second correction LUT in the correction part 86, it is possible not only to form a three-dimensional image which faithfully reproduces color and a three-dimensional shape of an object to be measured by the color and shape extracting part but also to apply the first correction and the second correction to the image signal by the single correction circuit 84 by merely replacing the look-up table which is referenced at the time of applying the gray scale correction to the image signal. Accordingly, the image pick-up unit 80 can be miniaturized.

Next, the processing performed by the processing part 15 provided to the three-dimensional color and shape measuring device of the third embodiment is explained. The processing performed by the processing part 15 in the third embodiment differs from the corresponding processing performed in the first embodiment only with respect to processing executed in steps S1211, S1213 of the image pick-up processing sub routine shown in FIG. 15.

Figure 24:
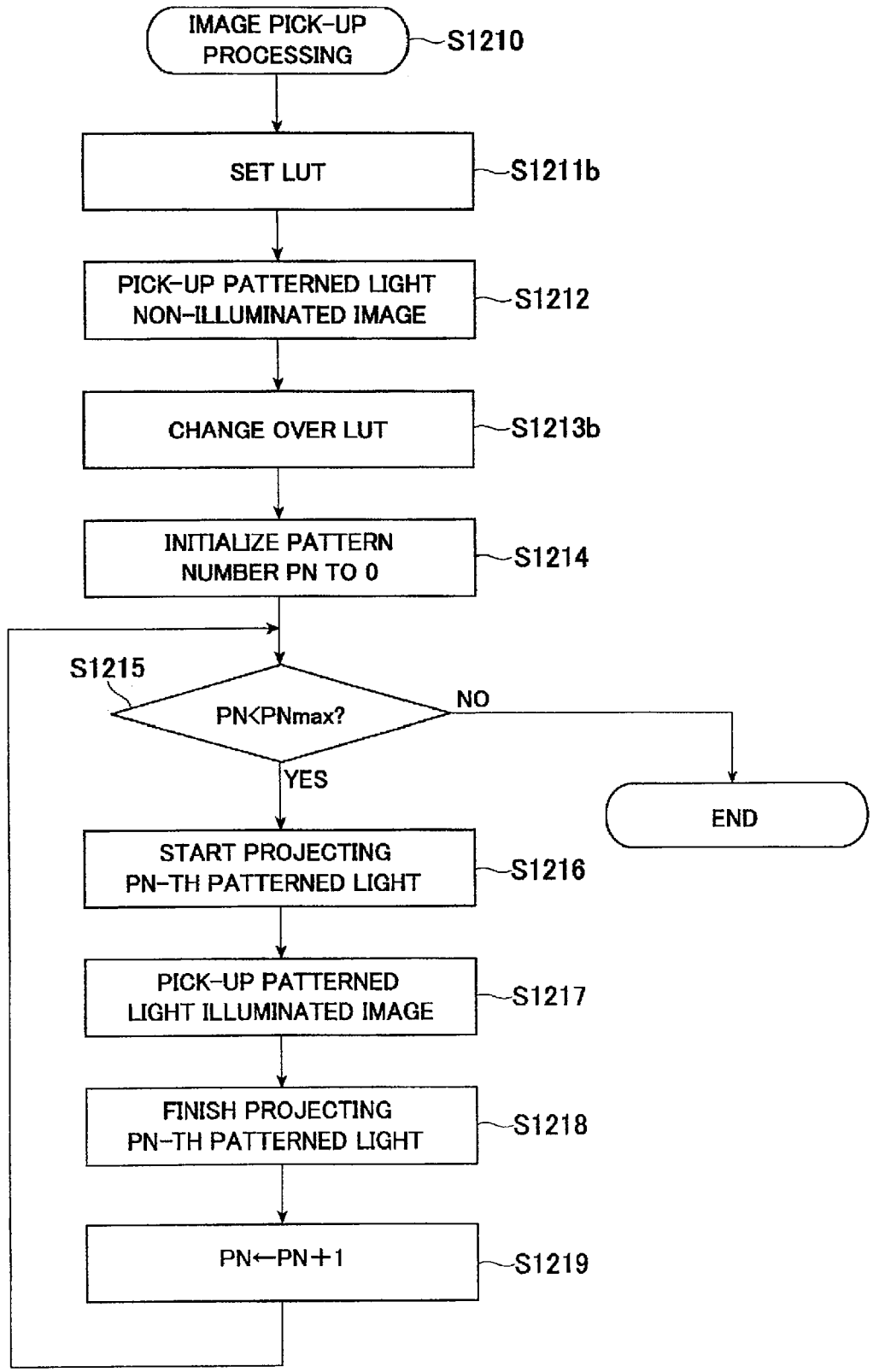
FIG. 24 is a flow chart showing the image pick-up processing in the second embodiment.

FIG. 24 is a flow chart showing image pick-up processing executed in the processing part 15 of the third embodiment. As shown in FIG. 24, in this image pick-up processing, first of all, in step S1211b, the setting processing of the LUT is executed. That is, in step S1211b, the first correction LUT to be referenced in an image pick-up unit 80 shown in FIG. 23 is set based on a control performed by the CPU 35 of the processing part 15.

Next, in step S1212, due to the execution of the patterned light imaging program 36b, without projecting the patterned light on the object to be measured from the projection part 13, one patterned light non-illuminated image is acquired by picking up an image of the object to be measured by the image pick-up part 14.

The patterned light non-illuminated image acquired here is formed based on a color measuring image signal to which the first correction is applied by the image pick-up unit 80. The patterned light non-illuminated image is stored in the patterned light non-illuminated image storing part 37*b*.

Next, in step S1213*b*, the replacement processing of the LUT is executed. That is, in step S1213*b*, the LUT referenced in the image-pickup unit 80 shown in FIG. 23 is replaced from the first correction LUT to the second correction LUT based on a control performed by the CPU 35 of the processing part 15.

After the processing in step S1213*b* is finished, in the same manner as the first embodiment, the processing in step S1214 to S1219 are sequentially executed thus finishing the image pick-up processing.

In this manner, according to the processing part 15 which the three-dimensional color and shape measuring device 1 of the third embodiment possesses, by merely replacing the processing executed in steps S1211 and S1213 in the image pick-up processing sub routine of the first embodiment shown in FIG. 15 with the processing executed in steps S1211*b* and S1213*b* in the image pick-up processing sub routine shown in FIG. 24, it is possible to operate the image pick-up unit 80 shown in FIG. 23 without largely changing the whole program executed by the processing part 15.

Fourth Embodiment

Next, a fourth embodiment of the present invention is explained. The three-dimensional color and shape measuring device according to the fourth embodiment has the basic structure which is substantially equal to the basic structure of the three-dimensional color and shape measuring device 1 of the first embodiment shown in FIG. 1 to FIG. 4, but differs from the three-dimensional color and shape measuring device 1 of the first embodiment only in the constitution of the image pick-up unit, a program stored in the ROM of the processing part and the processing by the processing part associated with the constitution of the image pick-up unit.

Accordingly, here, only the constitution of the image pick-up unit and the program stored in the ROM of the processing part and the processing in the processing part provided to the fourth embodiment are explained, and the explanation of the basic structure of the three-dimensional color and shape measuring device is omitted. Here, also in this embodiment, the constitutional elements substantially equal to the corresponding constitutional elements of the three-dimensional color and shape measuring device 1 of the first embodiment are explained using the same symbols.

Figure 25:
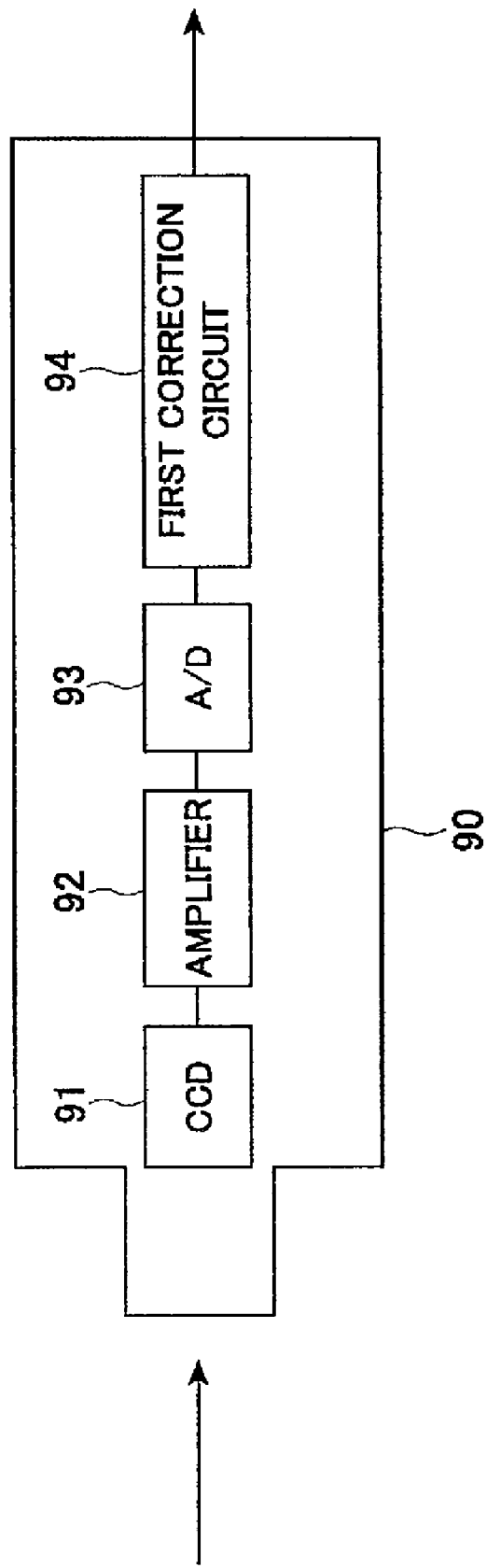
FIG. 25 is a functional block diagram showing an image pick-up unit of a fourth embodiment.

As shown in FIG. 25, the image pick-up unit 90 included in the three-dimensional color and shape measuring device of the fourth embodiment houses therein a CCD 91 which functions as an image pick-up part, an amplifier 92 which amplifies an image signal which is formed by picking up an image of the object to be measured and is outputted from the CCD 91, an A/D converter 93 which converts an analogue image signal amplified by the amplifier 92 into a digital image signal, and a first correction circuit 94 which functions as a first correction part for converting an image signal outputted by the A/D converter 93 into a color measuring image signal by the first correction in accordance with the first gray scale characteristic.

In the image pick-up unit 90 having such a constitution, the CCD interface 31 is constituted of the amplifier 92, the A/D converter 93 and the first correction circuit 94, and the image signal is outputted to the main device from the CCD interface 31.

Further, the main device houses therein a third correction circuit which applies the third correction in accordance with the third gray scale characteristic described later to a color measuring image signal inputted from the CCD interface 31 thus converting the color measuring image signal into the shape measuring image signal, and a color and shape extracting part (not shown in the drawing) which restores a three-dimensional image of an object to be measured based on two kinds of image signals (color measuring image signal and the shape measuring image signal).

Further, in the main device of the fourth embodiment, for applying the third correction to the color measuring image signal inputted from the image pick-up unit 90 as described above, as shown in FIG. 26, a gray scale correction program 36*j* and a gray scale correction LUT 36*k* are stored in the ROM 36 provided to the processing part 15 in addition to the various programs 36*a* to 36*i* stored in the ROM 36 of the first embodiment.

This gray scale correction program 36*j* is executed for applying the third correction in accordance with the third gray scale characteristic to the color measuring image signal outputted from the image pick-up unit 90 and, thereafter, is executed for converting the color measuring image signal into the shape measuring image signal after amplification of the signal.

Here, the third gray scale characteristic is a gamma characteristic which assumes a linear characteristic when taken as a product of the third gray scale characteristic and the first gray scale characteristic, and is an inverse gamma characteristic of the first gray scale characteristic.

In this manner, since the gray scale correction program 36*j* is stored in the ROM 36, even when the image pick-up unit 90 which is preliminarily provided with only the correction circuit which performs the first correction as the correction part is mounted on the three-dimensional color and shape measuring device, due to the execution of the gray scale correction program 36*j*, the third correction can be applied to the color measuring image signal outputted from the image pick-up unit 90 thus generating the shape measuring image signal capable of measuring the three-dimensional shape of the object to be measured with high accuracy.

Further, the gray scale correction LUT 36*k* is a look-up table which is stored in a state that the color measuring image signal before the third correction and the shape measuring image signal acquired after the third correction are made to correspond to each other, and the gray scale correction LUT 36*k* is referenced by the CPU 35 when the gray scale correction program 36*j* is executed by the processing part 15. That is, the above-mentioned third correction is performed by making use of this third correction LUT.

In the three-dimensional color and shape measuring device 1 of the fourth embodiment having such a constitution, when a patterned light imaging program 36 bis executed by the processing part 15 of the main device so that the patterned light non-illuminated image is acquired, the patterned light non-illuminated image is formed based on the color measuring image signal outputted from the image pick-up unit 90 and the patterned light non-illuminated image is stored in the patterned light non-illuminated image storing part 37*b* based on a control performed by the CPU 35.

On the other hand, when a patterned light imaging program 36*b* is executed by the processing part 15 of the main device so that the patterned light illuminated image is acquired, the gray scale correction program 36*j* is executed and the third correction circuit 96 is operated based on a control performed by the CPU 35 so that the third correction is applied to the color measuring image signal outputted by the image pick-up unit 90, and the patterned light illuminated image is formed based on the shape measuring image signal acquired as a result of the processing of the gray scale correction program 36j, and the patterned light illuminated image is stored in the patterned light illuminated image storing part 37a.

That is, the color extracting part is configured to restore the color of the object to be measured directly using the color measuring image signal outputted from the image pick-up unit 90 in restoring the color of the object to be measured, and to measure and restore the three-dimensional shape of the object to be measured using the shape measuring image signal generated by applying the inverse gamma correction to the color measuring image signal outputted from the image pick-up unit 90 in measuring and restoring the three-dimensional shape of the object to be measured.

In this manner, in the three-dimensional color and shape measuring device 1 of the fourth embodiment, the correction part which corrects the image signal is constituted of the first correction circuit 94 which the image pick-up unit 90 possesses and the third correction circuit 96 which the main device possesses and hence, in the same manner as the first embodiment to the third embodiment, the color and shape extracting part can form the three-dimensional image which faithfully restore the color and the three-dimensional shape of the object to be measured.

Further, since the third correction part is housed in the main device, even when the relatively inexpensive commercially available image pick-up unit 90 which is provided with only the first correction circuit 94 shown in FIG. 25 is used, it is possible not only to accurately restore the color of the object to be measured but also to measure the three-dimensional shape of the object to be measured with high accuracy.

That is, as in the case of the image pick-up unit 90 shown in FIG. 25, when the image pick-up unit 90 having the constitution which always allows only the outputting of the color measuring image signal which conforms to the display characteristic of the monitor LCD 10 to the image signal outputted by picking up an image of the object to be measured by the CCD 91 is mounted on the three-dimensional color and shape measuring device 1, at the time of restoring the color of the object to be measured, it is possible to faithfully restore the color of the object to be measured by merely amplifying the color measuring image signal outputted from the image pick-up unit 90 to which the first correction is applied.

On the other hand, in measuring and restoring the three-dimensional shape of the object to be measured, the color measuring image signal having the non-linear characteristic is outputted from the image pick-up unit 90. In the main device, by applying the third correction which conforms to the non-linear third gray scale characteristic which is the inverse gamma characteristic of the non-linear characteristic of the color measuring image signal to the color measuring image signal by the third correction circuit 96, the signal characteristic after the third correction assumes the linear characteristic suitable for the measurement of the three-dimensional shape.

Accordingly, the color and shape extracting part of the main device can measure and restore the three-dimensional shape of the object to be measured with high accuracy using the shape measuring image signal which is a signal acquired by applying the third correction.

Next, the processing performed by the processing part 15 provided to the three-dimensional color and shape measuring device of the fourth embodiment is explained. With respect to the processing performed by the processing part 15, step S1211 in the image pick-up processing sub routine shown in FIG. 15 is deleted and the fourth embodiment differs from the first embodiment only the content of processing executed in step S1213.

Figure 27:
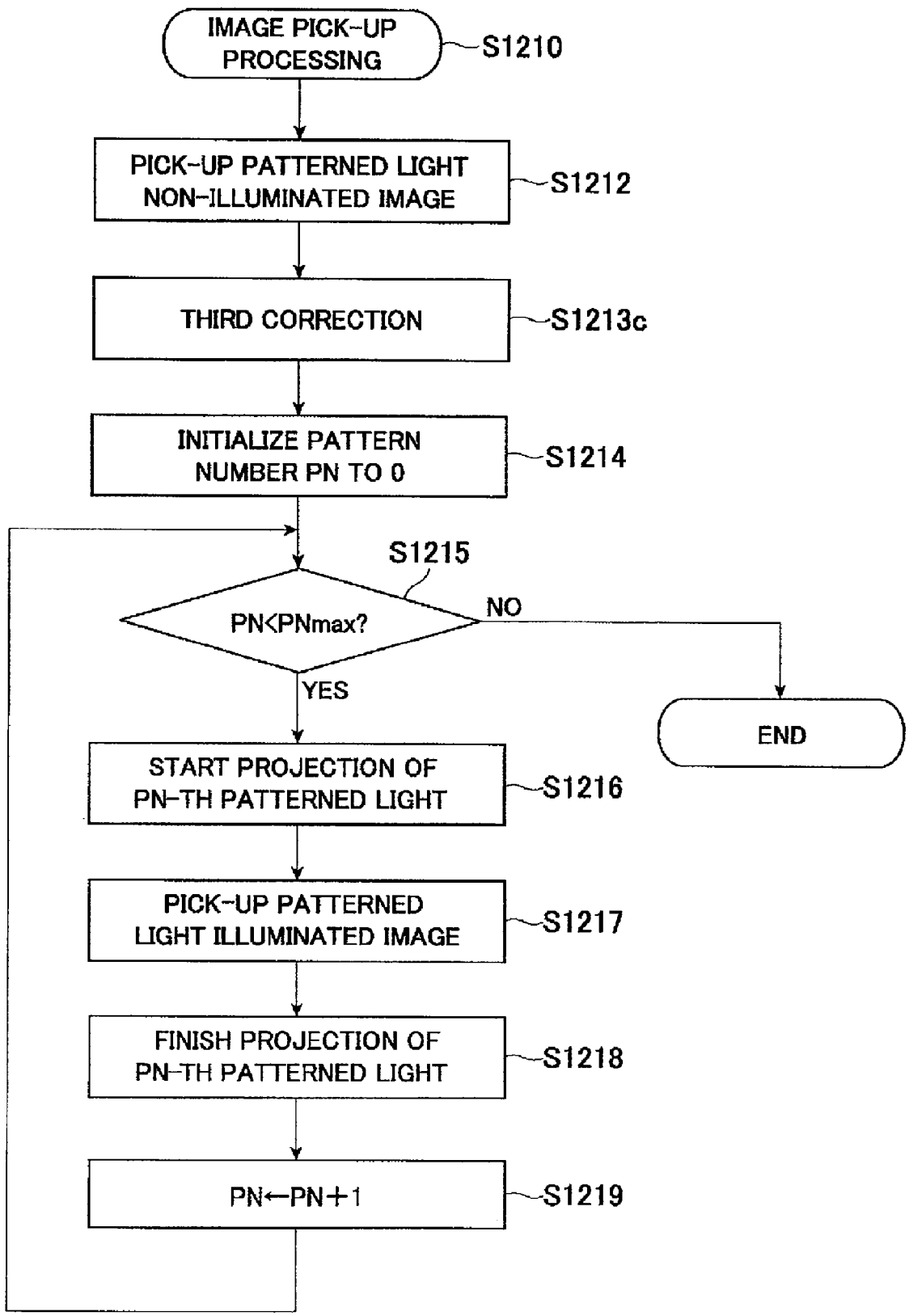
FIG. 27 is a flow chart showing an image pick-up processing in the fourth embodiment.

FIG. 27 is a flow chart showing an image pick-up processing executed in the processing part 15 of the fourth embodiment. As shown in FIG. 27, in this image pick-up processing, first of all, in step S1212, due to the execution of the patterned light imaging program 36b, without projecting the patterned light on the object to be measured from the projection part 13, one patterned light non-illuminated image is acquired by picking up an image of the object to be measured by the image pick-up part 14.

The patterned light non-illuminated image acquired here is formed based on a color measuring image signal which is acquired by amplifying a color measuring image signal to which the first correction is applied in the image pick-up unit 90. The acquired patterned light non-illuminated image is stored in the patterned light non-illuminated image storing part 37b.

Next, in step S1213c, the third correction processing is executed. That is, in step S1213c, due to the execution of the gray-scale correction program 36j, gray scale correction LUT 36k is referenced by the CPU 35, the third correction is applied to the color measuring image signal inputted from the image pick-up unit 90 and, thereafter, the color measuring image signal is amplified and is converted into the shape measuring image signal.

After the processing in step S1213c is finished, in the same manner as the first embodiment, the processing in steps S1214 to S1219 are sequentially executed thus finishing the image pick-up processing.

In this manner, in the fourth embodiment, the third correction is applied to the color measuring image signal inputted from the image pick-up unit 90 during the image pick-up processing. However, by changing the processing in the processing part 15, it may be possible to perform the third correction such that the third correction is not performed during the image pick-up processing and is performed in the coded image forming processing (S100) shown in FIG. 17 after the image pick-up processing.

As a modification of this fourth embodiment, the processing executed by the processing part 15 in performing the third correction in the coded image forming processing is explained. In this case, the third correction processing in step S1213c shown in FIG. 27 is deleted, and the third correction processing is executed in the coded image forming processing shown in FIG. 28 and in the binary image forming processing shown in FIG. 29.

Figure 28:
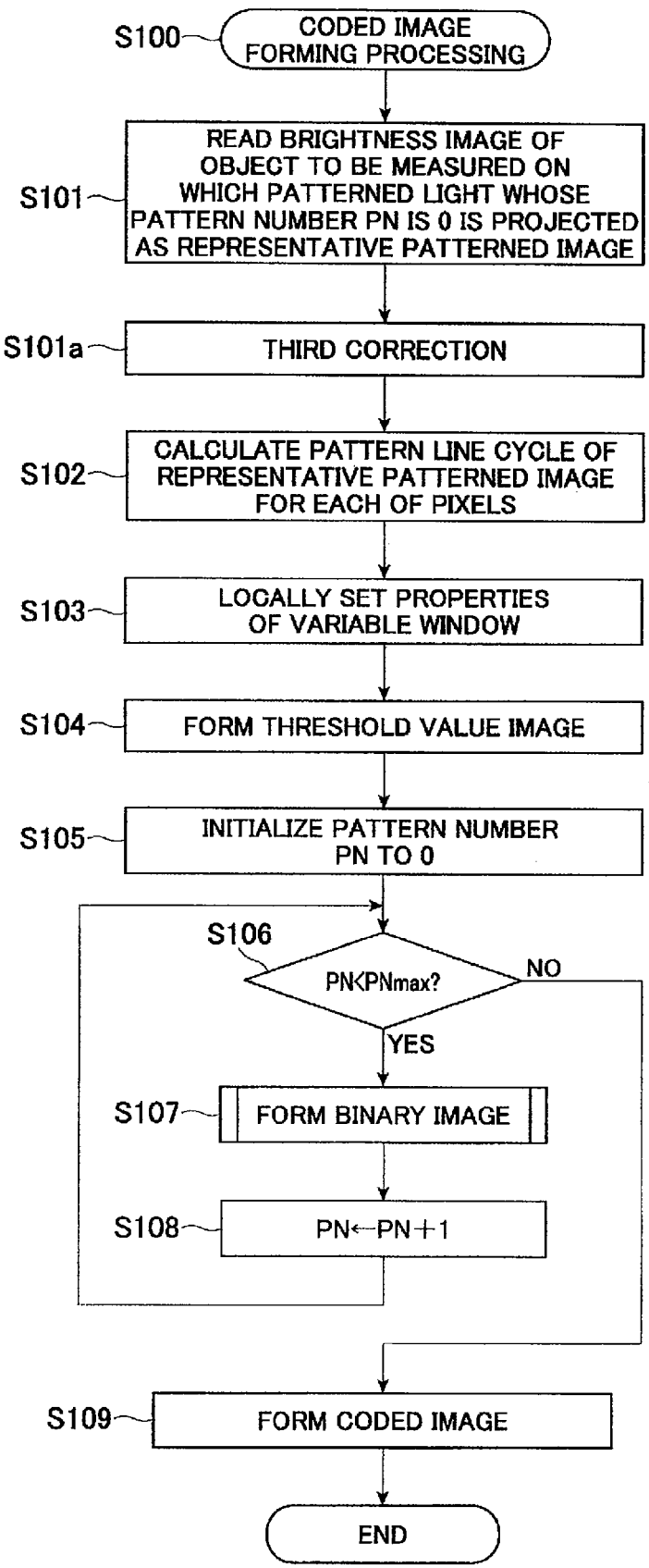
FIG. 28 is a flow chart showing a coded image forming processing in the fourth embodiment.

In the coded image forming processing, by executing the coded image forming program 36d as shown in FIG. 28, first of all, in step S101, the brightness image formed by picking up the object to be measured on which the patterned light whose pattern number PN is 0 is projected is read as a representative patterned image from the brightness image storing part 37c.

Next, in step S101a, the third correction processing is executed. That is, by executing the gray scale correction program 36j, the gray scale correction LUT 36k is referenced by the CPU 35 and the processing for applying the third correction to the image signal (color measuring image signal) indicative of the representative pattered image is executed.

After finishing of the processing in step S101a, in the same manner as the first embodiment, processing in steps S102 to S106 are sequentially executed. When it is determined that the present value of the pattern number PN is smaller than the maximum value PNmax in step S106, the third correction processing is performed in step S107 (processing for forming a binary image). On the other hand, if it is determined that the present value of the pattern number PN is larger than the maximum value PNmax in step S106, the processing in step S109 (processing for forming coded image) is performed in the same manner as the first embodiment, and the coded image forming processing is finished.

Figure 29:
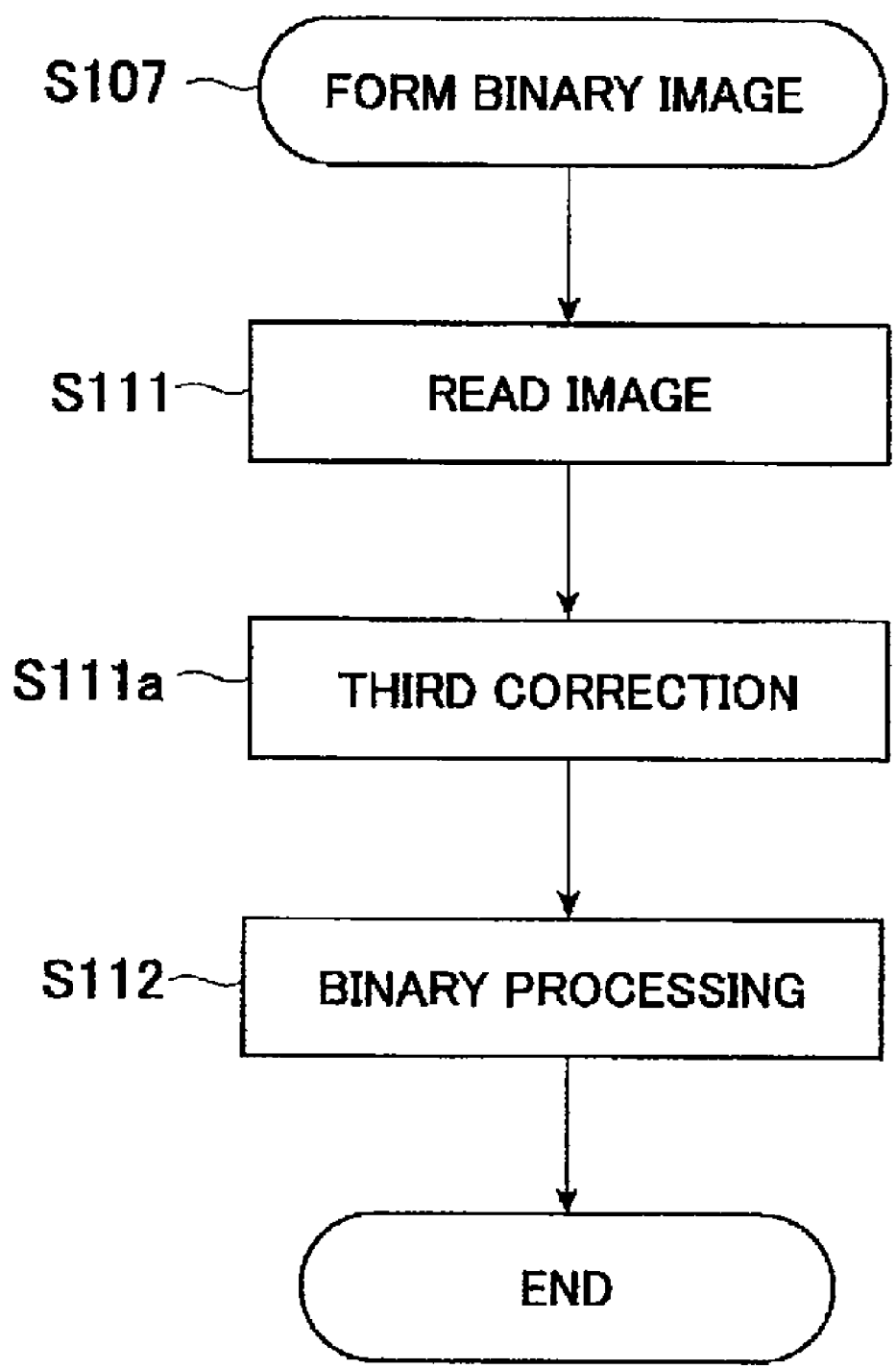
FIG. 29 is a flow chart showing a binary image forming processing of the fourth embodiment.

In the binary image forming processing, as shown in FIG. 29, an image is read from the brightness image storing part 37c in step S111 and, thereafter, the third correction processing is performed in step S111a. That is, by executing the gray scale correction program 36j, the gray scale correction LUT 36k is referenced by the CPU 35, and the processing for applying the third correction to the image signal (color measuring image signal) indicative of the image read in step S111 is performed.

After finishing such processing in step S111a, the binary processing S112 similar to the binary processing in the first embodiment is executed thus finishing the binary processing.

Fifth Embodiment

Next, a fifth embodiment of the present invention is explained. The three-dimensional color and shape measuring device according to the fifth embodiment has the basic structure which is substantially equal to the basic structure of the three-dimensional color and shape measuring device 1 of the first embodiment shown in FIG. 1 to FIG. 4, but differs from the three-dimensional color and shape measuring device 1 of the first embodiment only with respect to the constitution of the image pick-up unit, a program stored in the ROM of the processing part and the processing by the processing part.

Accordingly, here, only the constitution of the image pick-up unit, the program stored in the ROM of the processing part and the processing in the processing part provided to the fifth embodiment are explained, and the explanation of the basic structure of the three-dimensional color and shape measuring device is omitted. Here, also in this embodiment, the constitutional elements substantially equal to the corresponding constitutional elements of the three-dimensional color and shape measuring device 1 of the first embodiment are explained using the same symbols.

Figure 30:
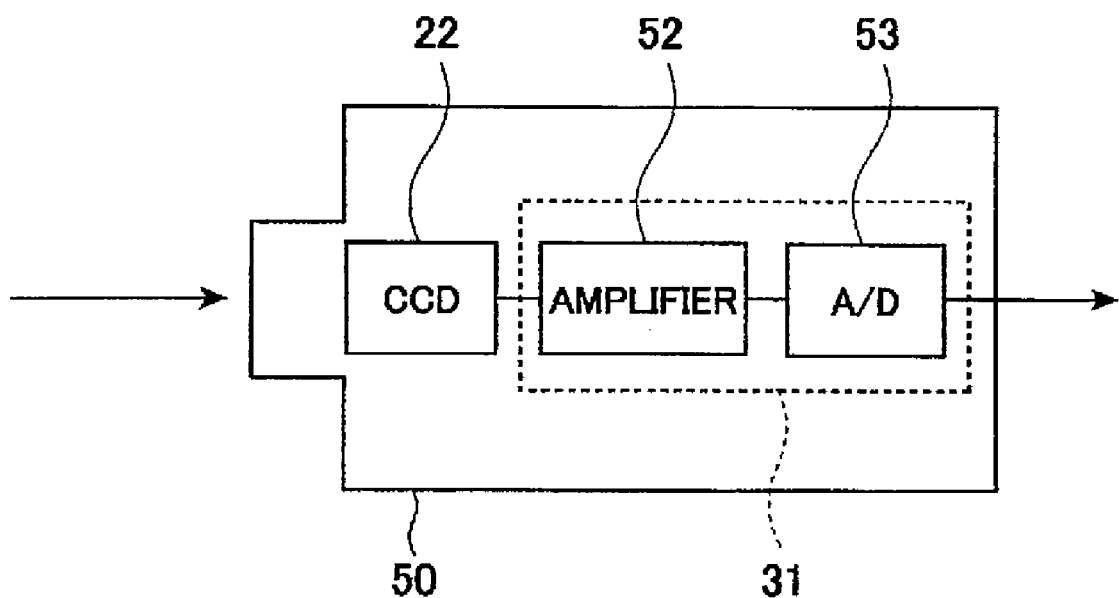
FIG. 30 is a functional block diagram showing an image pick-up unit of a fifth embodiment.

As shown in FIG. 30, the image pick-up unit 50 houses therein a CCD 22 which functions as an image pick-up part, an amplifier 52 which amplifies an image signal which is formed by picking up an image of the object to be measured and is outputted from the CCD 22, an A/D converter 53 which converts an analogue image signal amplified by the amplifier 52 into a digital image signal.

In the image pick-up unit 50 having such a constitution, the CCD interface 31 is constituted of the amplifier 52 and the A/D converter 53, and the image signal to which a gray scale correction is not applied is outputted to the main device 51 from the CCD interface 31.

Further, the main device houses therein a correction part which applies correction to the image signal inputted from the CCD interface 31 and a color and shape extracting part which restores a three-dimensional image of an object to be measured based on the image signal corrected by the correction part.

The correction part includes a first correction part constituted of a first correction circuit for converting an image signal into a color measuring image signal by the first correction in accordance with the above-mentioned non-linear first gray scale characteristic and an amplifier for outputting the color measuring image signal to the color and shape extracting part by amplifying the color measuring image signal outputted by the first correction circuit, and a second correction part constituted of a second correction circuit for converting an image signal into a shape measuring image signal by the second correction in accordance with the above-mentioned second gray scale characteristic having the linear portion and an amplifier for outputting the shape measuring image signal to the color and shape extracting part by amplifying the shape measuring image signal outputted by the second correction circuit.

Figure 26:
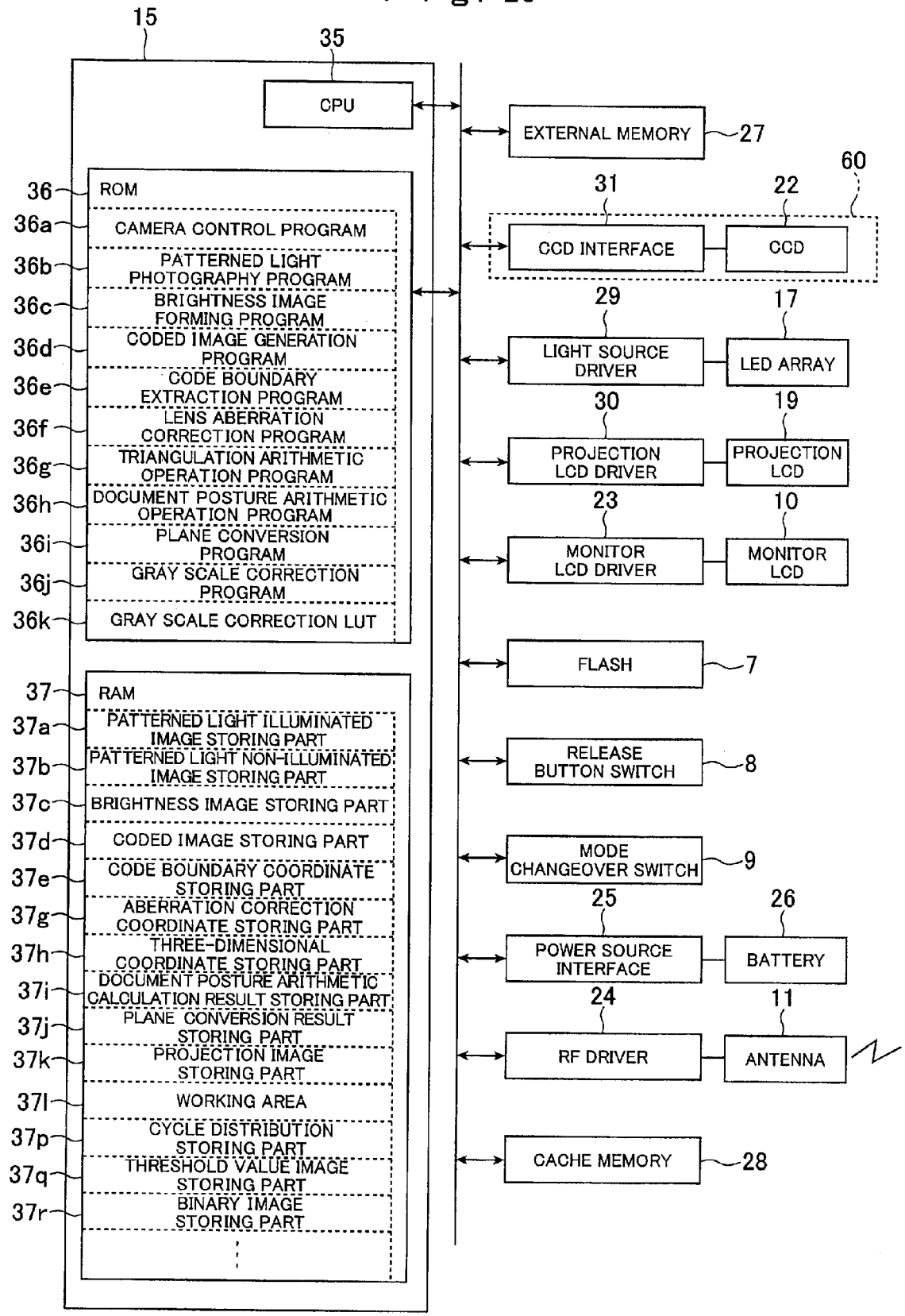
FIG. 26 is a block diagram conceptually showing the electrical constitution in the three-dimensional color and shape measuring device 1 of the fourth embodiment.

Further, in the main device of the fifth embodiment, for applying the first correction and the second correction to the image signal inputted from the image pick-up unit 50 as mentioned above, in the same manner as the processing part 15 of the fourth embodiment shown in FIG. 26, a gray scale correction program 36j and a gray scale correction LUT 36k are stored in the ROM 36 in addition to the respective programs 36a to 36i stored in the ROM 36 of the first embodiment.

Here, the gray scale correction program 36j and the gray scale correction LUT 36k in the fifth embodiment have contents different from the contents of the gray scale correction program 36j and the gray scale correction LUT 36 kin the fourth embodiment.

That is, the gray scale correction program 36j in the fifth embodiment is constituted of a first correction program executed at the time of applying the first correction to the image signal and a second correction program executed at the time of applying the second correction to the image signal.

The first correction program is executed for converting the image signal into a color measuring image signal used for measuring and restoring the color of the object to be measured by applying the first correction in accordance with the first gray scale characteristic to the image signal acquired by picking up an image of the object to be measured using the CCD 22. Here, the first gray scale characteristic means a non-linear gamma characteristic which conforms to a non-linear display characteristic of the monitor LCD 10.

By performing the first correction in accordance with such a first gray scale characteristic, a color measuring image signal capable of faithfully reproducing the real color of the object to be measured can be generated.

In this manner, the processing part 15 functions as a correction part for converting the image signal into the color measuring image signal by the first correction in accordance with the first gray scale characteristic.

Further, the second correction program is executed for converting the image signal into a shape measuring image signal used for measuring a three-dimensional shape of the object to be measured by applying the second correction in accordance with the second gray scale characteristic to the image signal acquired by picking up an image of the object to be measured using the CCD 22. Here, the second gray scale characteristic means a gamma characteristic having a linear characteristic in at least a portion thereof and an on-linear or linear characteristic in other portions.

Further, the gray scale correction LUT 36k in the fifth embodiment is constituted of a first correction LUT and a second correction LUT.

The first correction LUT is a look-up table which is stored in a state that the image signal before the first correction and the color measuring image signal acquired after the first correction are made to correspond to each other, and is referenced by the CPU 35 when the first correction program is executed by the processing part 15. That is, the above-mentioned first correction is performed by making use of this first correction LUT.

Further, the second correction LUT is a look-up table which is stored in a state that the image signal before the second correction and the shape measuring image signal acquired after the second correction are made to correspond to each other, and is referenced by the CPU 35 when the second correction program 36k is executed by the processing part 15. That is, the above-mentioned second correction is performed by making use of this second correction LUT.

In the first correction part, upon execution of the first correction program by the processing part 15 of the main device, the first correction circuit and the amplifier are operated for converting the image signal into the color measuring image signal and for outputting the color measuring image signal. The first correction part applies the first correction in accordance with the first gray scale characteristic to the image signal outputted by the CCD 22 which constitutes an image pick-up part by picking up an image of the object to be measured at the time of non-projecting of a patterned light by the projection part 13 functioning as a patterned light projecting part thus converting the image signal into the color measuring image signal.

Further, the image signal corrected by the first correction part contains plural kinds of color signals and brightness signals, wherein the first correction part performs the first correction for every color signal contained in the image signal and, at the same time, also performs the first correction for every brightness signal contained in the image signal.

In the second correction part, upon execution of the second correction program by the processing part 15 of the main device, outputs the shape measuring image signal by operating the second correction circuit and the amplifier. The second correction part applies the second correction in accordance with the second gray scale characteristic to the image signal outputted by the CCD 22 which constitutes an image pick-up part by picking up the object to be measured at the time of projecting a patterned light by a projection part 13 which functions as a patterned light projecting part thus converting the image signal into the shape measuring signal.

Further, the image signal corrected by the second correction part contains plural kinds of color signals and brightness signals, wherein the second correction part applies the second correction for every color signal contained in the image signal and, at the same time, also performs the second correction with respect to every brightness signal contained in the image signal.

In the main device including the correction part which have such a constitution, the color measuring image signal converted by the first correction part and the shape measuring signal converted by the second correction part are outputted to the color and shape extracting part.

Further, the main device 51 includes a selection part which selects either one of the first correction part and the second correction part and outputs the image signal outputted from the image pick-up unit 50 to the selected correction part, and the main device 51 outputs the image signal which is corrected by each correction part selected by the selection part to the color and shape extracting part.

The selection part selects, when the first correction program is executed by the processing part 15 of the main device 51, the first correction part by connecting the image pick-up unit 50 and the first correction circuit based on a control performed by the CPU 35.

On the other hand, the selection part selects, when the second correction program is executed by the processing part 15 of the main device 51, the second correction part by connecting the image pick-up unit 50 and the second correction circuit based on a control of the CPU 35.

In this manner, this embodiment is configured such that the color measuring image signal generated by applying the first correction in accordance with the non-linear first gray characteristic which conforms to the display characteristic of the monitor LCD 10 to the image signal is outputted to the color and shape extracting part. Accordingly, the color and shape extracting part can generate a texture described later which faithfully restores the color of the object to be measured.

Further, in the above-mentioned manner, the embodiment is configured such that the shape measuring image signal generated by applying the second correction in accordance with the second gray characteristic having a linear portion to the image signal is outputted to the color and shape extracting part. Accordingly, the three-dimensional shape of the object to be measured can be accurately measured and, at the same time, a three-dimensional model of the object to be measured described later which faithfully restores the three-dimensional shape of the object to be measured can be generated by the color and shape extracting part.

Accordingly, the three-dimensional color and shape measuring device 1 can generate the three-dimensional image which faithfully restores the color and the three-dimensional shape of the object to be measured.

Further, the three-dimensional color and shape measuring device 1 includes the first correction part and the second correction part in the main device and hence, the three-dimensional color and shape measuring device 1 can adopt, as the image pick-up unit 50, a relatively simple-structured and relatively inexpensive commercially-available image pick-up device which includes only an CCD 22, an amplifier 52 and an A/D converter 53 and includes no correction part which performs gray-scale correction shown in FIG. 30.

Next, the processing performed by the processing part 15 provided to the three-dimensional color and shape measuring device of the fifth embodiment is explained. The processing performed by the processing part 15 in the fifth embodiment differs from the corresponding processing performed by the first embodiment only with respect to processing executed in steps S1211, S1213 of the image pick-up processing sub routine shown in FIG. 15.

Figure 31:
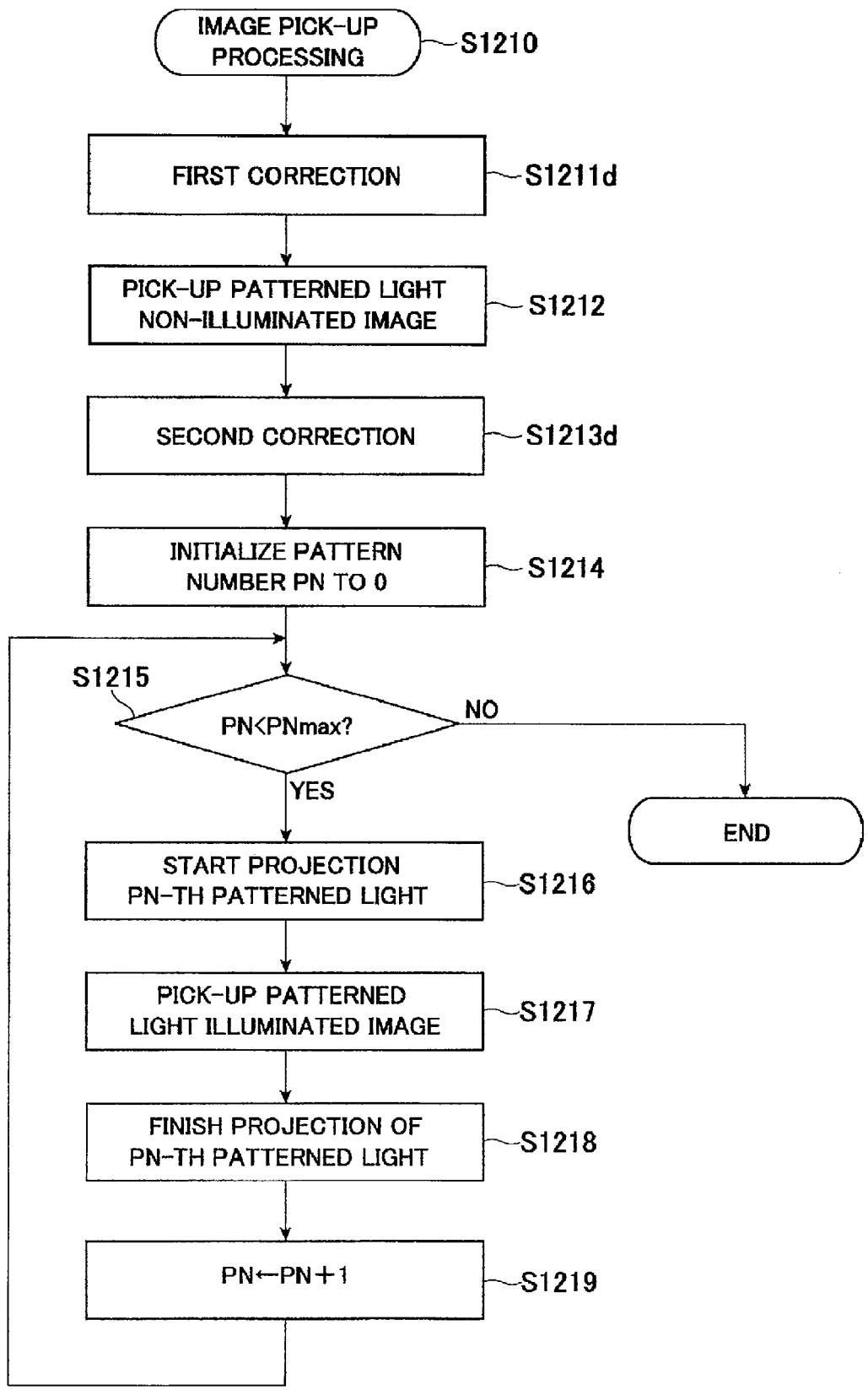
FIG. 31 is a flow chart showing an image pick-up processing of the fifth embodiment.

FIG. 31 is a flow chart showing image pick-up processing executed in the processing part 15 of the fifth embodiment. As shown in FIG. 31, in this image pick-up processing, first of all, the first correction processing is executed in step S1211d. That is, in step S1211d, the selection part selects, upon execution of the first correction program, the first correction part and, at the same time, the first correction LUT is referenced by the CPU 35, and by applying the first correction to the image signal outputted from the image pick-up unit 50, a color measuring image signal is generated.

Next, in step S1212, upon execution of the patterned light imaging program 36b, one patterned light non-illuminated image is acquired by picking up an image of the object to be measured by the image pick-up part 14 without projecting the patterned light on the object to be measured from the projection part 13.

The patterned light non-illuminated image acquired here is formed based on the color measuring image signal to which the first correction is applied by the first correction circuit. The patterned light non-illuminated image is stored in the patterned light non-illuminated image storing part 37b.

Next, in step S1213d, the second correction processing is executed. That is, in step S1213d, upon execution of the second correction program, the selection part selects the second correction part and, at the same time, the second correction LUT is referenced by the CPU 35, and by applying the second correction to the image signal outputted by the image pick-up unit 50, a shape measuring image signal is generated.

After processing in step S1213d is finished, in the same manner as the first embodiment, the processing in step S1214 to S1219 are sequentially executed thus finishing the image pick-up processing.

In this manner, according to the processing part 15 which the three-dimensional color and shape measuring device 1 of the fifth embodiment possesses, by merely replacing the processing executed in steps S1211 and S1213 in the image pick-up processing sub routine of the first embodiment shown in FIG. 15 with the processing executed in steps S1211d and S1213d in image pick-up processing subroutine shown in FIG. 31, it is possible to operate the image pick-up unit 50 shown in FIG. 30 without largely changing the whole program executed by the processing part 15.

Further, in the fifth embodiment, the first and the second corrections are applied to the color measuring image signal inputted by the image pick-up unit 50 during the image pick-up processing. However, the processing performed by the processing part 15 may be changed such that the first and the second corrections are performed during the image pick-up processing and, thereafter, the second correction is performed in the coded image forming processing (S100) shown in FIG. 17, and the first correction is performed in the three-dimensional color shape detection result generating processing (S1230) shown in FIG. 19.

Here, as a modification of the fifth embodiment, the explanation is made with respect to processing executed by the processing part 15 in performing the second correction in the coded image forming processing and performing the first correction in the three-dimensional color shape detection result generating processing. In such a case, the first correction processing in step S1211d shown in FIG. 31 is deleted, the first correction is performed in the three-dimensional color shape detection result generating processing shown in FIG. 34, the second correction processing in step S1213d shown in FIG. 31 is deleted, and the second correction processing is performed in the coded image forming processing shown in FIG. 32 and in the binary image forming processing shown in FIG. 33.

Figure 32:
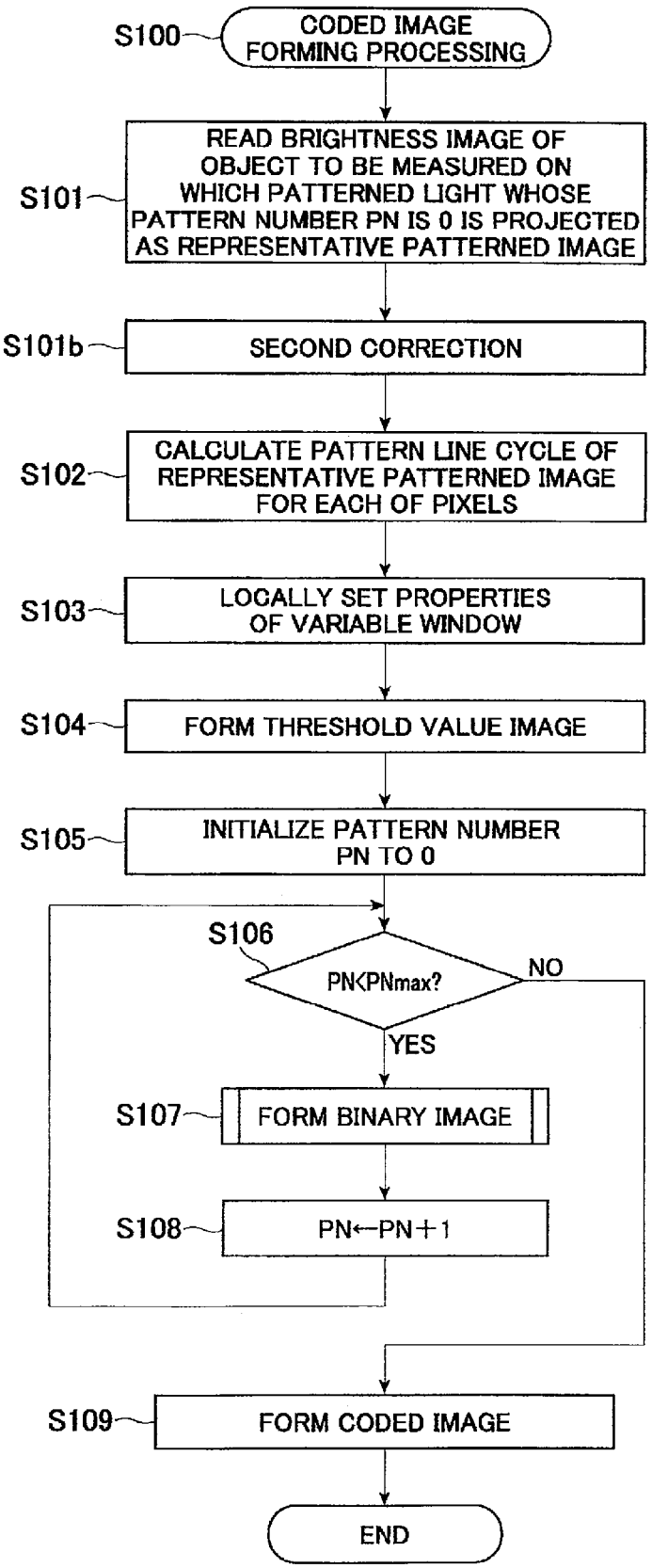
FIG. 32 is a flow chart showing a coded image forming processing in the fifth embodiment.

In the coded image forming processing, by executing the coded image forming program 36d as shown in FIG. 32, first of all, in step S101, the brightness image formed by picking up the object to be measured on which the patterned light whose pattern number PN is 0 is projected is read as a representative patterned image from the brightness image storing part 37c.

Next, in step S101b, the second correction processing is executed. That is, by executing the second correction program in step 101b, the second correction LUT is referenced by the CPU 35 and the processing for applying the second correction to the image signal indicative of the representative pattered image is executed.

After finishing the processing in step S101b, in the same manner as the first embodiment, processing in steps S102 to S106 are sequentially executed. When it is determined that the present value of the pattern number PN is smaller than the maximum value PNmax, the second correction processing is performed in step S107 (processing for forming a binary image). On the other hand, if it is determined that the present value of the pattern number PN is larger than the maximum value PNmax, the processing in step S109 (processing for forming coded image) is performed in the same manner as the first embodiment, and the coded image forming processing is finished.

Figure 33:
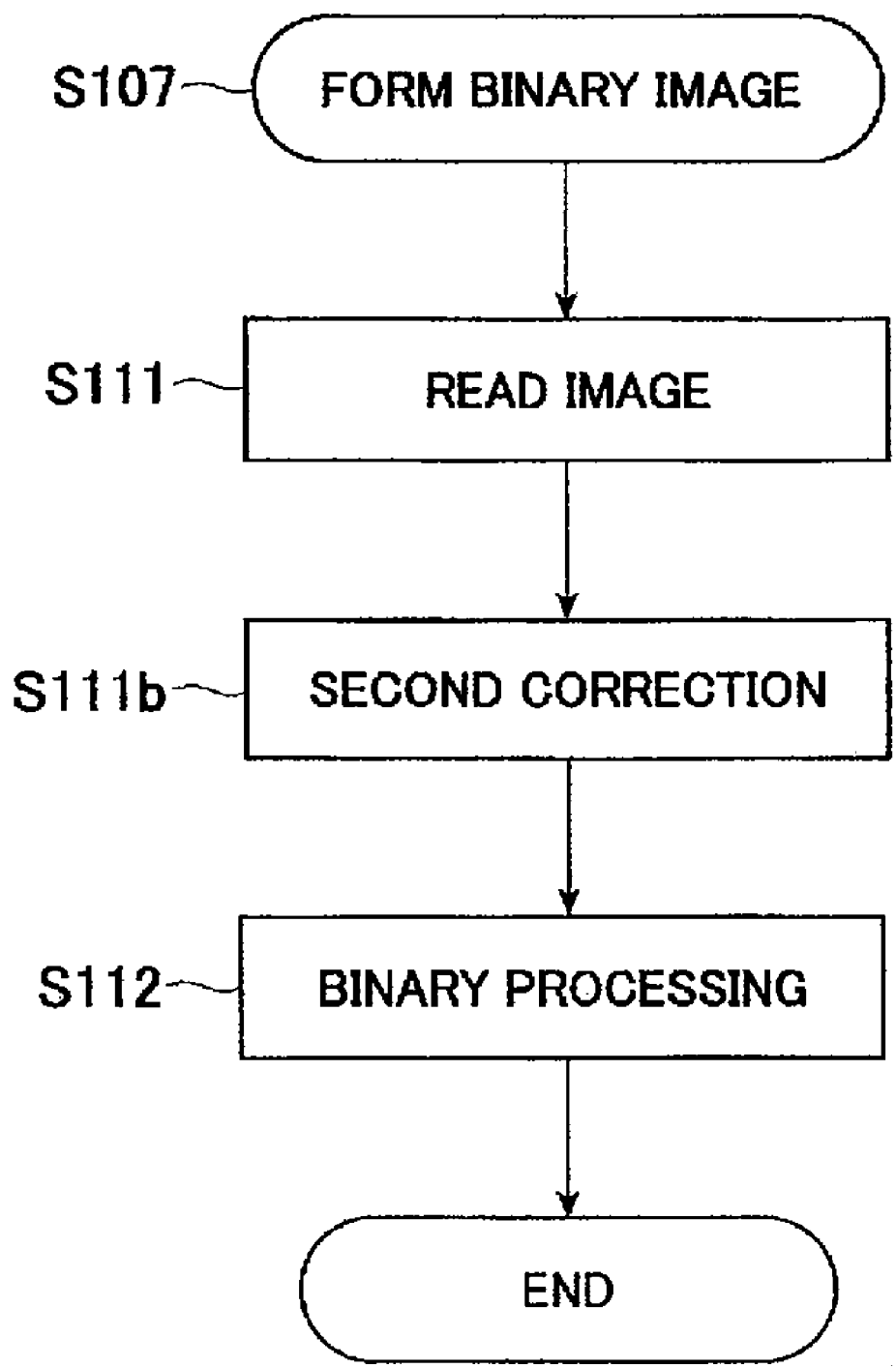
FIG. 33 is a flow chart showing a binary image forming processing of the fifth embodiment.

In the binary image forming processing, as shown in FIG. 33, an image is read from the brightness image storing part 37c in step S111 and, thereafter, the second correction processing is performed in step S111b. That is, by executing the second correction program in step S111b, the second correction LUT is referenced by the CPU 35, and the processing for applying the second correction to the image signal indicative of the image read in step S111 is performed.

After finishing such processing in step S111b, the binary processing S112 similar to the binary processing in the first embodiment is executed thus finishing the binary processing.

Figure 34:
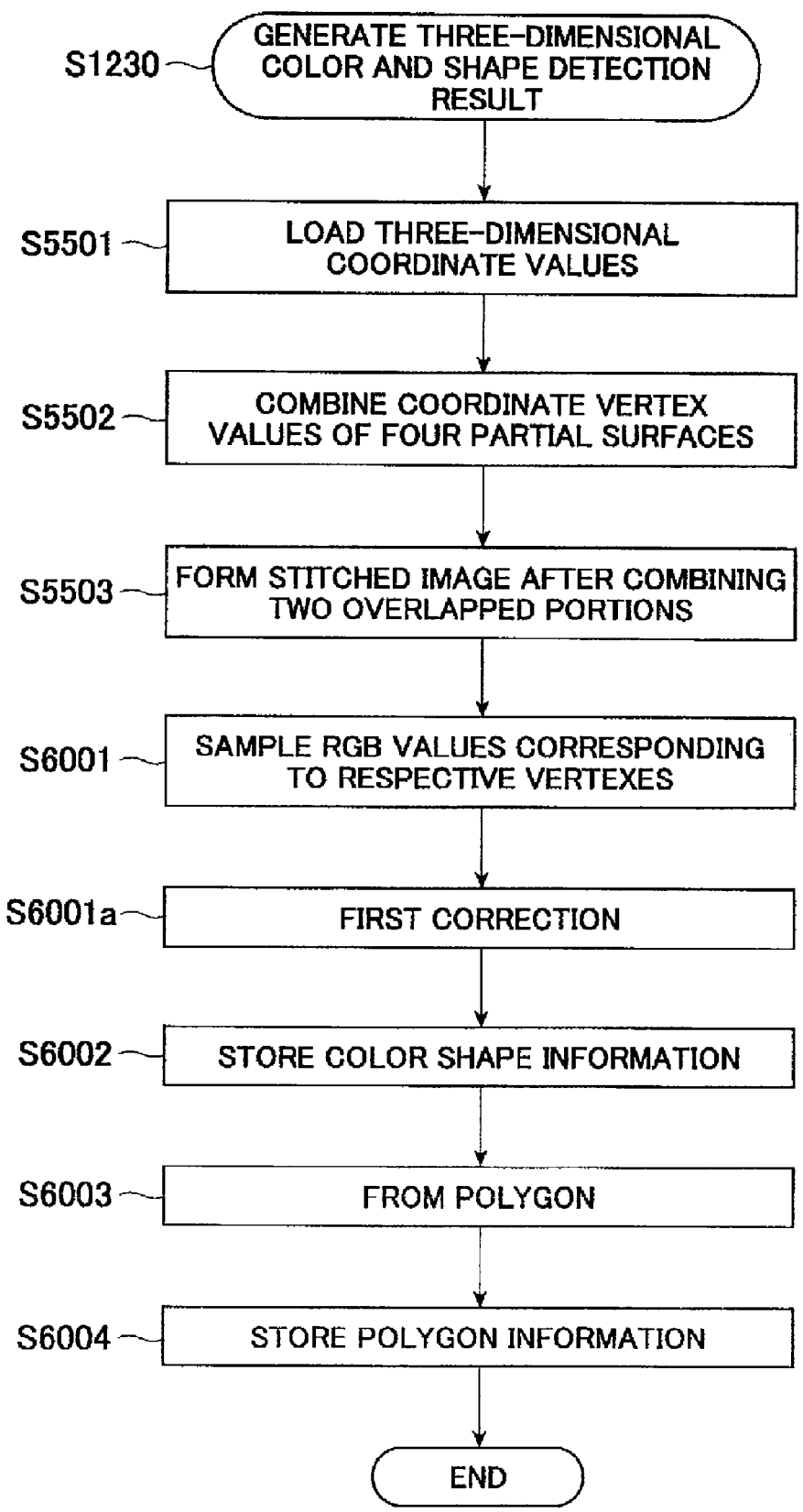
FIG. 34 is a flow chart showing a three-dimensional-color-shape detection result generating processing in the fifth embodiment.

Further, in the three-dimensional color shape detection result generating processing, as shown in FIG. 34, in the same manner as the three-dimensional color shape detection result generating processing of the first embodiment, processing in steps S5501 to S6001 are sequentially performed and, thereafter, the first correction processing is performed in step S6001a.

That is, by executing the first correction program in step S6001a, the first correction LUT is referenced by the CPU 35, and the processing for applying the first correction to the RGB values of the patterned light non-illuminated image extracted in step S6001 is performed.

After finishing such processing in step S6001a, the processing in steps S6002 to S6004 are sequentially executed thus finishing the three-dimensional color and shape detection result generation processing.

Although some embodiments of the present invention have been explained in detail in conjunction with the drawings, these embodiments are merely examples and the present invention may be performed in other modes including various modifications and improvements as well as the mode described in "Summary of the Invention" based on knowledge of those who are skilled in the art.

For example, as a modification, respective correction circuits for applying gray scale corrections to the image signal and respective amplifiers for amplifying the signals outputted from the respective correction circuits may be constituted of analogue circuits using a non-linear element constituted of a semiconductor or the like in place of the digital circuits used in this embodiment thus applying the gray scale correction to the image signal by analogue signal processing.

What is claimed is:

1. A three-dimensional color and shape measuring device for measuring a color and a three-dimensional shape of an object to be measured based on an image signal acquired by picking up an image of the object to be measured by the same image pick-up part, the three-dimensional color and shape measuring device comprising:

a correction part which is configured to convert the image signal into a color measuring image signal by a first correction in accordance with a first gray scale characteristic and to convert the image signal into a shape-measuring image signal by a second correction in accordance with a second gray scale characteristic; and a color and shape extracting part which is configured to restore a three-dimensional image of the object to be measured by using a three-dimensional model on which a three-dimensional shape of the object to be measured is restored based on the shape-measuring image signal and a color of the object to be measured restored based on the color-measuring image signal.

2. A three-dimensional color and shape measuring device according to claim 1, wherein the gray scale characteristic is gamma characteristic.

3. A three-dimensional color and shape measuring device according to claim 1, wherein the three-dimensional color and shape measuring device includes a patterned light projecting part which is configured to project a patterned light having a predetermined pattern on the object to be measured, and the correction part is configured to apply the second correction in accordance with the second gray scale characteristic to the image signal outputted upon picking up an image of the object to be measured by the image pick-up part picking up at the time of projecting the patterned light by the patterned light projecting part, and to apply the first correction in accordance with the first gray scale characteristic to the image signal outputted upon picking up the image of the object to be measured by the image pick-up part at the time of not projecting the patterned light by the patterned light projecting part.

4. A three-dimensional color and shape measuring device according to claim 1, wherein the second gray scale characteristic is a linear characteristic.

5. A three-dimensional color and shape measuring device according to claim 1, wherein the second gray scale characteristic has a portion thereof formed of a linear characteristic and other portions thereof formed of a non-linear characteristic.

6. A three-dimensional color and shape measuring device according to claim 1, wherein at least either one of the first correction and the second correction is performed using a lookup table corresponding to information before and after the correction.

7. A three-dimensional color and shape measuring device according to claim 1, wherein the image signal includes plural kinds of color signals and plural kinds of brightness signals and the correction part performs the first correction and the second correction for every color signal.

8. A three-dimensional color and shape measuring device according to claim 1, wherein the image signal is formed of a brightness signal, and the correction part applies the first correction and the second correction to the brightness signal.

9. A three-dimensional color and shape measuring device according to claim 4, wherein the correction part performs the second correction using an amplifier.

10. A three-dimensional color and shape measuring device according to claim 1, wherein the image pick-up part and the correction part are housed in an image pick-up unit and the color and shape extracting part are housed in a main device, wherein the correction part includes a first correction part for converting the image signal into the color measuring image signal by first correction in accordance with the first gray scale characteristic and a second correction part for converting the image signal into the shape measuring image signal by second correction in accordance with the second gray scale characteristic and the image pick-up unit outputs the color measuring image signal and the shape measuring image signal.

11. A three-dimensional color and shape measuring device according to claim 10, wherein the image pick-up unit includes a selecting part which selects either one of the first correction part and the second correction part and outputs the image signal to the selected correction part.

12. A three-dimensional color and shape measuring device according to claim 10, wherein the main device includes a selecting part which selects either one of the color measuring image signal and the shape measuring image signal and outputs the selected image signal to the color and shape extracting part.

13. A three-dimensional color and shape measuring device according to claim 1, wherein the image pick-up part is housed in an image pick-up unit and the correction part and the color and shape extracting part are housed in a main device, wherein the correction part includes a first correction part for converting the image signal into the color measuring image signal by first correction in accordance with the first gray scale characteristic and a second correction part for converting the image signal into the shape measuring image signal by second correction in accordance with the second gray scale characteristic.

14. A three-dimensional color and shape measuring device according to claim 13, wherein the main device includes a selecting part which selects either one of the first correction part and the second correction part and outputs the image signal outputted from the image pick-up unit to the selected correction part.

15. A three-dimensional color and shape measuring device according to claim 1, wherein the correction part includes a first correction part which is configured to convert the image signal into the color measuring image signal by first correction in accordance with the first gray scale characteristic, and a third correction part which is configured to convert the color measuring image signal into the shape measuring image signal by third correction in accordance with third gray scale characteristic and the image pick-up part and the first correction part are housed in an image pick-up unit and the third correction part and the color and shape extracting part are housed in a main device.

16. A three-dimensional color and shape measuring device according to claim 15, wherein the third gray scale characteristic is a gray scale characteristic which forms a linear characteristic due to multiplication thereof with the first gray scale characteristic.

* * * * *